US007386476B1

(12) United States Patent
Shavanadan et al.

(10) Patent No.: US 7,386,476 B1
(45) Date of Patent: Jun. 10, 2008

(54) SMALL BUSINESS SERVICE BUYING CLUB SYSTEMS AND METHODS

(75) Inventors: John Shavanadan, Atlanta, GA (US); Jeff Ezell, Atlanta, GA (US); Jennifer Marzano, Atlanta, GA (US); Brooke Lopes, Mableton, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 756 days.

(21) Appl. No.: 09/974,502

(22) Filed: Oct. 9, 2001
(Under 37 CFR 1.47)

(51) Int. Cl.
*G06Q 30/00* (2006.01)
(52) U.S. Cl. ........................................ 705/26
(58) Field of Classification Search ............ 705/26, 705/27
See application file for complete search history.

(56) References Cited

U.S. PATENT DOCUMENTS

| 6,101,484 | A * | 8/2000 | Halbert et al. | 705/26 |
| 6,269,343 | B1 * | 7/2001 | Pallakoff | 705/26 |
| 6,584,451 | B1 * | 6/2003 | Shoham et al. | 705/37 |
| 6,604,089 | B1 * | 8/2003 | Van Horn et al. | 705/26 |
| 6,615,185 | B1 * | 9/2003 | Bernstein | 705/26 |
| 6,631,356 | B1 * | 10/2003 | Van Horn et al. | 705/26 |
| 2001/0049647 | A1 * | 12/2001 | Sheehan et al. | 705/37 |

FOREIGN PATENT DOCUMENTS

WO   WO 00/65505   * 11/2000

OTHER PUBLICATIONS

Friedman, Jack P. "Dictionary of Business Terms", Third Edition, Barron's, 2000, p. 552.*

No Author, "Merriam-Webster's Collegiate Dictionary", Third Edition, 1997, p. 724.*
No Author, "Survey of Retail Credit Trends: Overall Findings", Chain Store Age Executive, v68n1, Jan. 1992. retrieved from Dialog File: 15, Acc#: 00723318.*
"Partners, Industry Leaders Come Together," Commerce One: Partners: Overview, http://www.commerceone.com/partners/, Feb. 28, 2002, p. 1.
"Commerce One is the Business Internet Company," Commerce One, the Business Internet Company, http://www.commerceone.com/, Feb. 28, 2002, p. 1.
"Company, Powering the Business Internet," Commerce One: Company: Overview, http://www.commerceone.com/company, Feb. 28, 2002, p. 1.
"Solutions, Proven in the Real World, Measured on the Bottom Line," Commerce One: Solutions: Overview, http://commerceone.com/solutions/, Feb. 28, 2002, p. 1-2.

(Continued)

*Primary Examiner*—Naeem Haq
(74) *Attorney, Agent, or Firm*—Cantor Colburn LLP

(57) ABSTRACT

Systems and methods allow small businesses and other buyers to aggregate their purchases to obtain volume discounts from suppliers. The systems are especially beneficial to small businesses that may be unable to obtain any discounted price on their own. The systems reduce transaction costs, improve efficiencies, increases revenue, and provides a more accurate process to buyers and suppliers. The systems are preferably operated by an entity that already has relationships with many of the small businesses and other buyers and possibly with one or more of the suppliers. The operating entity enjoys the reduced prices and other buyer benefits and may additionally receive rebates or extra discounts from the suppliers. The operating entity also can generate goodwill with its existing customers, retain those customers, and acquire new customers.

17 Claims, 67 Drawing Sheets

OTHER PUBLICATIONS

"Customers, Know the Value of Innovation," Commerce One: Customers: Overview, http://www.commerceone.com/customers/, Feb. 28, 2002, p. 1.

"Industries, Powering Industries Around the Globe," Commerce One: Industries, Overview, http://www.commerceone.com/industries/, Feb. 28, 2002, p. 1.

"Partners, Industry Leaders Come Together," Commerce One: Partners: Overview, http://www.commerceone.com/partners/, Feb. 28, 2002, p. 1.

"Company, Powering the Business Internet," Commerce One: Company: Overview, http://www.commerceone.com/company/, Feb. 28, 2002, p. 1.

"Solutions, Proven in the Real World, Measured on the Bottom Line," Commerce One: Solutions: Overview, http://www.commerceone.com/solutions/, Feb. 28, 2002, pp. 1-2.

"Customers, Know the Value of Innovation," Commerce One: Customers: Overview, http://commerceone.com/customers/, Feb. 28, 2002, p. 1

"Works Procisa Application Overview," Works-Procisa Application Overview, http://works.com/solution/procisa.jsp, Feb. 28, 2002, pp. 1-3.

"Solutions," Verticalnet: Solutions, http://www.verticalnet.com/solutions/, Feb. 28, 2002, pp. 1-2.

"Technology," Verticalnet: Technology, http://verticalnet.com/technology/, Feb. 28, 2002, pp. 1-2.

"Customers," Verticalnet: Customers, http://verticalnet.com/customers, Feb. 28, 2002, pp. 1-2.

"Ariba Spend Management Suite," Ariba—Enterprise Spend Management Solutions, http://www.ariba.com, Feb. 28, 2002, p. 1.

"Solutions Overview," Solutions Overview, http://ariba.com/solutions/solutions_overview.cfm, Feb. 28, 2002, pp. 1-2.

"Analysis Solution," Analysis Solution, http://ariba.com/solutions/analysis_overview.cfm., Feb. 28, 2002, pp. 1-2.

"Sourcing Solution," Ariba Spend Management: Sourcing, http://ariba.com/solutions/sourcing_overview.cfm, Feb. 28, 2002, pp. 1-2.

"Procurement Solution," Ariba Spend Management: Procurement, http://ariba.com/solutions/procurement_overview.cfm, Feb. 28, 2002, pp. 1-2.

"Ariba Supplier Network," Ariba Supplier Network, http://ariba.com/solutions/ariba_product.cfm?solutionid=9, Feb. 28, 2002, p. 1.

"Ariba Solutions for Industry Verticals," Industry Solutions, http://www.ariba.com/solutions/industry_sol.cfm, Feb. 28, 2002, p. 1.

"Customers Overview," Customers Overview, http://ariba.com/customers/customers_overview.cfm, Feb. 28, 2002, pp. 1-6.

"Suppliers Overview," Suppliers Overview, http://ariba.com/suppliers,suppliers_overview.cfm, Feb. 28, 2002, p. 1.

"Control. Efficiency, Visibility," Works—Home, http://www.works.com/, Feb. 28, 2002, p. 1.

"Company Overview," Works—Executive Profiles, http://works.com/company/overview.jsp., Feb. 28, 2002.

"Product Overview," Works—Product Overview, http://www.works.com/solution/overview.jsp, Feb. 28, 2002, p. 1.

"Works Partners Overview," Works—Partners Overview, http://www.works.com/partners/overview.jsp/, Feb. 28, 2002, p. 1.

"How Do the Best-Run E-Businesses Stay That Way?," SAP, http://www.sap.com, Feb. 28, 2002, p. 1.

"mySAP.com—Solutions for the Best-Run E-Businesses," SAP-Solutions Home, http://www.sap.com/solutions/, Feb. 28, 2002, p. 1.

"SAP Solutions for Small and Medium Business," SAP-SAP Solutions for SMB Home, http://www.sap.com/solutions/smb/, Feb. 28, 2002, p. 1.

"mySAP Exchanges," SAP-mySAP Exchanges Home, http://www.sap.com/solutions/exchanges/, Feb. 28, 2002, p. 1

"mySAP Services," SAP-mySAP Services Home, http://www.sap.com/services/, Feb. 28, 2002, p. 1.

Verticalnet Software for the Collaborative Supply Chain, http://www.verticalnet.com/, Feb. 28, 2002, p. 1.

"Challenges," Verticalnet: Challenges, http://www.verticalnet.com/challenges/, Feb. 28, 2002, pp. 1-2.

* cited by examiner

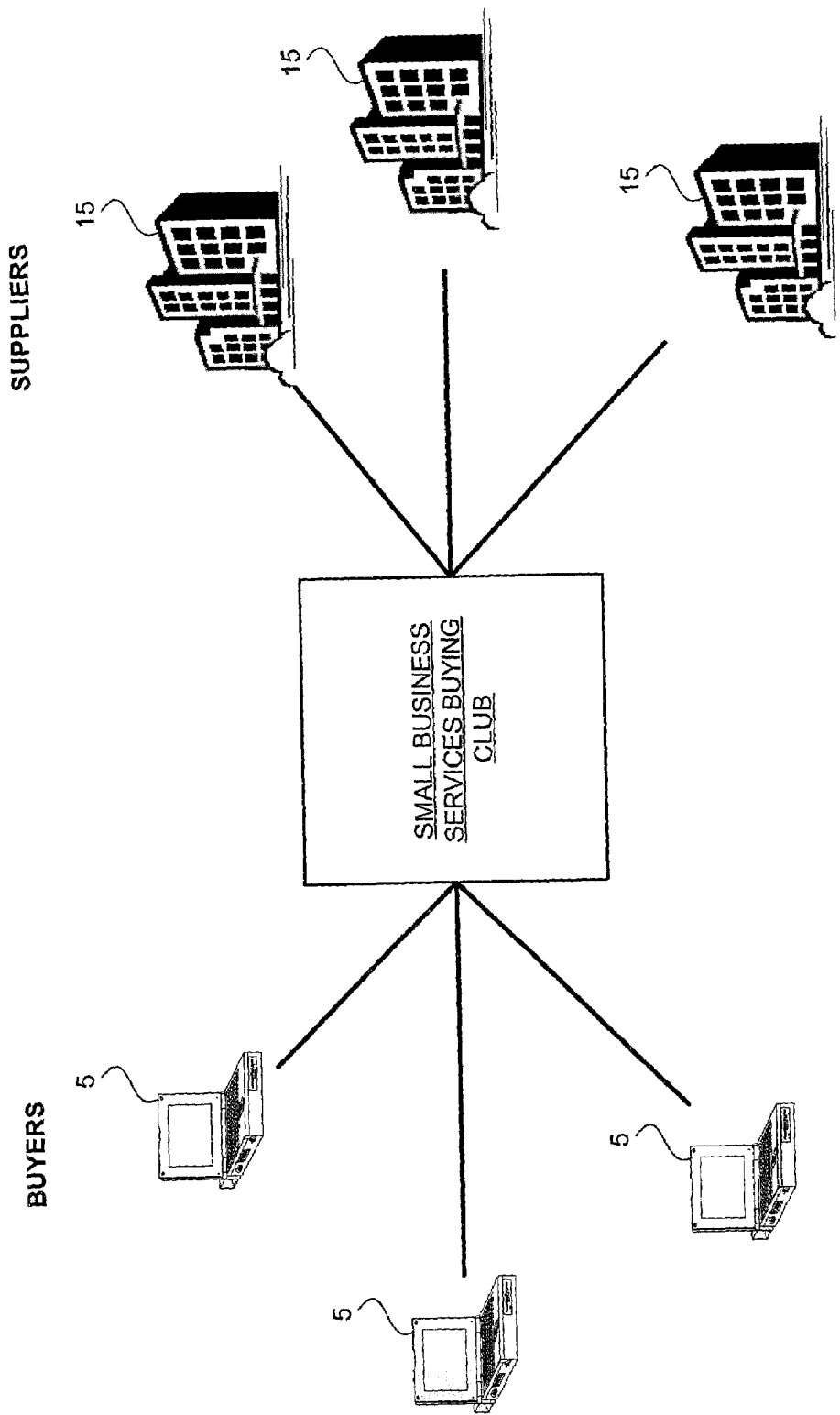

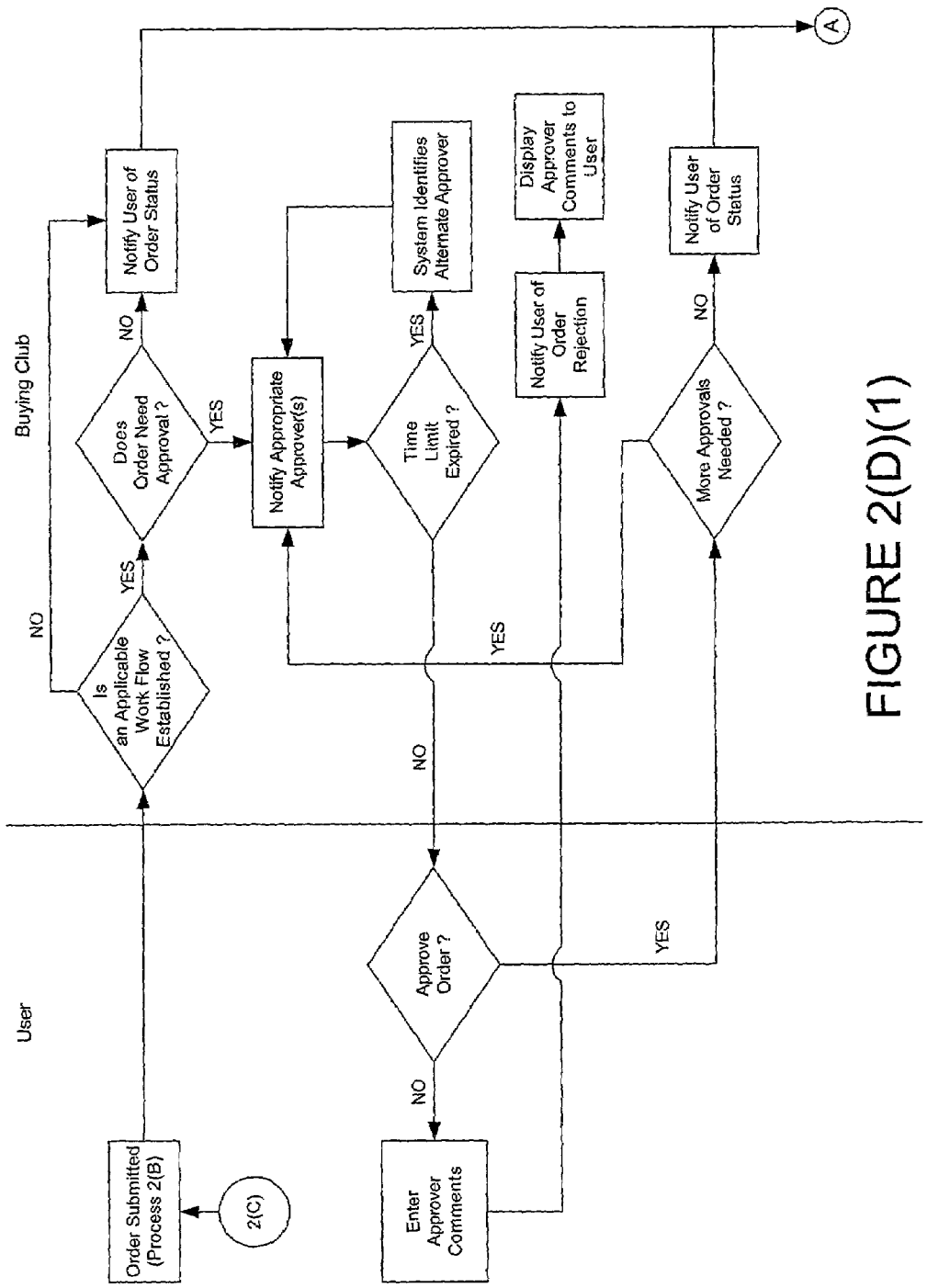
FIGURE 2(D)(1)

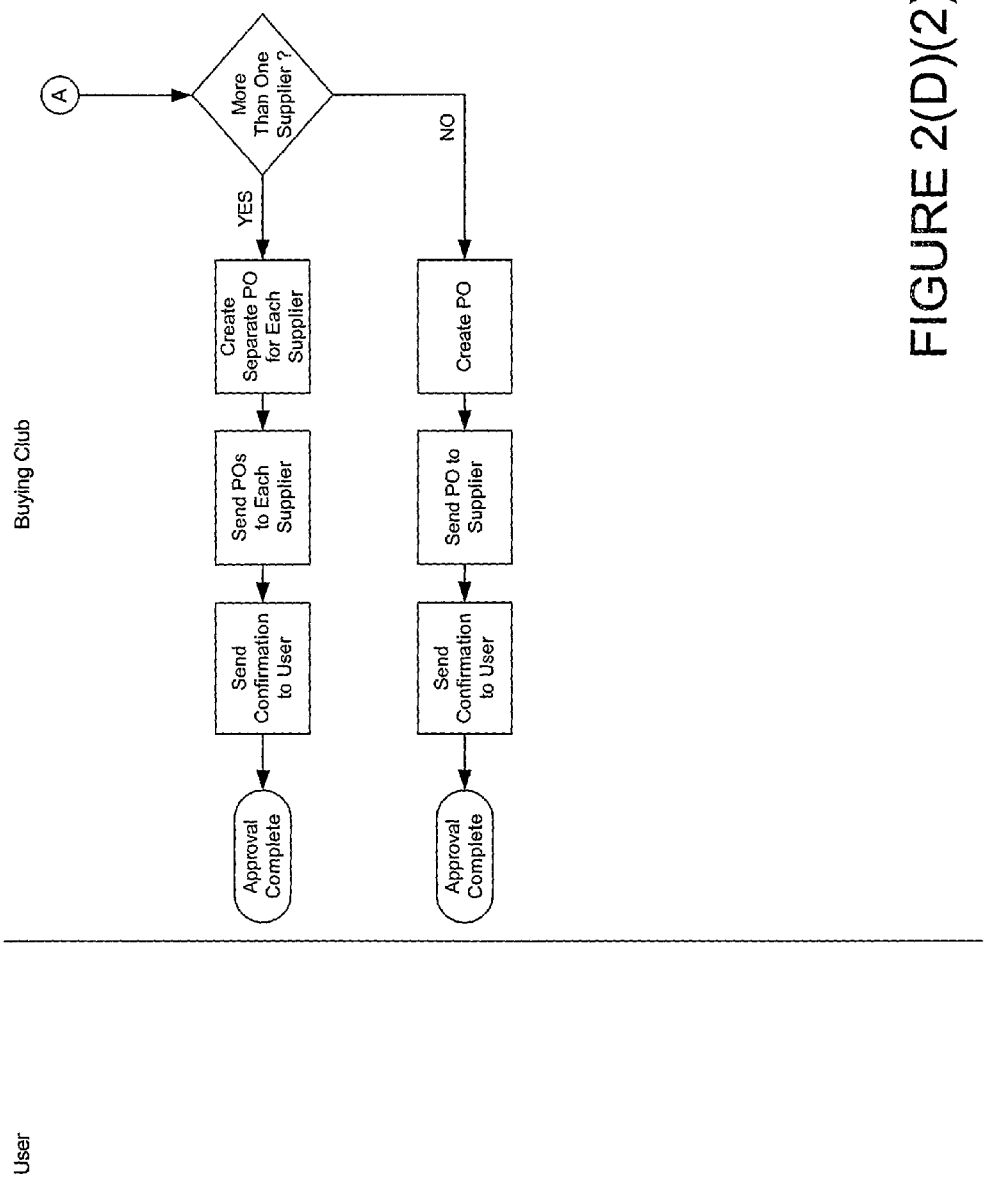
FIGURE 2(D)(2)

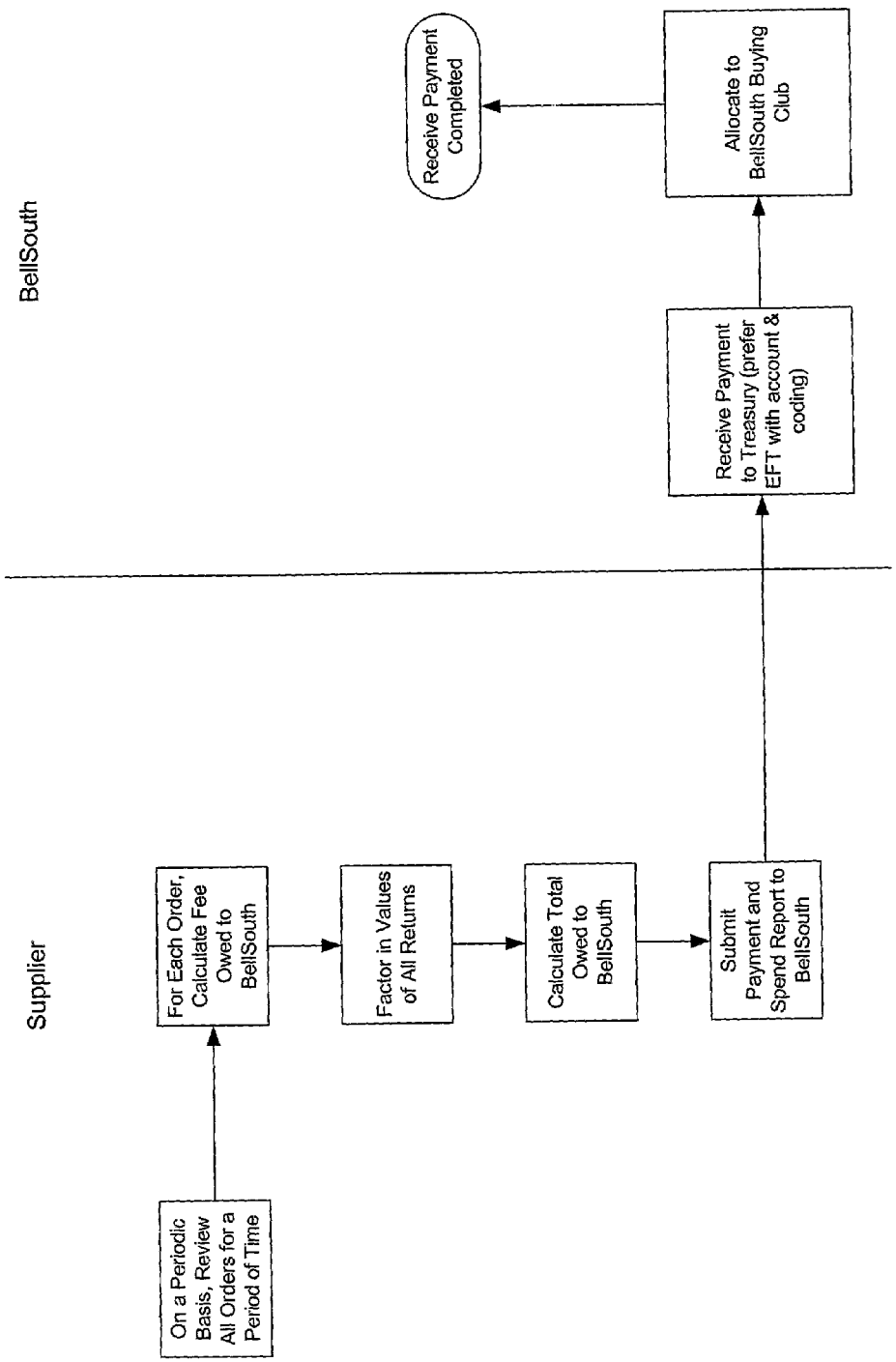

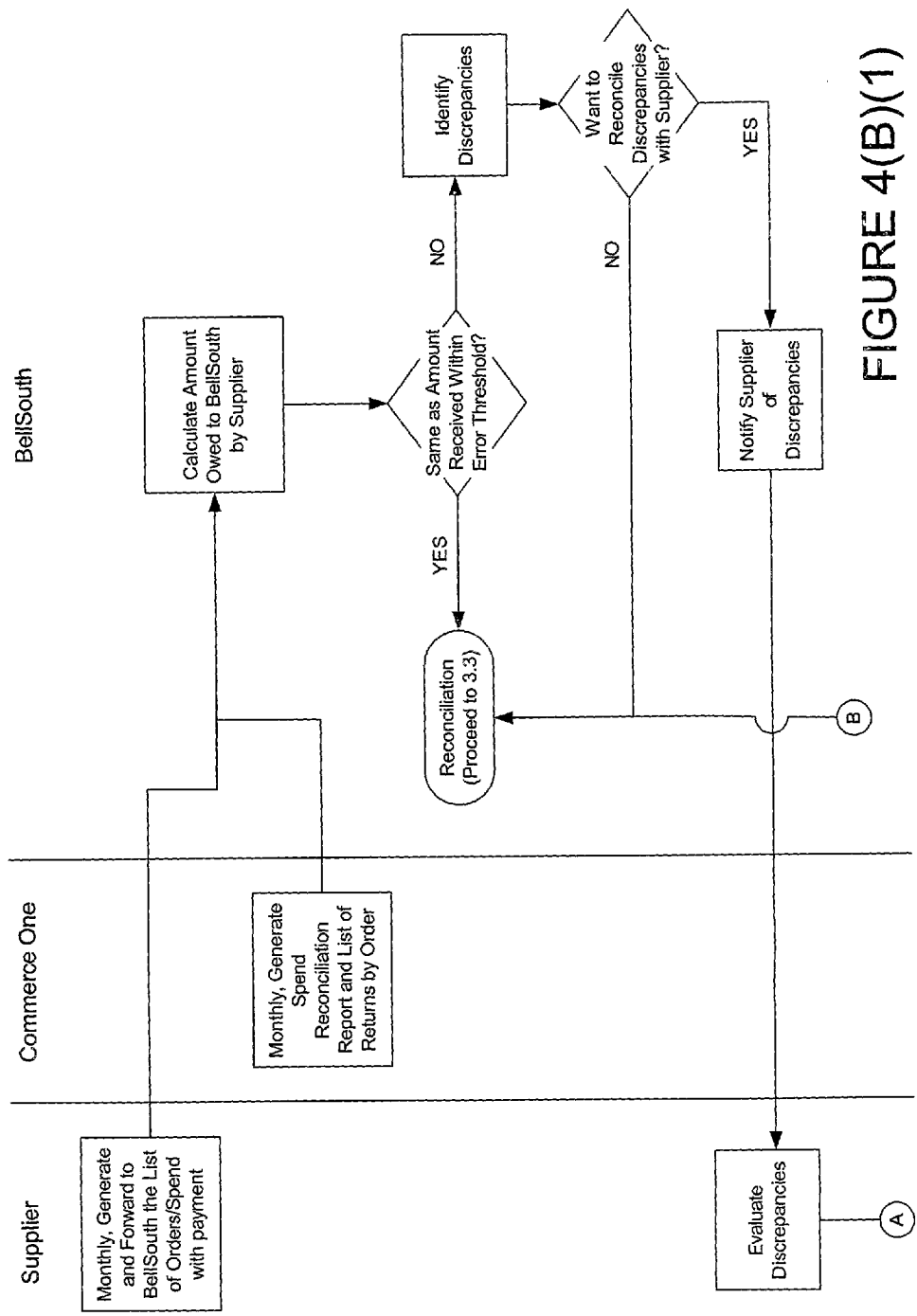
FIGURE 4(B)(1)

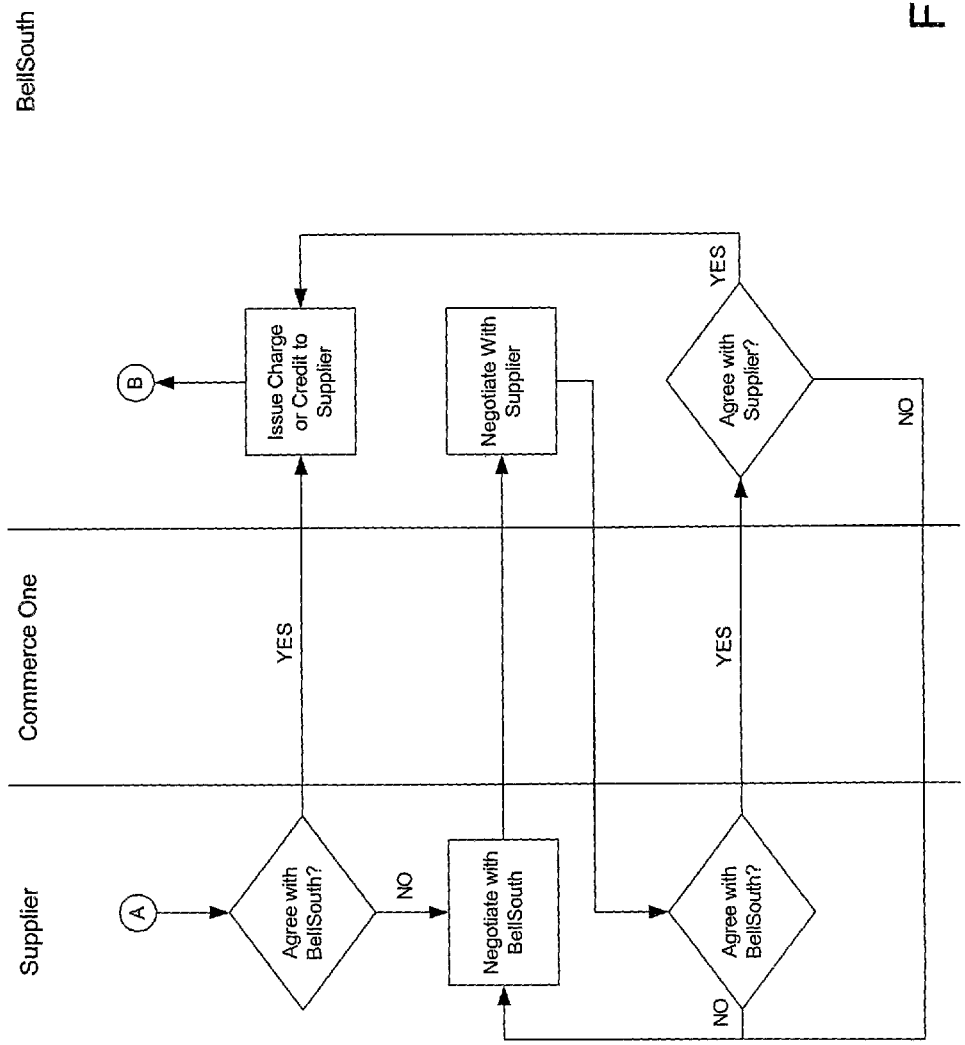

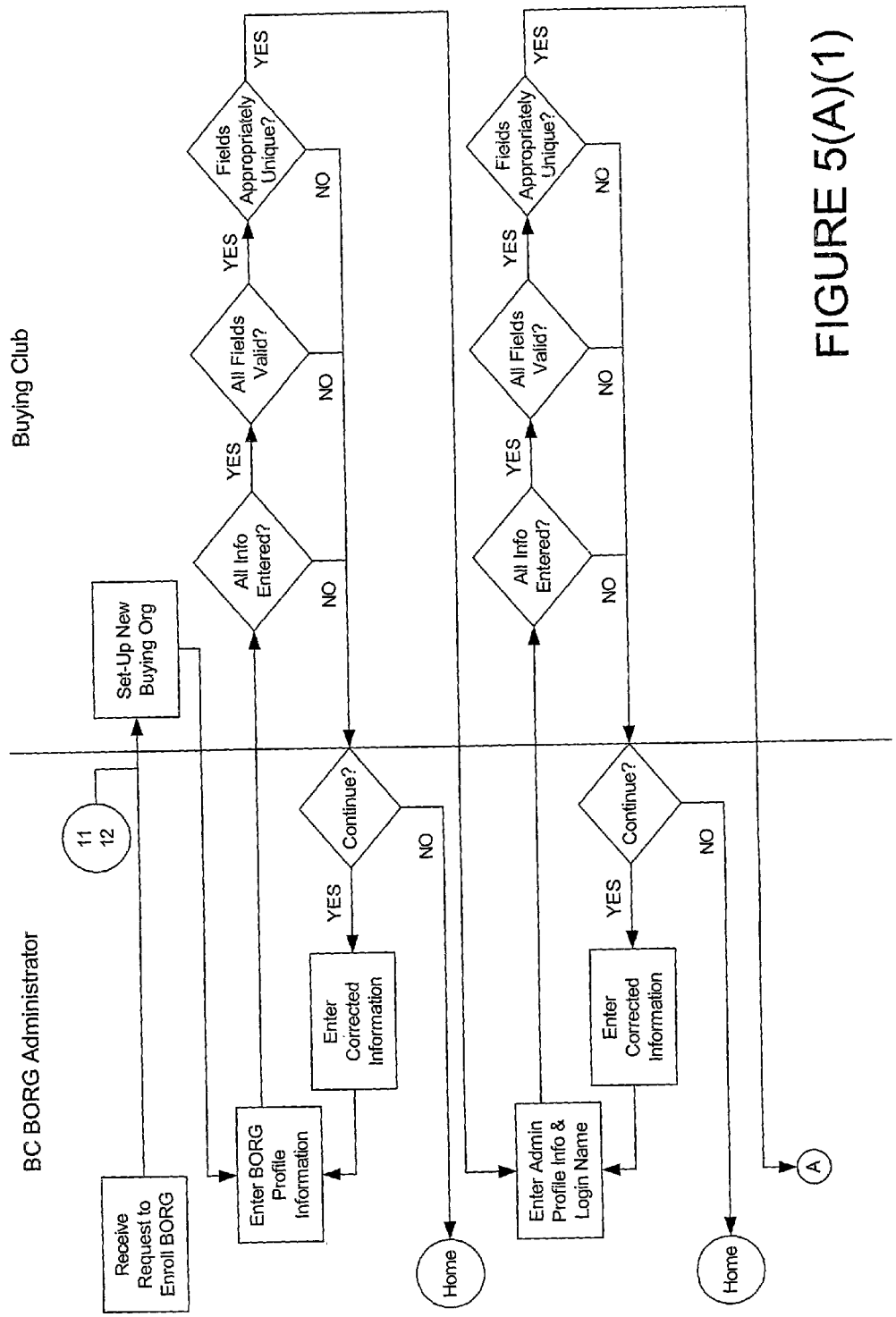

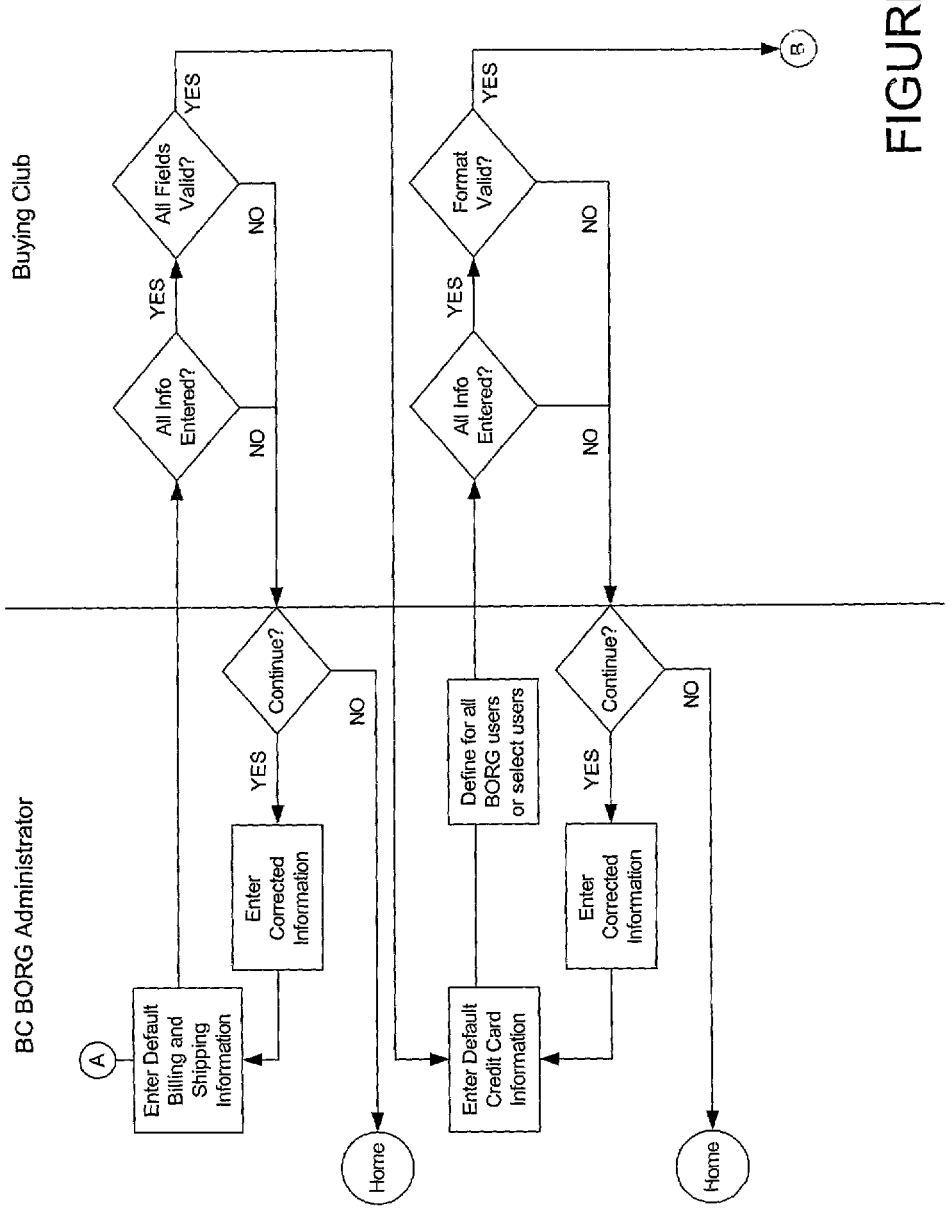
FIGURE 5(A)(2)

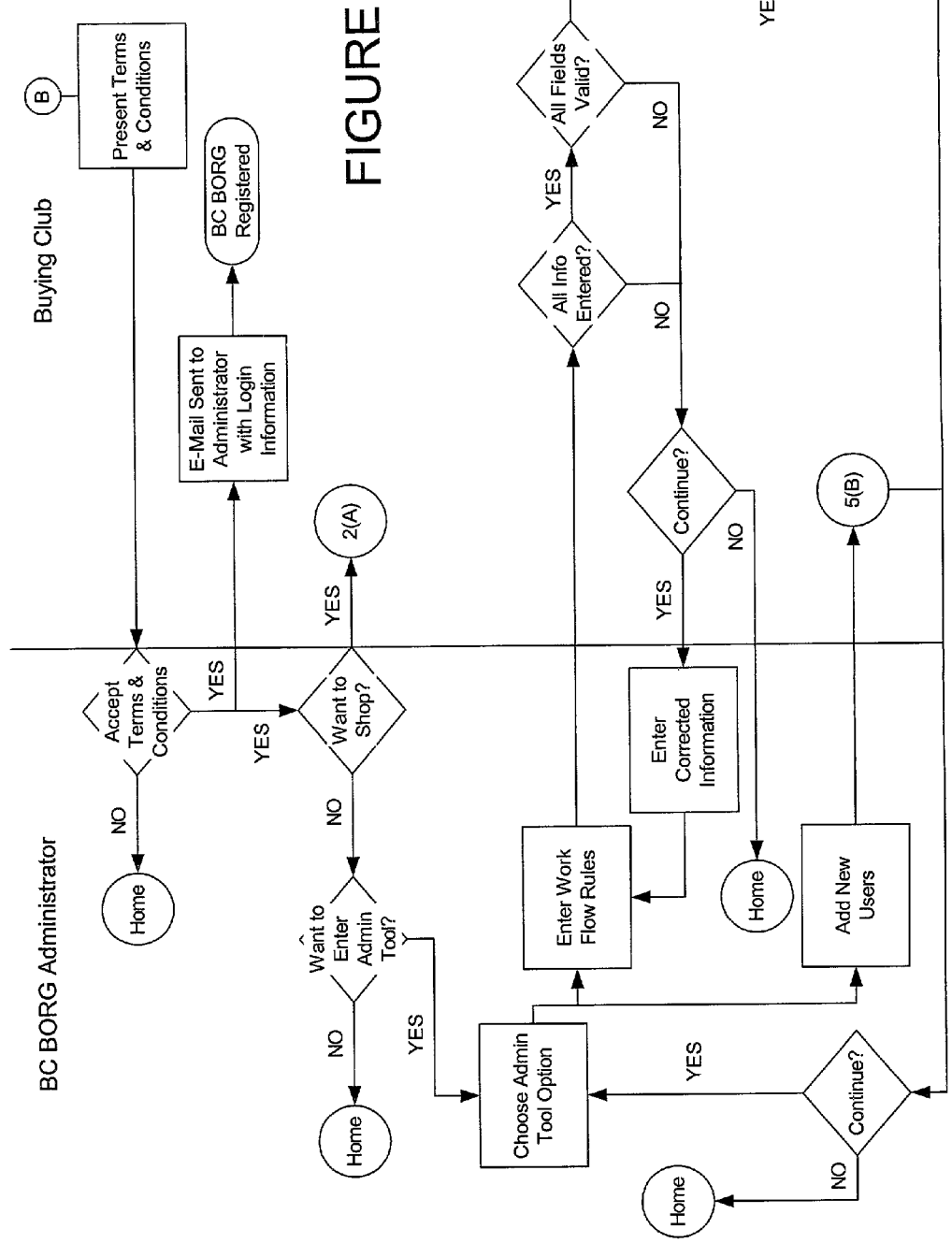
FIGURE 5(A)(3)

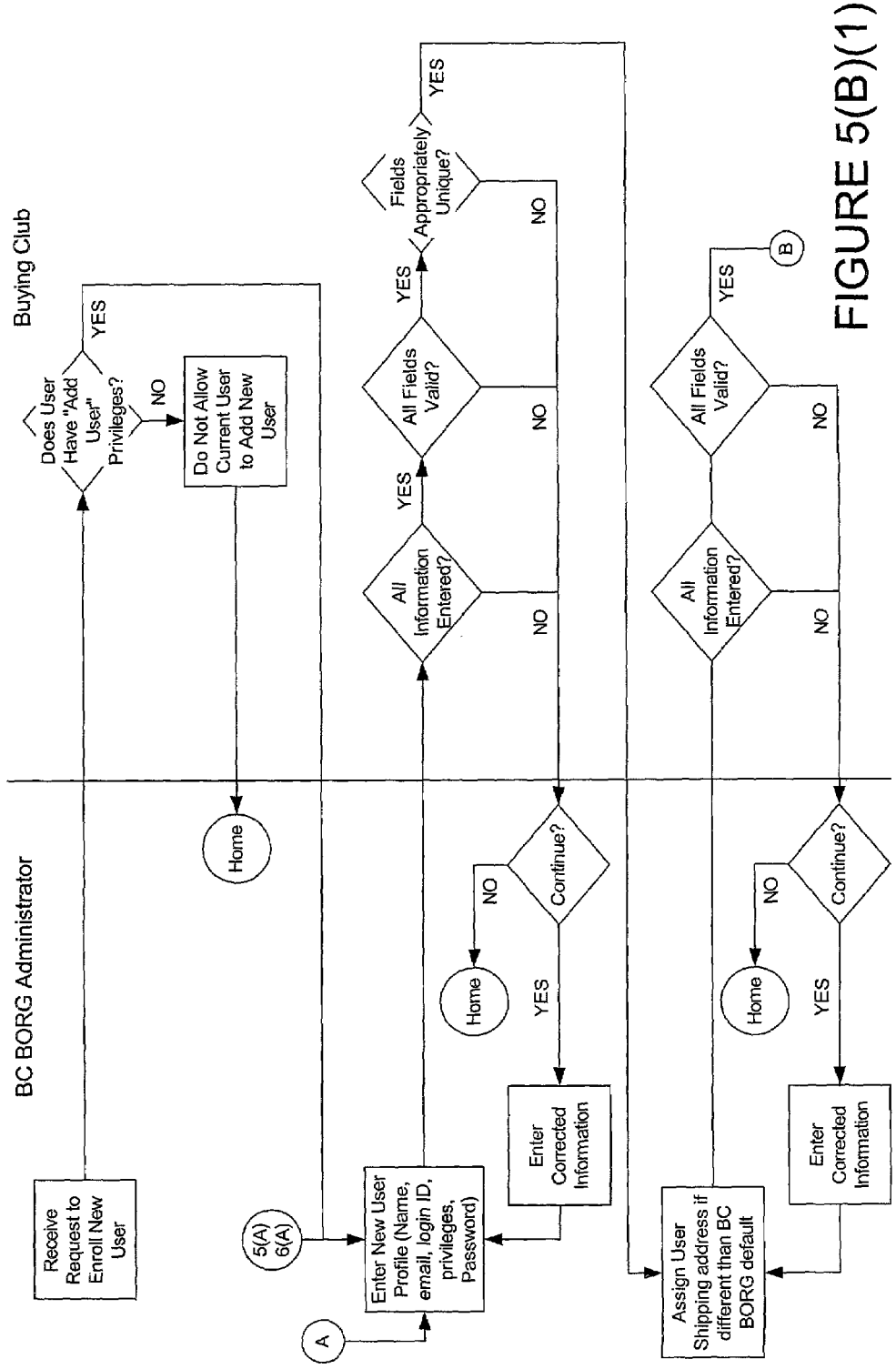
FIGURE 5(B)(1)

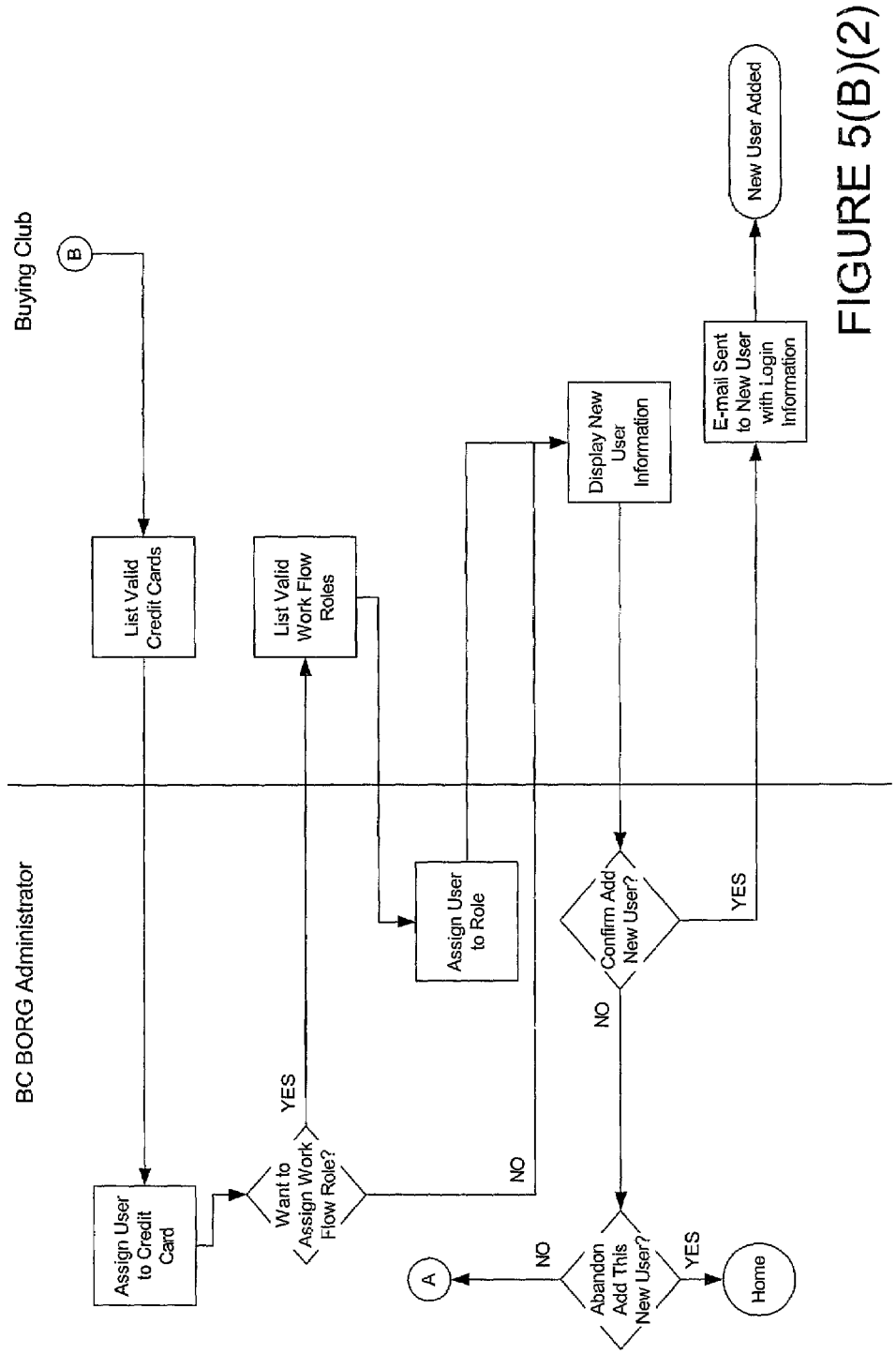
FIGURE 5(B)(2)

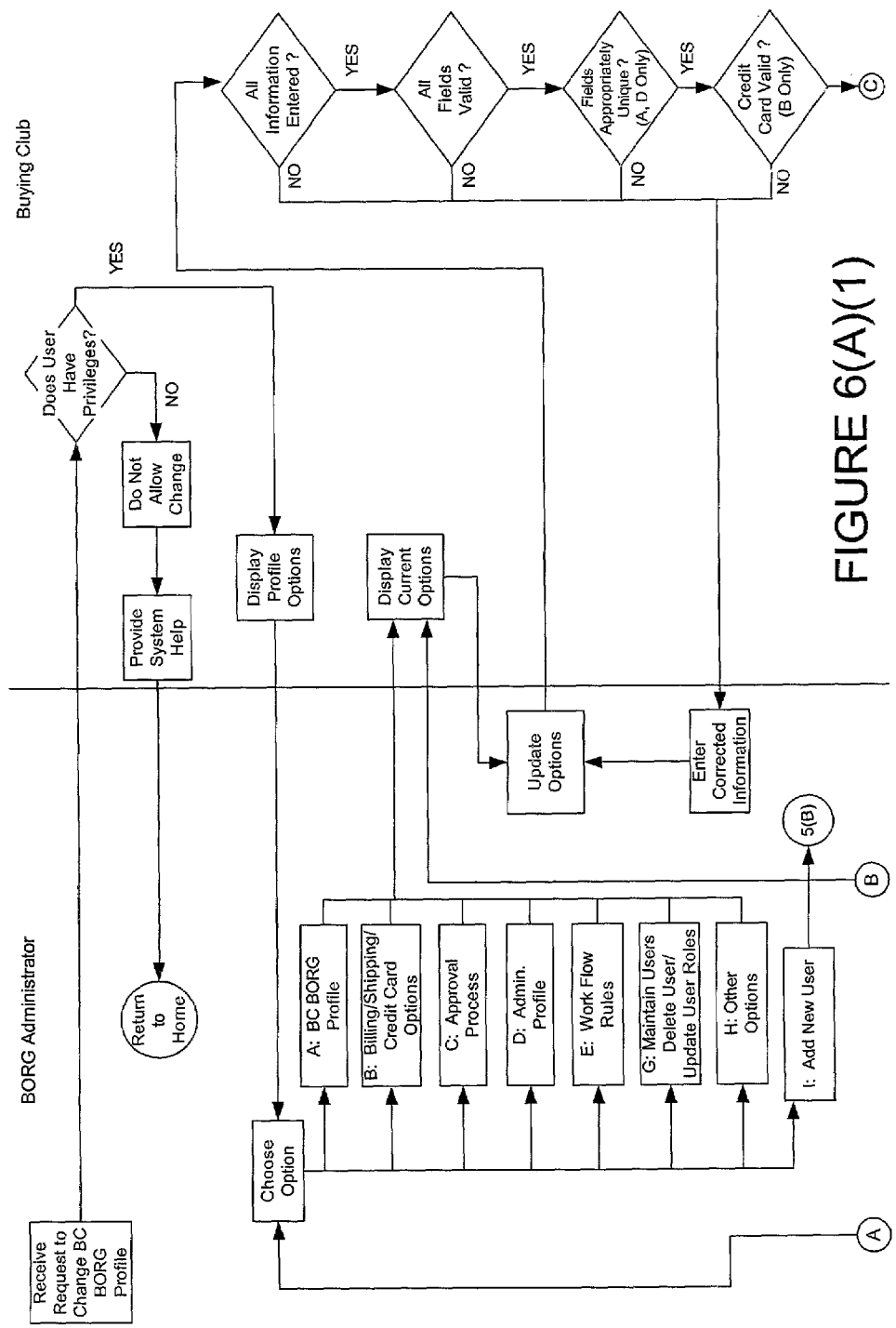
FIGURE 6(A)(1)

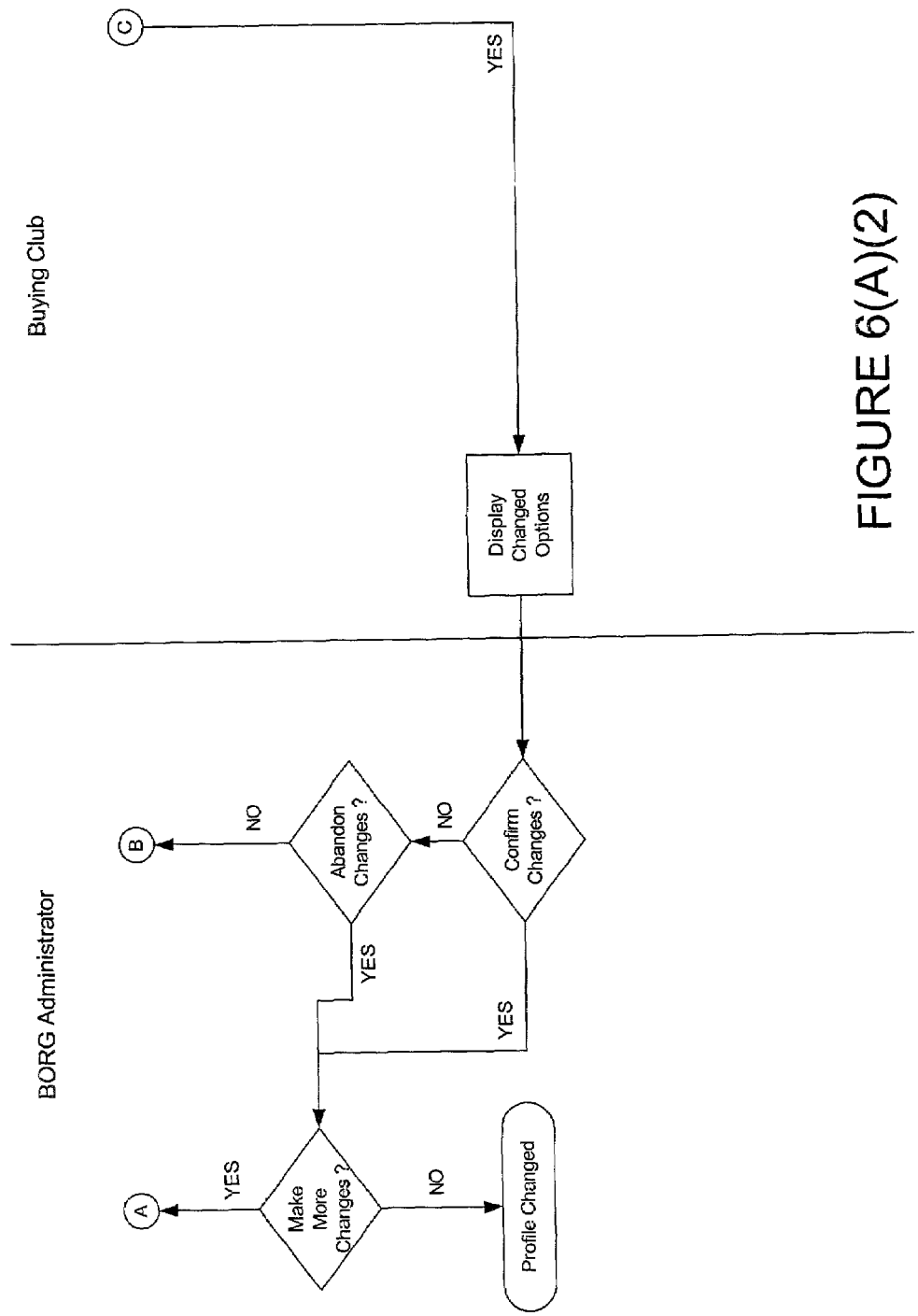
FIGURE 6(A)(2)

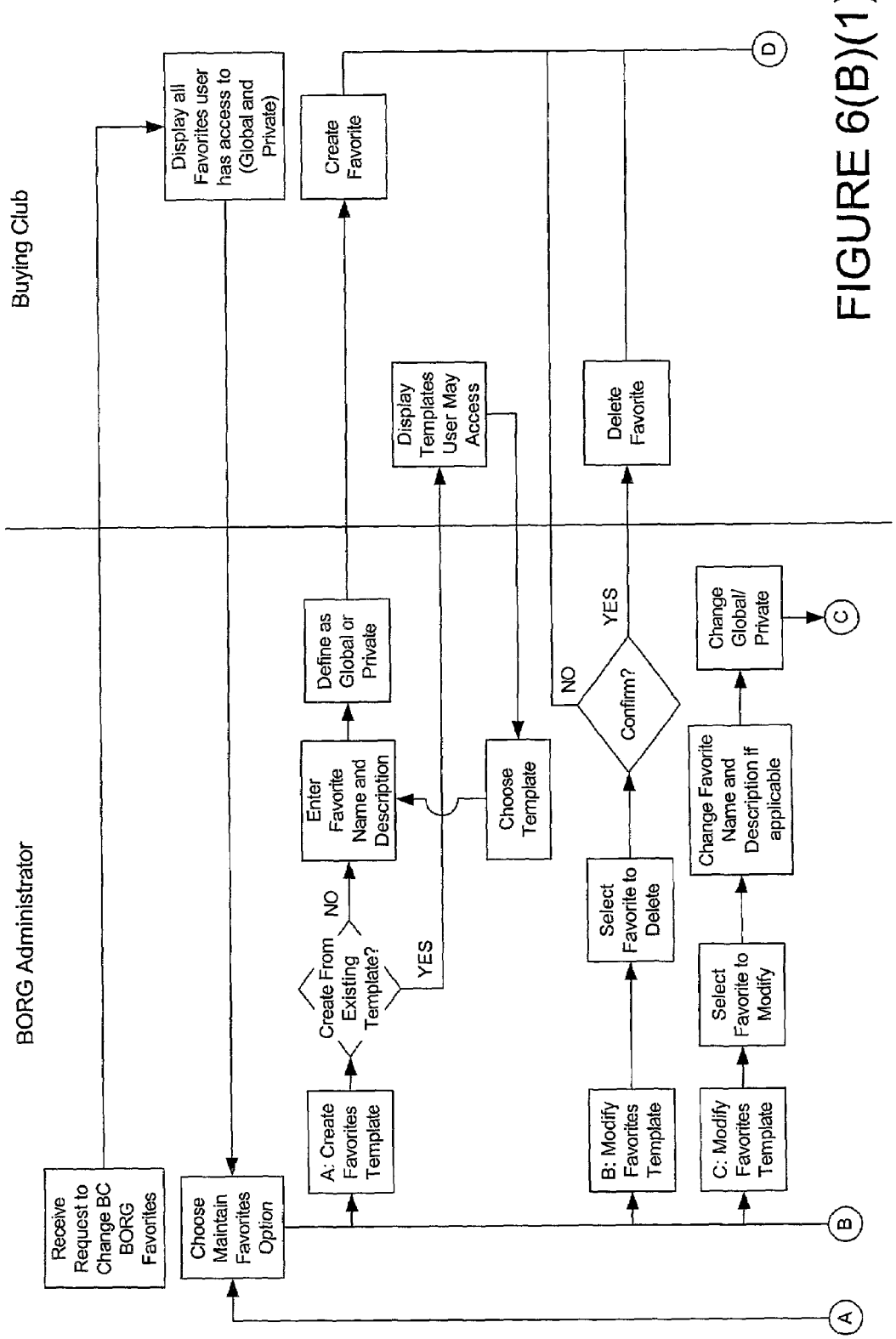
FIGURE 6(B)(1)

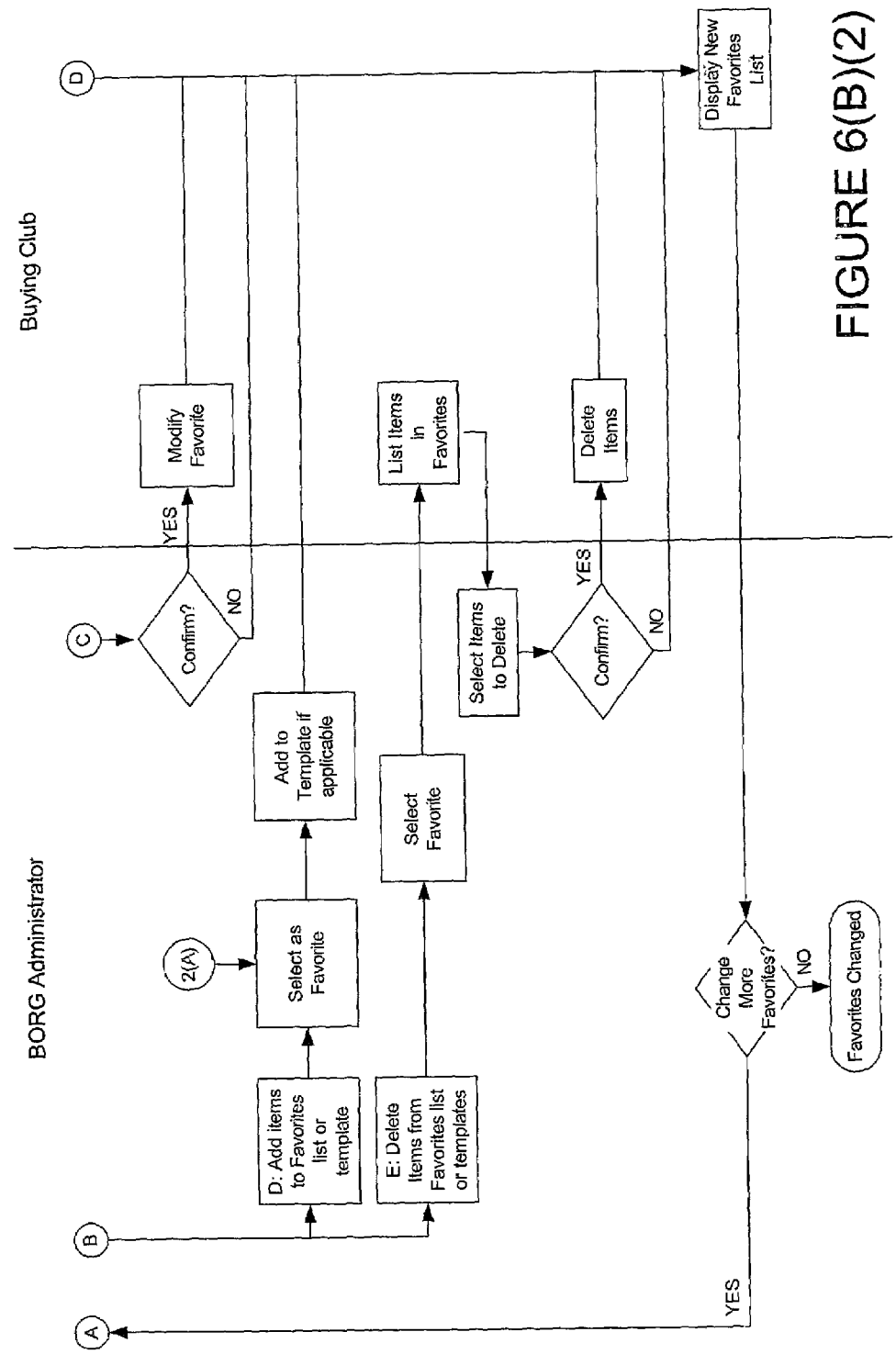
FIGURE 6(B)(2)

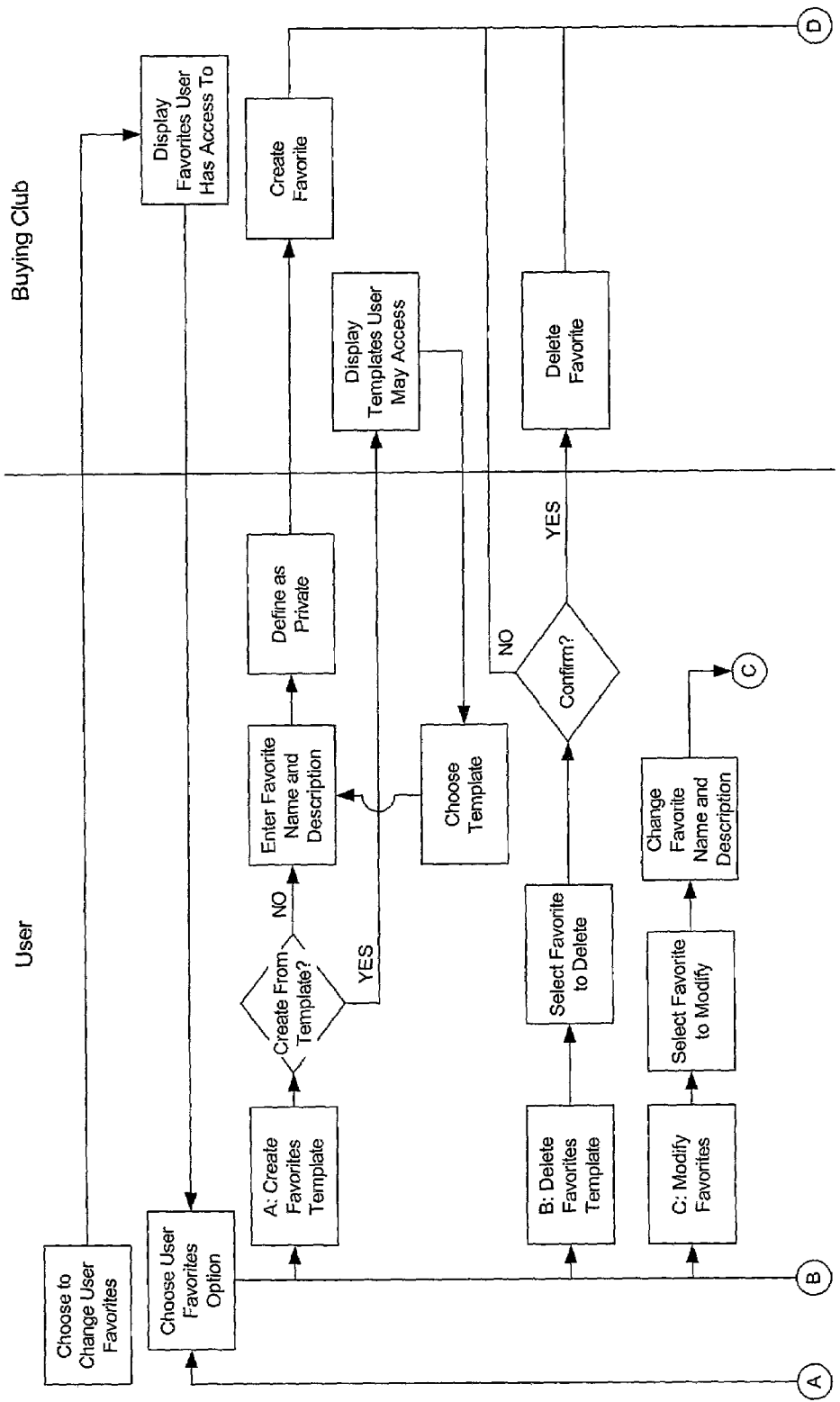
FIGURE 7(B)(1)

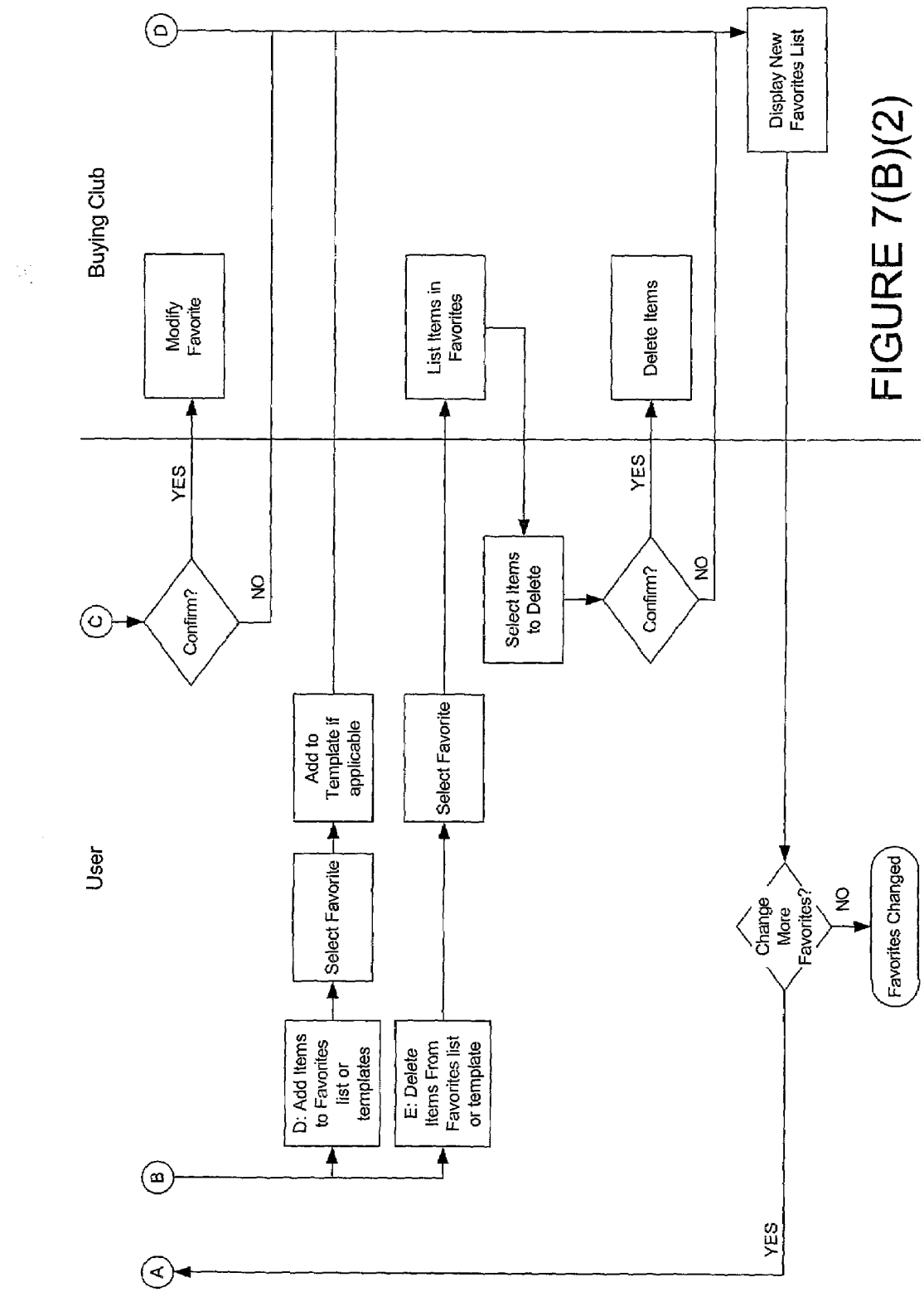
FIGURE 7(B)(2)

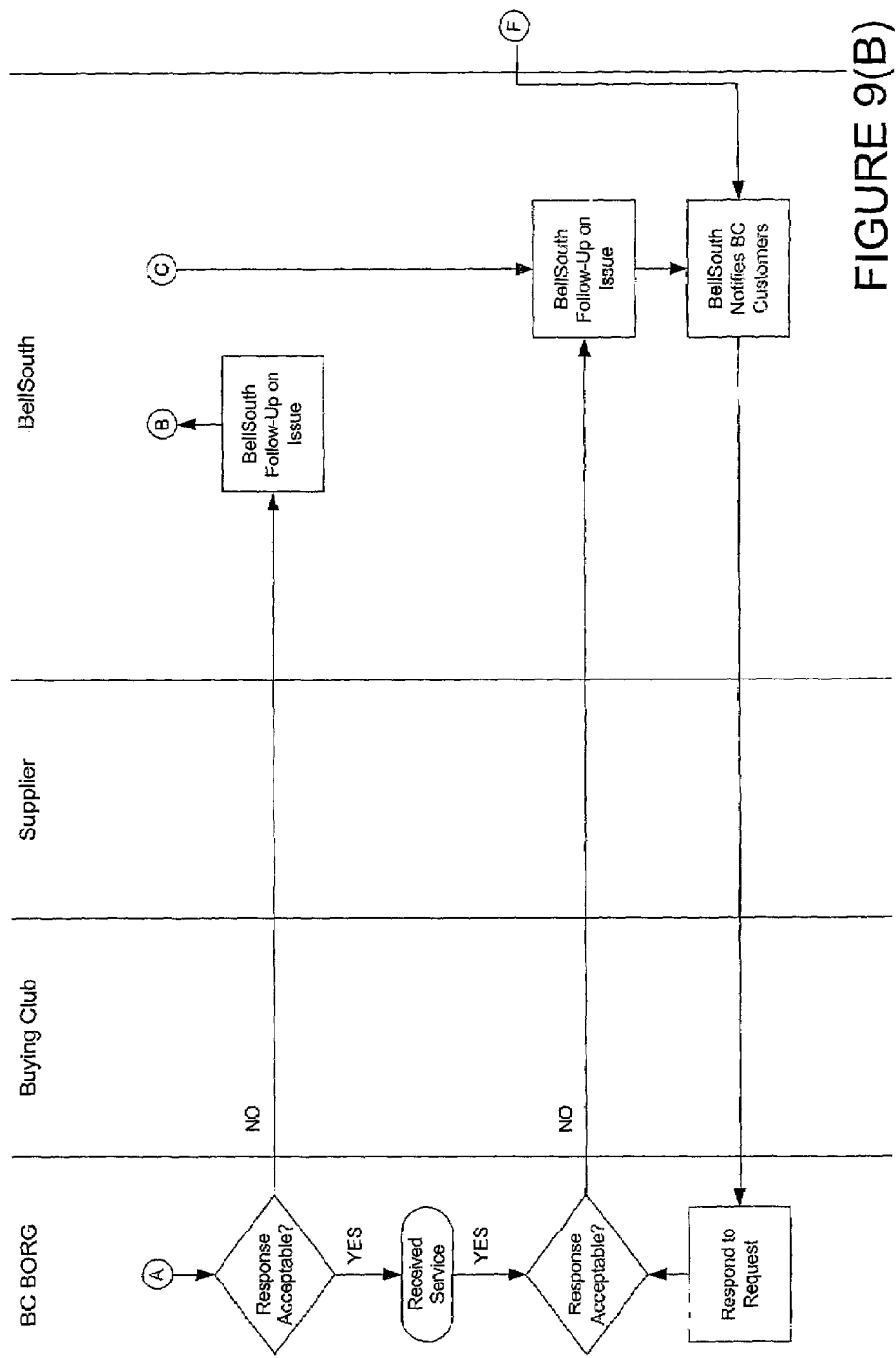

FIGURE 14(C)

SMALL BUSINESS SERVICE BUYING CLUB SYSTEMS AND METHODS

FIELD OF THE INVENTION

The present invention relates generally to systems and methods for use by small businesses in purchasing goods and services.

BACKGROUND OF THE INVENTION

A seller of goods or services often has different prices that it offers to buyers, depending upon who the buyer is and the quantity of items being purchased. For example, for a buyer that purchases large quantities of an item, the seller is often willing to reduce the price per unit, and thus the profit per item, because of the large order. Thus, a company that purchases large quantities of items, such as office supplies, will expect to receive some discounted price. On the other hand, businesses that order small quantities of items do not have the purchasing power to demand any discounted price. These businesses therefore are forced to pay full price for those items.

Because of these volume discounts, many of the larger corporations are able to obtain reduced rates for the goods and services that they purchase during the ordinary course of business. For example, a large company such as BellSouth may not only automatically receive a discounted price but may be able to receive bids from competing sellers and negotiate an optimal price for the items. In fact, many large businesses enter into supply contracts with various sellers, such as sellers of office supplies. While large businesses may enjoy volume discounts, small businesses are typically unable to obtain anything other than the standard price. Often, these small businesses by themselves, do not purchase sufficient quantities of items for the seller to offer any discount.

Even though orders from small businesses may comprise the bulk of a company's business, much of the efforts by a seller are directed to the large businesses. A seller can more easily focus its efforts on selling its goods and services to a limited number of large businesses than it can with a multitude of smaller businesses. In other words, a seller has a certain amount of time and money that it can devote toward marketing its goods and services directly with other businesses and, given the potential for supplying large quantities of items over an extended period of time, the seller directs its attention to the larger customers. The sellers simply do not have the resources to market themselves directly with every small business in its area.

A need therefore exists for systems and methods that provide greater purchasing power to small businesses. A need furthermore exists for systems and methods that increase the effectiveness of a seller's marketing efforts to small businesses.

SUMMARY OF THE INVENTION

The present invention addresses the problems described above by providing systems and methods that allow buyers to aggregate their purchases in order to obtain discounted prices from suppliers. A system according to a preferred embodiment of the invention allows buyers to browse items available for sale and to select items to purchase. The suppliers providing the items for sale factor in the volume of items being sold through the system and provide a volume discount to each of the buyers. Small businesses and other buyers are therefore able to enjoy volume discounts that they may not have been able to obtain on their own. The suppliers benefit from this relationship as well since they are able to address a large audience of small businesses and other buyers at a reduced cost and improved efficiency than if the supplier had to contact each buyer individually. The system allows for more efficient operation to both the buyer and seller, increased revenue to the seller, reduced cost to both the buyer and seller, and a more accurate process to the buyer and seller.

Preferably, an entity that operates the system is one that has already formed relationships with many of the small businesses and other buyers and possibly even with one or more of the suppliers. This operating entity is able to enjoy the same or equal discounts provided to the buyers on items available through the system. The operating entity may receive additional revenue through enrollment fees, membership fees, transaction fees, advertising revenue, or rebates based on sales to each supplier. The operating entity preferably comprises a telecommunication service provider, such as one that provides local, long distance, wireless, or data services to small businesses. The operating entity, however, may comprise any other type of entity, such as but not limited to an entity that provides power, natural gas, or water.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings:

FIG. 1 is an example of a block diagram of a network according to a preferred embodiment of the invention;

FIGS. 2(A) to 2(E) are process flow diagrams for browsing, checking out, updating orders, approving orders, and monitoring orders through a system shown in FIG. 1;

FIGS. 4(A) to 4(C) are process flow diagrams for receiving payment, performing reconciliation, and sending payments through the system;

FIGS. 5(A) and 5(B) are process flow diagrams for registering and adding users to the system;

FIGS. 6(A) and 6(B) are process flow diagrams for changing an organization's profile and favorites;

FIGS. 7(A) and 7(B) are process flow diagrams for changing user profiles and changing user favorites;

FIGS. 14(A) to 14(D) are exemplary interfaces for allowing users to register with the system;

DETAILED DESCRIPTION

Figure 2A:
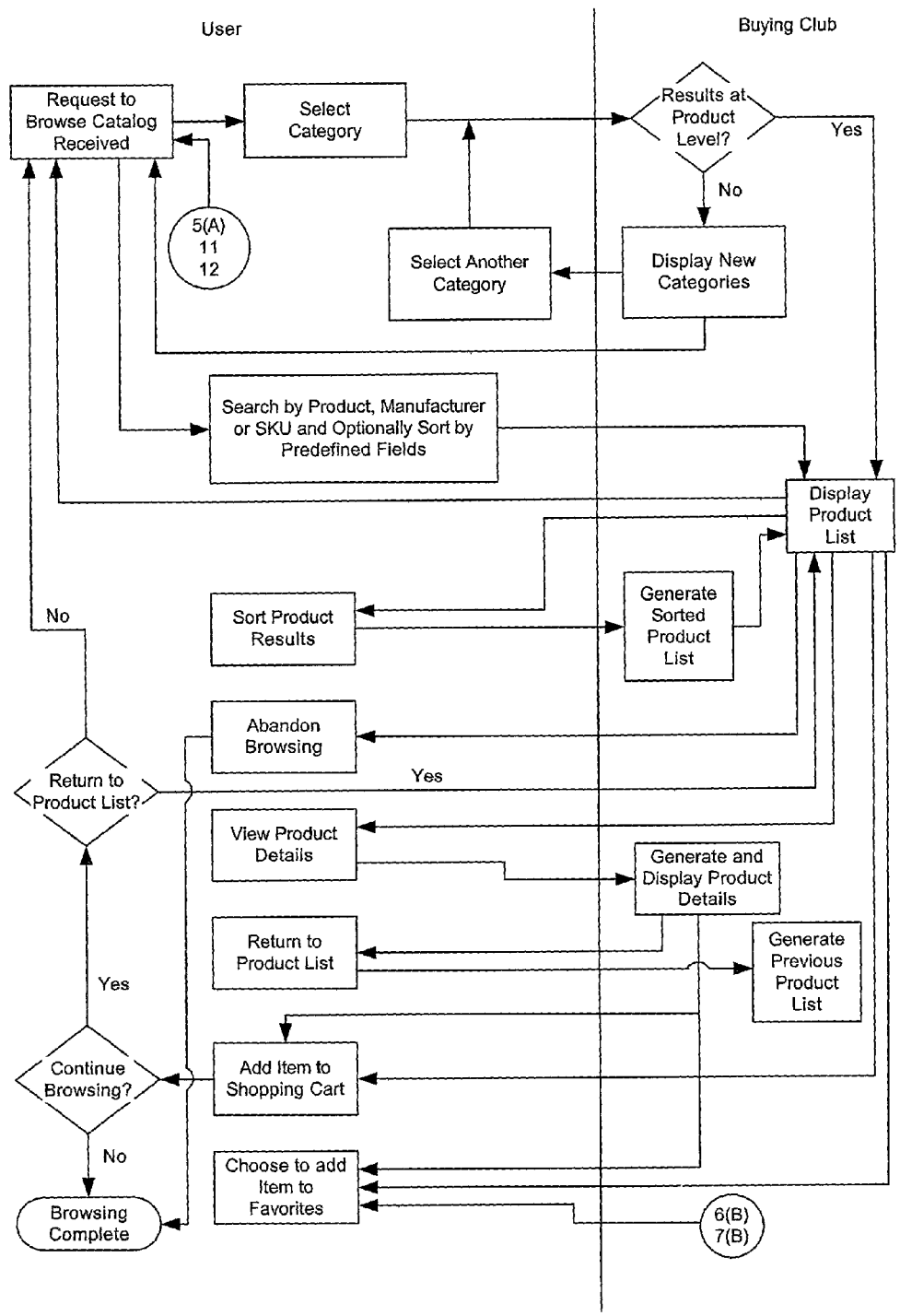

Reference will now be made in detail to preferred embodiments of the invention, non-limiting examples of which are illustrated in the accompanying drawings.

I. Overview

Systems and methods according to the invention provide a way for small businesses and other buyers to obtain discounts on their orders in light of a volume of orders collectively made by all buyers. The systems and methods benefit suppliers in that they can address a large audience of small businesses and other buyers, thereby increasing the effectiveness of their marketing efforts. In the preferred embodiment, the buyers are able to purchase items over the Internet and receive a volume discount price for those items. Additional details of the invention are set forth in the description below.

II. System Diagram

A network diagram according to a preferred embodiment of the invention is shown in FIG. 1. The network includes a Small Business Buying Club System ("SBBC system") 10 connected between a plurality of buyers 5 and a plurality of suppliers 15. The buyers 5 can use any type of device, such as but not limited to digital televisions, enhanced televisions, WebTV, any other type of interactive television, desk-top computers, lap-top computers, Palm Pilot, PocketPC, Visor, any other type of Personal Digital Assistants, Internet appliances, data devices, mobile radiotelephones, WAP-enabled phone, interactive pagers, or any other type of communication device to connect and/or to communicate with the system 10.

The suppliers 15, as will be more apparent from the description below, can provide any type of good or service. Furthermore, the suppliers 15 may correspond to the sellers, resellers, distributors, or manufacturers of the items. For the purposes of this description, goods and services will be generically called items. The suppliers 15 may connect with the SBBC system 10 in any suitable manner and with any suitable device, including those discussed above with reference to the buyers 5. For example, the suppliers 15 may operate separate systems and may exchange data with the SBBC system 10, such as through XML. The suppliers 15 may have some or all of its system incorporated with the SBBC system 10. Some examples of suppliers 15 include sellers of office supplies, information technology hardware and software, telecommunications equipment, furniture, vending, temporary staffing services, copy services, stationary, printing, mail and fax services, florists, insurance providers, appliances, vending supplies, maintenance and janitorial services, and uniforms.

In the preferred embodiment, the SBBC system 10 is preferably implemented on behalf of an entity that already has relationships with both suppliers 15 and the buyers 5. For example, a large company may already have established relationships with a supplier 15 of office supplies and IT hardware and software and may have a large number of buyers 5 as its customers. An entity that has relationships with a large number of small businesses 5 is a preferred type of entity since small businesses 5 may enjoy the greatest benefit from the SBBC system 10. Some examples of such entities include providers of wireless service, Internet service, local telephony service, long distance service, leasing and other real estate services, licensing and other government services, electric power providers, natural gas providers, and any utility company.

III. Process Flow

An exemplary set of process flow diagrams will now be described with reference to FIGS. 2 to 12. These process flow diagrams illustrate one way in which the systems and methods of the invention may be implemented. It should be understood that the systems and methods according to the invention may be implemented in other ways than depicted in these figures and may include additional, fewer, or altered steps.

Figure 2B:
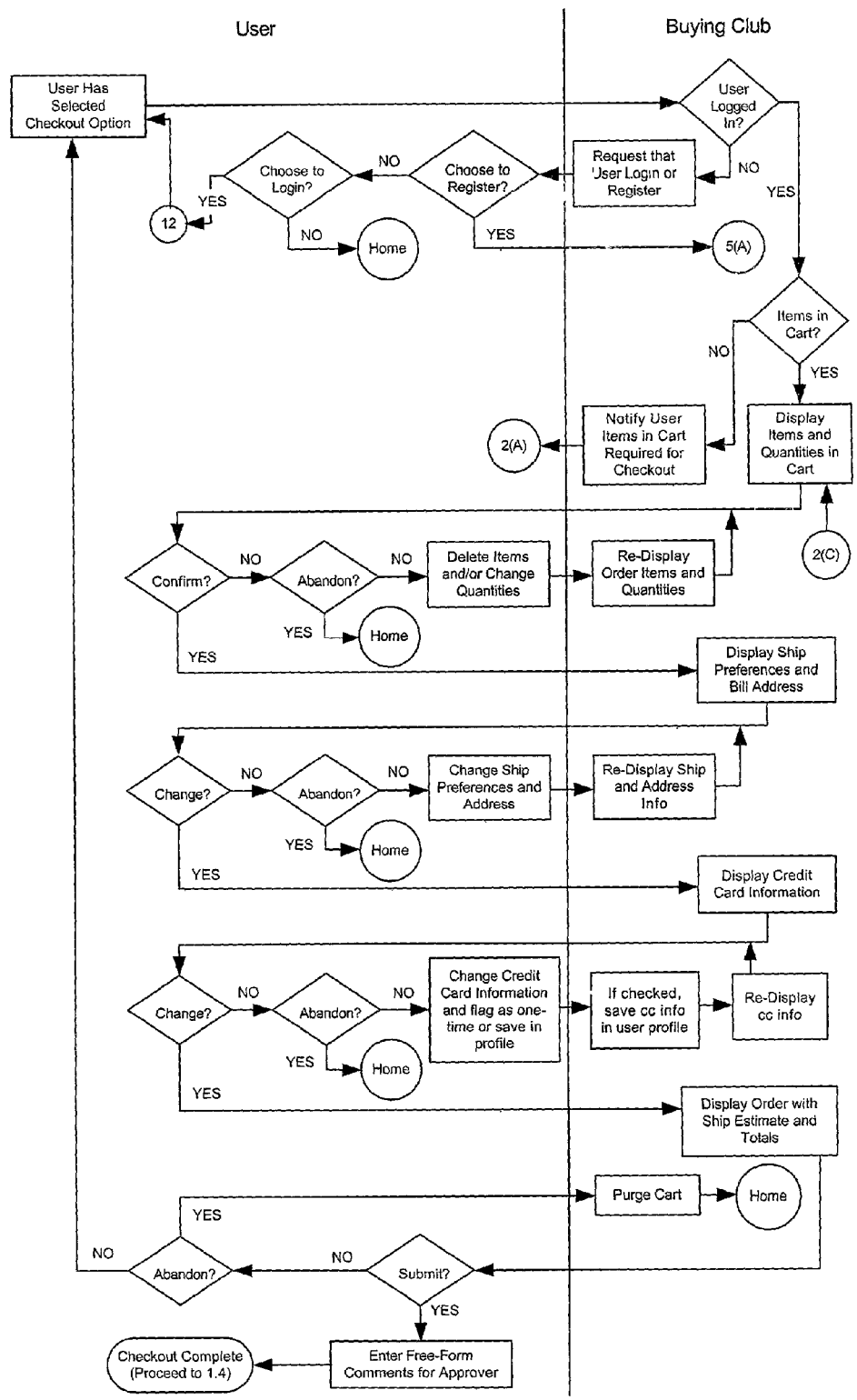
Figure 2C:
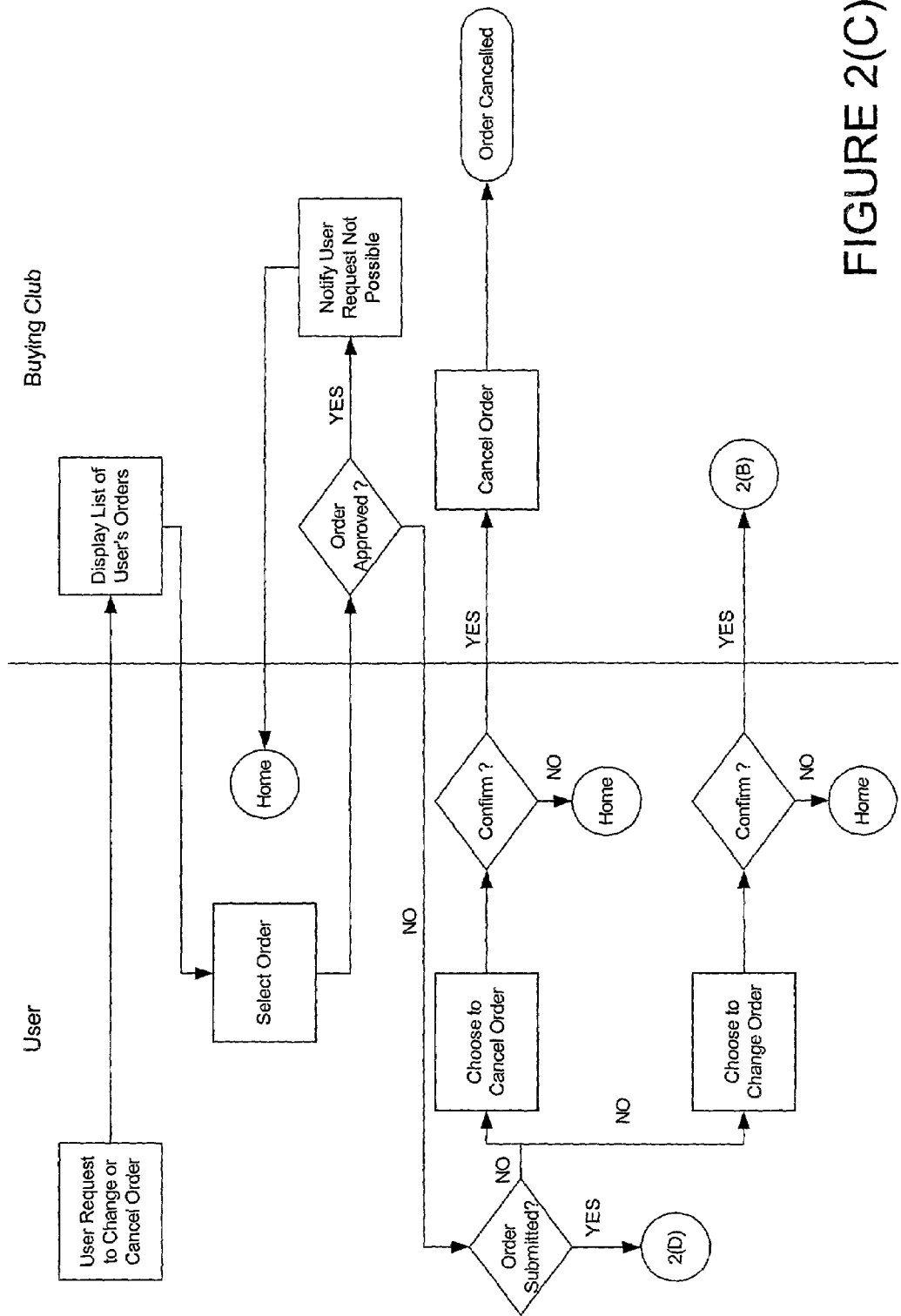
Figure 2E:
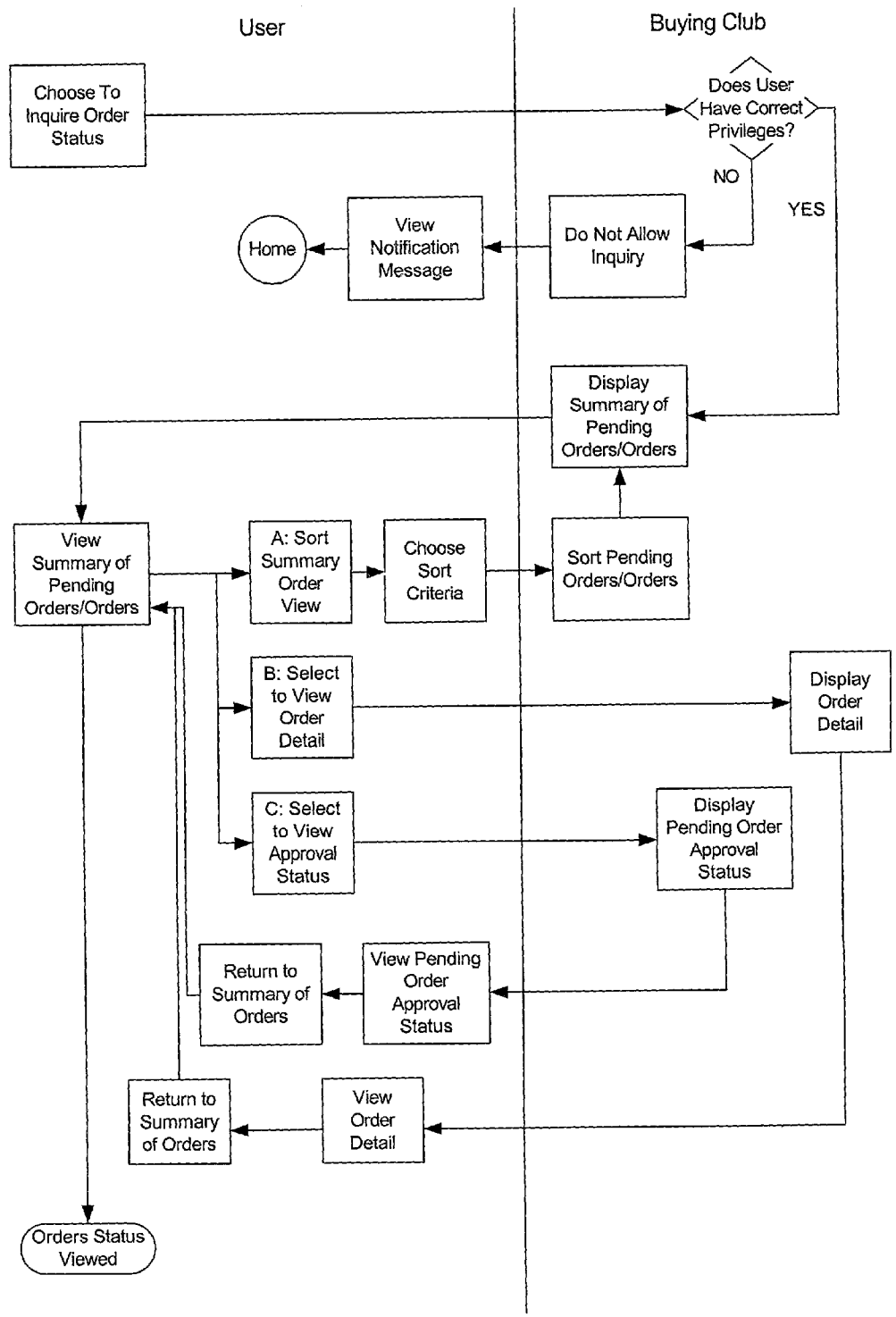

FIGS. 2(A) to 2(D) illustrate process flow diagrams on browsing a catalog, checking out, changing or canceling an order, approving an order, and monitoring an order. With reference to FIG. 2(A), a buyer 5 can browse a catalog by category or by product, manufacturer or SKU, and optionally sort by predefined fields. When searching by category, the system 10 can display sub-categories and allow the buyer 5 to select such more detailed sub-categories until the buyer 5 drills down to a listing of products. With either search method, the system 10 provides the buyer 5 with lists of products and enables the buyer 5 to continue browsing, to view product details, to add items to a shopping cart, to select items as favorite items, or to abandon browsing. As shown in FIG. 2(B), the checkout process requires the buyer 5 to login before a transaction can be completed. During the checkout process, the system 10 allows the buyer 5 to confirm or alter selected items, confirm or alter shipping information, confirm or alter credit card information, and to enter comments for an approver, if one is necessary. A process of changing or canceling an order is shown in FIG. 2(C) and allows a buyer 5 to cancel an order prior to it being approved or submitted. FIG. 2(D) illustrates a process flow diagram for approving an order and facilitates communication between a purchaser at the buyer 5 and one or more approvers at the buyer 5. The approval process shown in FIG. 2(D) can accommodate multiple suppliers and generate purchase orders for each supplier 15. FIG. 2(E) illustrates a process flow diagram for monitoring an order which allows a buyer 5 to view pending orders, details of the orders, to sort through the orders, and to view status of the orders.

Figure 3:
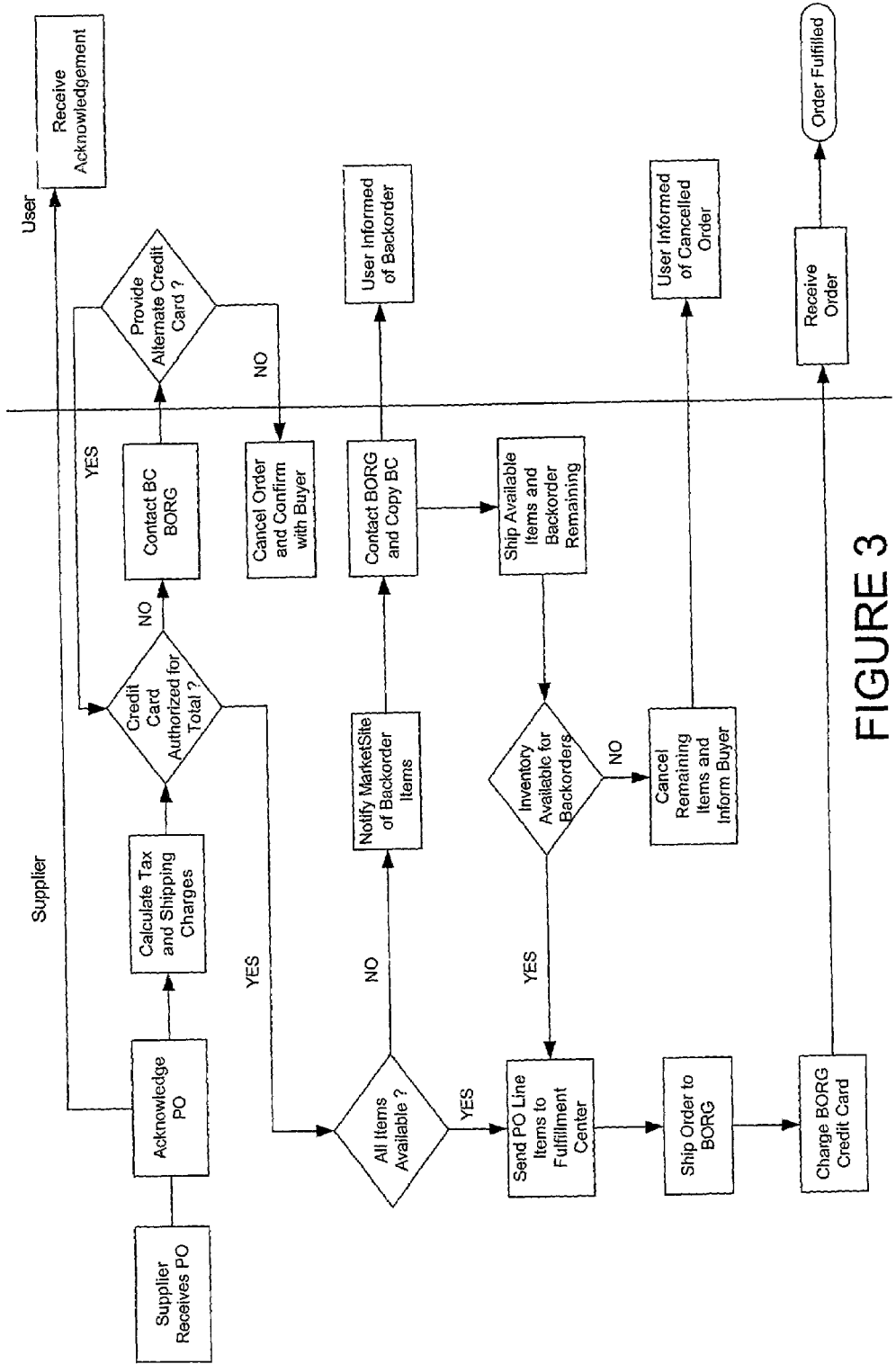
FIG. 3 is a process flow diagram of fulfilling an order through the system.

FIG. 3 is an example of a process flow diagram for fulfilling an order. This process flow involves receiving a purchase order, calculating total charges, authorizing the buyer's credit card, checking availability of items, sending purchase orders to a fulfillment center at the supplier 15, shipping orders, and charging credit cards. As shown in this diagram, the fulfillment order process flow also involves facilitating communications between the supplier 15 and buyer 5, such as informing the buyer 5 of back orders, cancelled orders, and received orders.

Figure 4C:
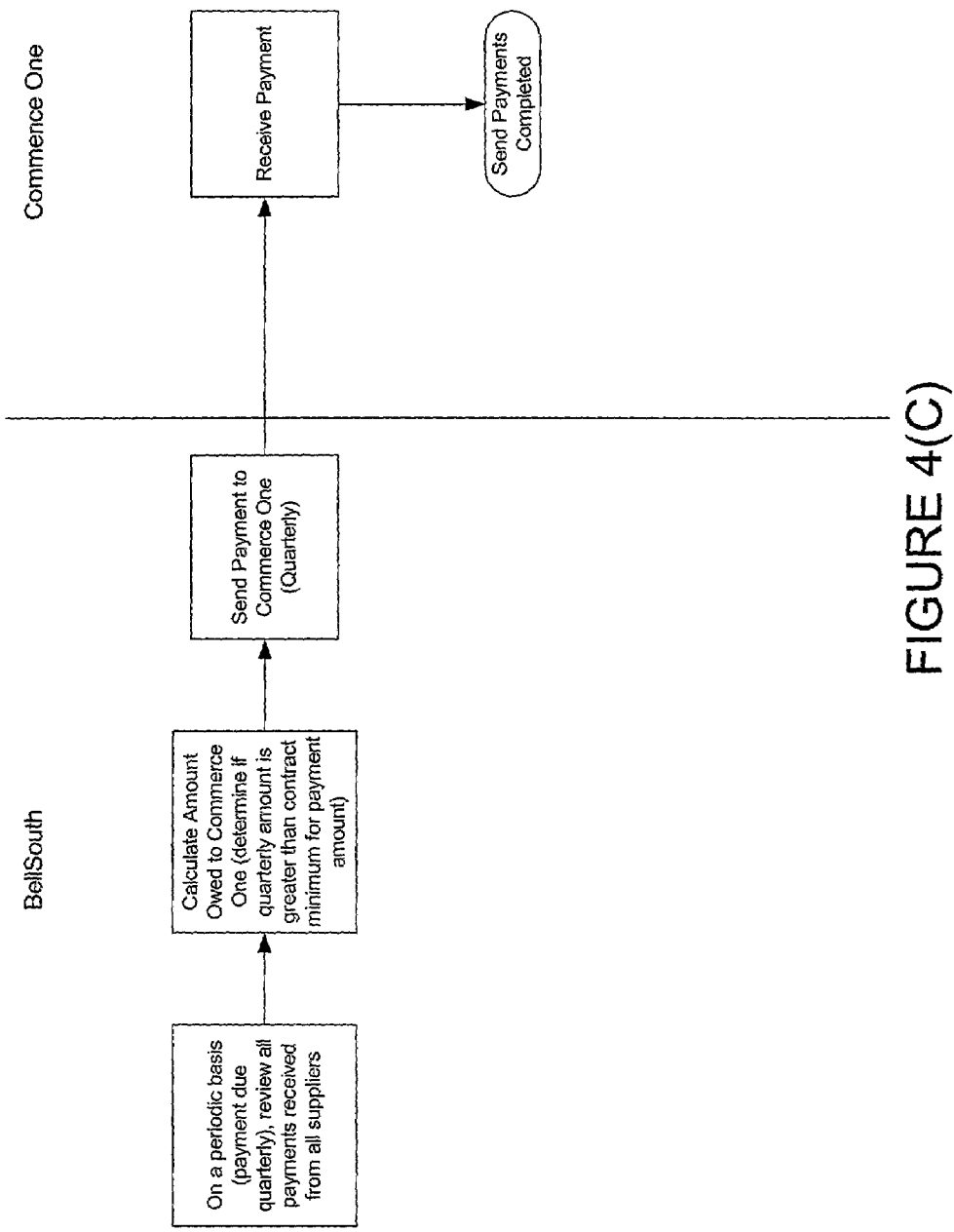

FIGS. 4(A) to 4(C) illustrate process flow diagrams for processing payments. FIG. 4(A) is a process flow diagram of receiving payments from a supplier 15. This payment is received by the entity operating the system 10, which in this example is BellSouth. On a periodic basis, a payment owed to the operating entity is calculated based on total sales factoring in returns. FIG. 4(B) illustrates a process flow of performing reconciliation between sales made by the supplier 15 and payments already provided to the operating entity. The process flow includes generating a list of orders on a monthly basis and calculating an amount owed to the operating entity. This amount owed is compared to amounts already received to identify discrepancies. The operating entity can then notify supplier 15 of such discrepancies, obtain a credit or charge from the supplier 15, or negotiate with the supplier 15. FIG. 4(C) illustrates a process flow diagram between the operating company, which in this example is BellSouth, and a technology company which may provide software and/or hosting capability for the system 10, which is in this example is Commerce One. For the purposes of this description, this technology company will be referred to as the hosting entity. The process flow diagram shown in FIG. 4(C) involves calculating on a periodic basis the amount owed to the hosting entity and providing that payment to that entity.

FIGS. 5(A) and 5(B) are exemplary process flow diagrams for registering with the system 10 and adding new users. With reference to FIG. 5(A), an entity referred to as "BORG" is a buying organization and "BC" refers to a buying club associated with the system 10. The process of registering involves entering the buying organization's profile information, the administrator's profile information and login name, billing and shipping information, and credit card information. The process of adding users, as shown in FIG. 5(B), involves signing privileges to the users, entering user profile information, assigning shipping addresses to the users, and assigning credit cards to the users.

FIGS. 6(A) and 6(B) illustrate process flow diagrams for changing a buyer organization's profile and favorites, respectively. As shown in FIG. 6(A), a buyer 5 can alter the profile, billing, shipping and credit card information, an approval process, administrative profile, work flow rules, user information, as well as other options. With reference to FIG. 6(B), changing favorites involves changing a favorites template and adding, deleting, or altering favorites listed in the template.

Figure 7A:
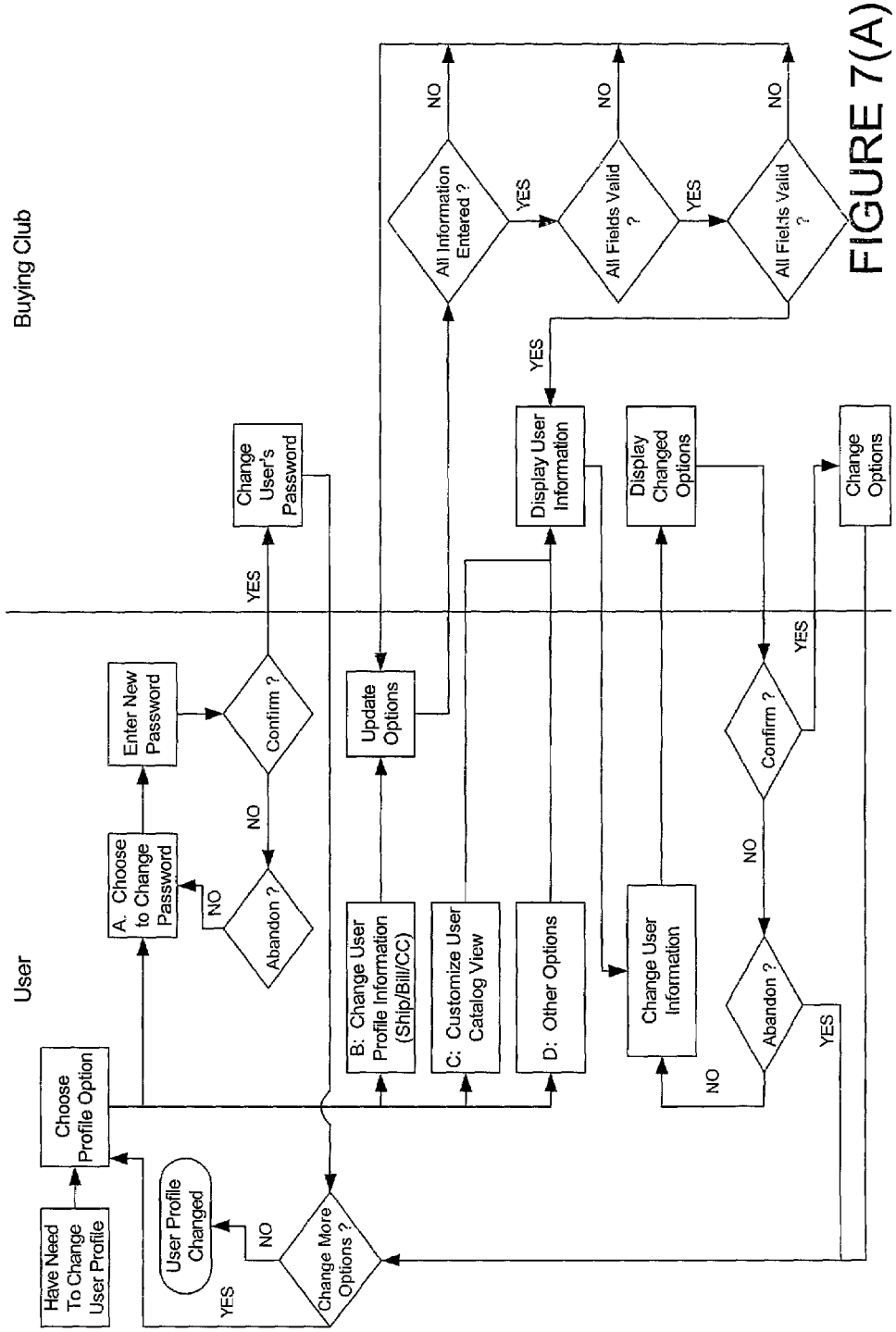

FIGS. 7(A) and 7(B) illustrate process flow diagrams for changing a user profile and user favorites. With reference to FIG. 7(A), changing a user profile allows a user to change passwords, user profile information, customized catalogs, as well as other user information. With reference to FIG. 7(B), changing user favorites allows a user to change favorite templates as well as adding, deleting, and altering favorites listed for that user.

Figure 8:
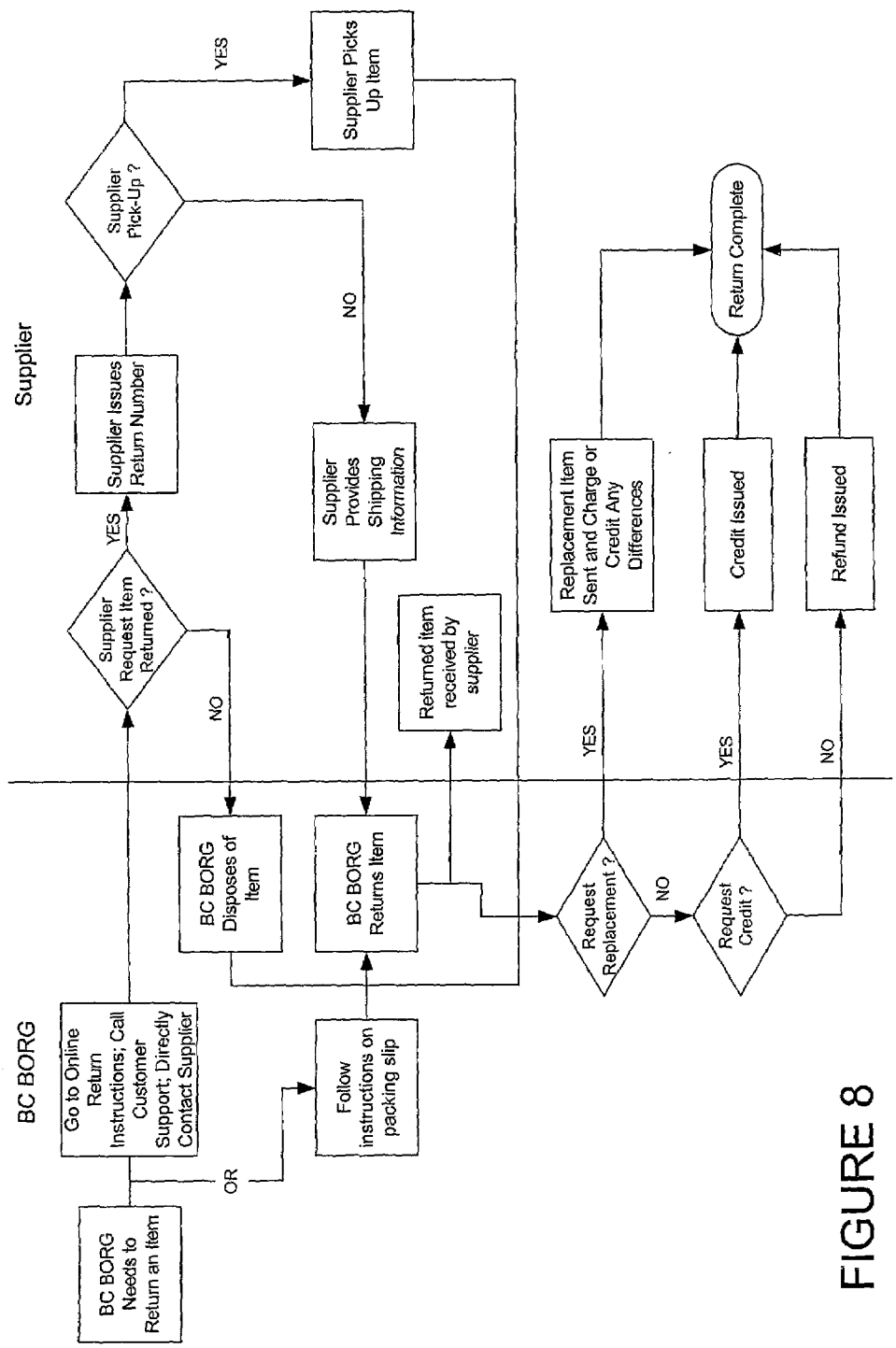
FIG. 8 is a process flow diagram for returning goods.

FIG. 8 is an example of a process flow diagram of returning goods. This process flow diagram contemplates picking up items, shipping items, replacing items, and crediting buyers for the cost of the items.

Figure 9A:
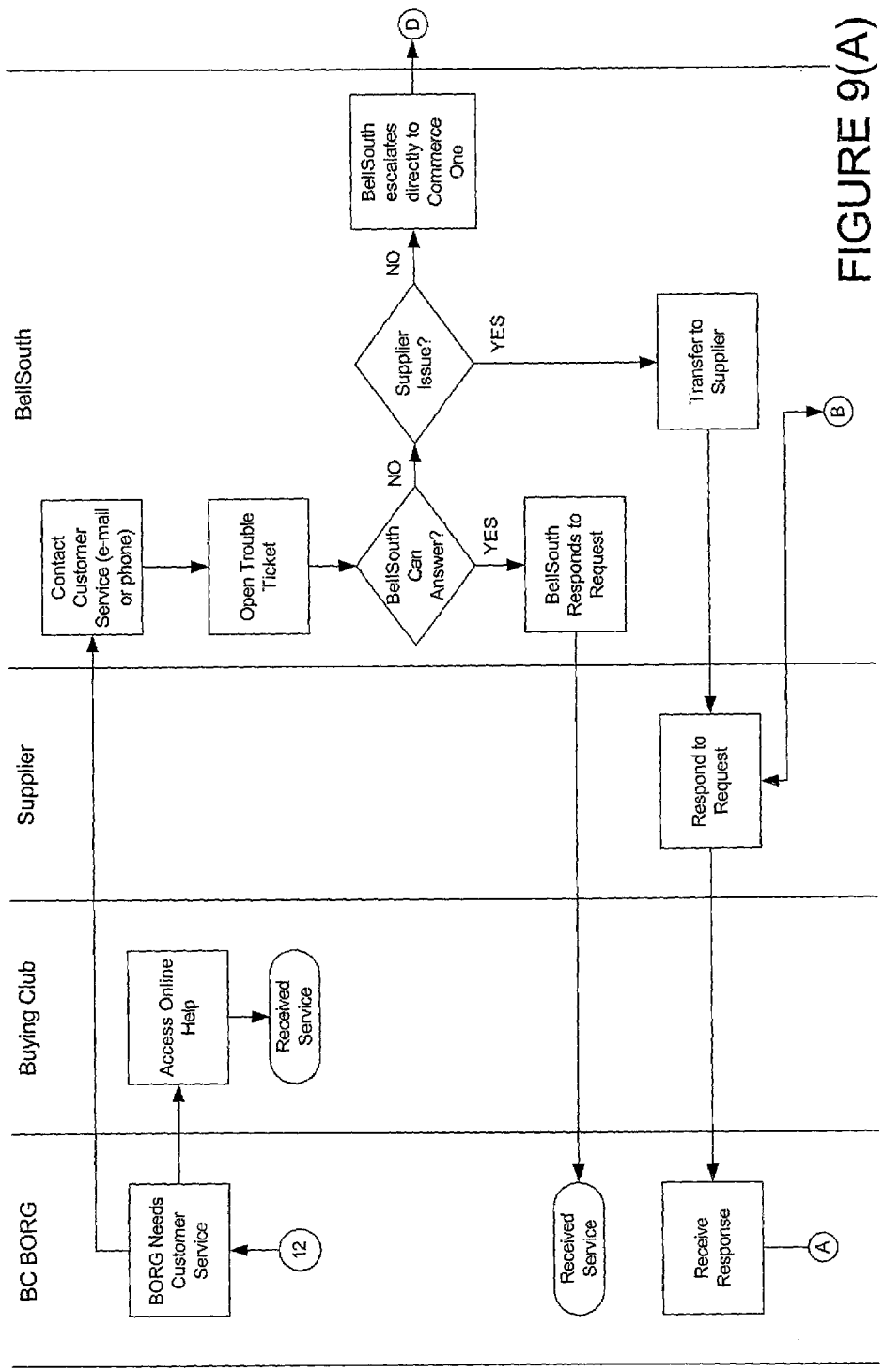
FIG. 9 is a process flow diagram for obtaining customer service.
Figure 9C:
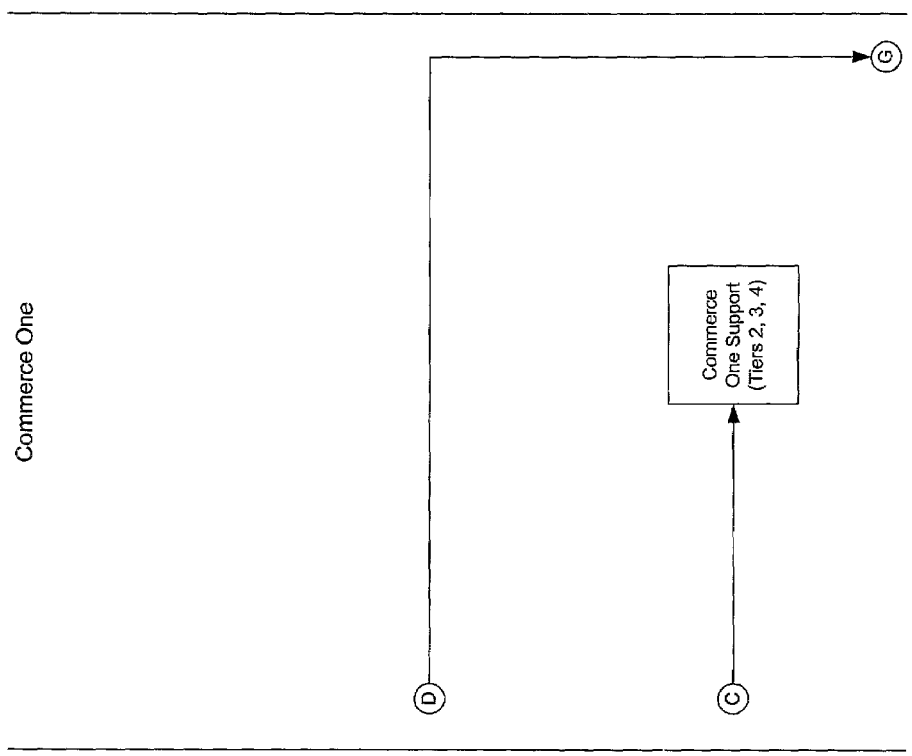
Figure 9D:
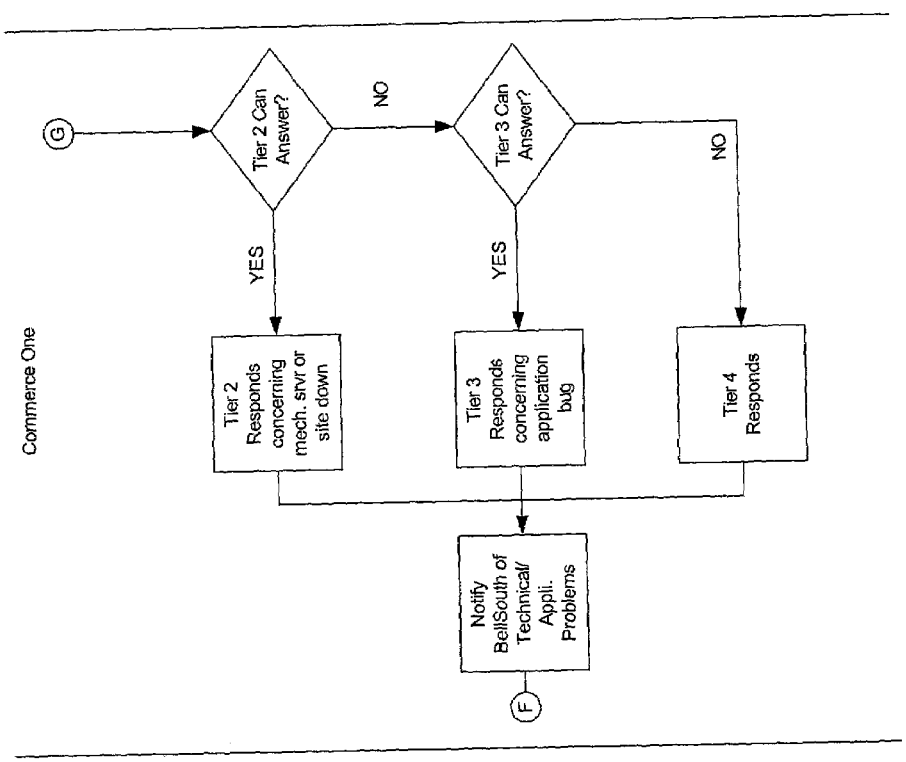

FIG. 9 is an example of a process flow diagram for obtaining customer service. As shown in this diagram, the process of obtaining customer service can initiate through a request sent on-line or through an e-mail or phone call. The process includes opening trouble tickets, determining which entity, such as the operating entity or hosting company, needs to respond to the request for service, and responding to the request.

Figure 10A:
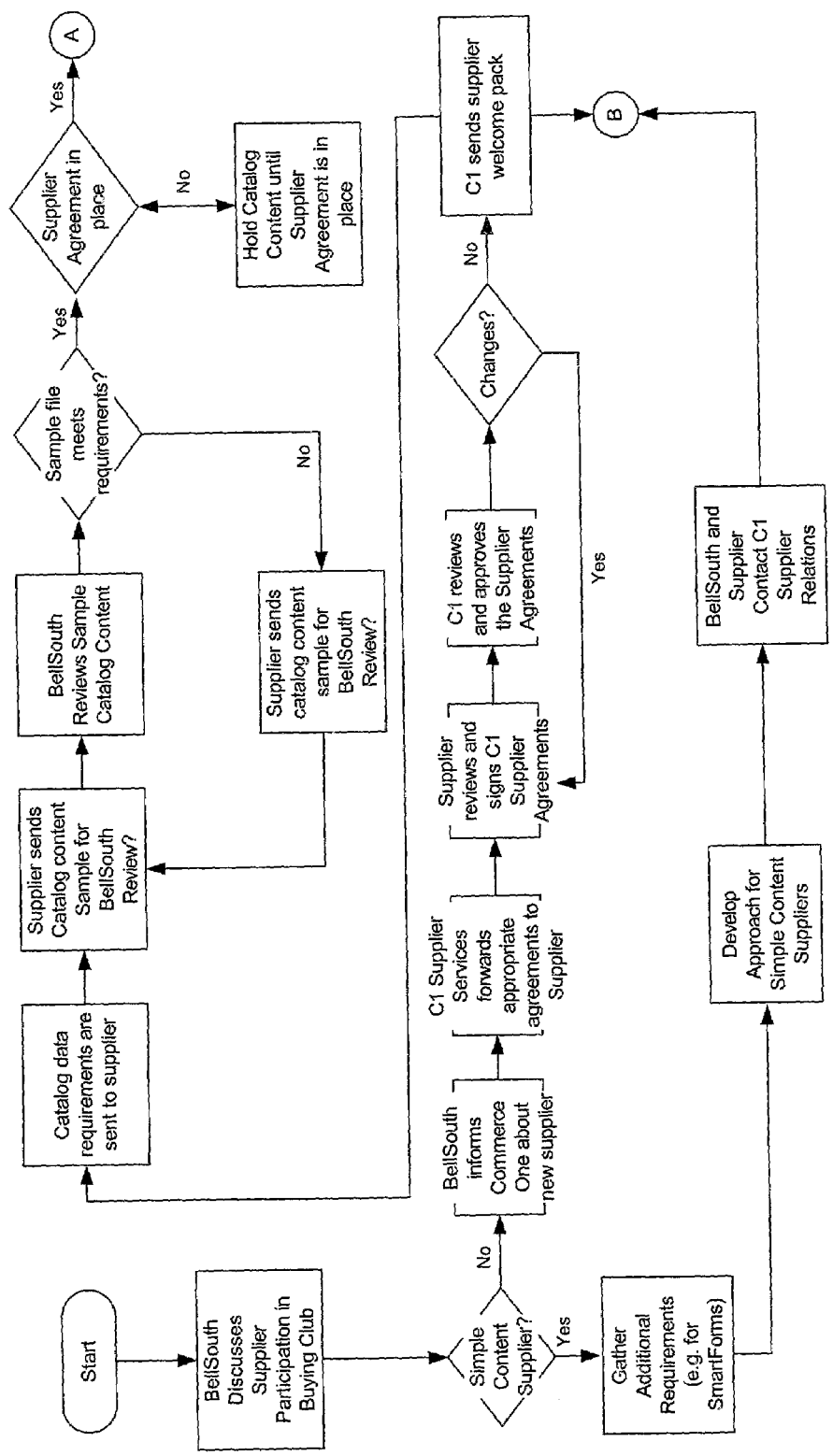
FIGS. 10(A) to 10(C) are process flow diagrams for catalog set up and maintenance.
Figure 10B:
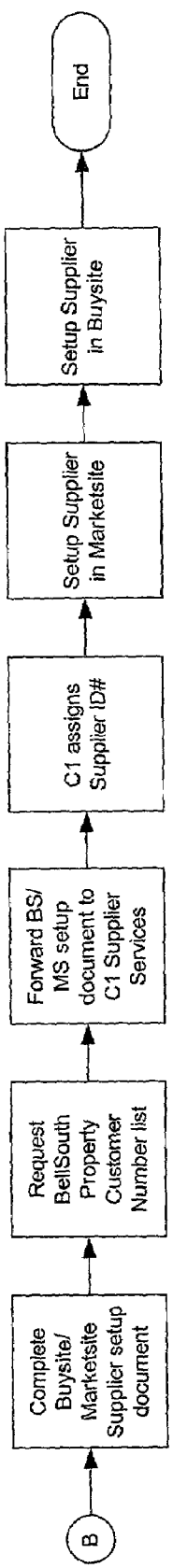
Figure 10C:
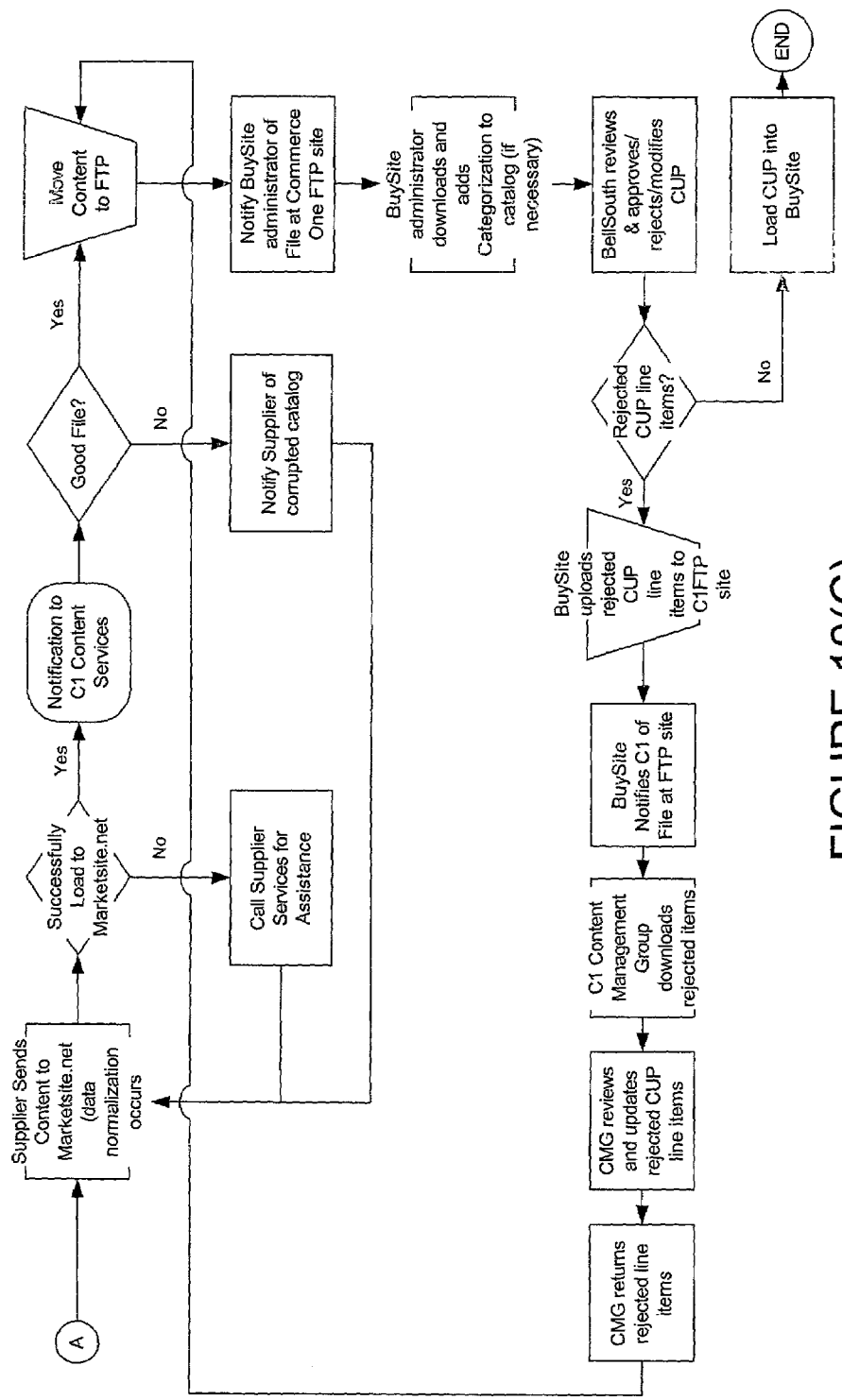

FIGS. 10(A), 10(B), and 10(C) illustrate process flow diagrams for setting up and maintaining catalogs. FIGS. 10(A) and 10(B) correspond to an initial adoption process while FIG. 10(C) illustrates an iterative content process flow. With reference to FIG. 10(A), the catalog setup and maintenance process flow involves holding discussions with suppliers 15, having the suppliers 15 execute suitable agreements, and having the suppliers 15 send catalog data. With reference to FIG. 10(B), the initial adoption process for setting up and maintaining a catalog involves assigning a supplier ID number and setting up the supplier 15 in the system 10. With reference to FIG. 10(C), the iterative content process flow involves transferring content from the supplier 15 to the system 10, downloading the content to the catalog, performing any necessary reviews and approvals to the content, and then loading the content to the system 10.

Figure 11:
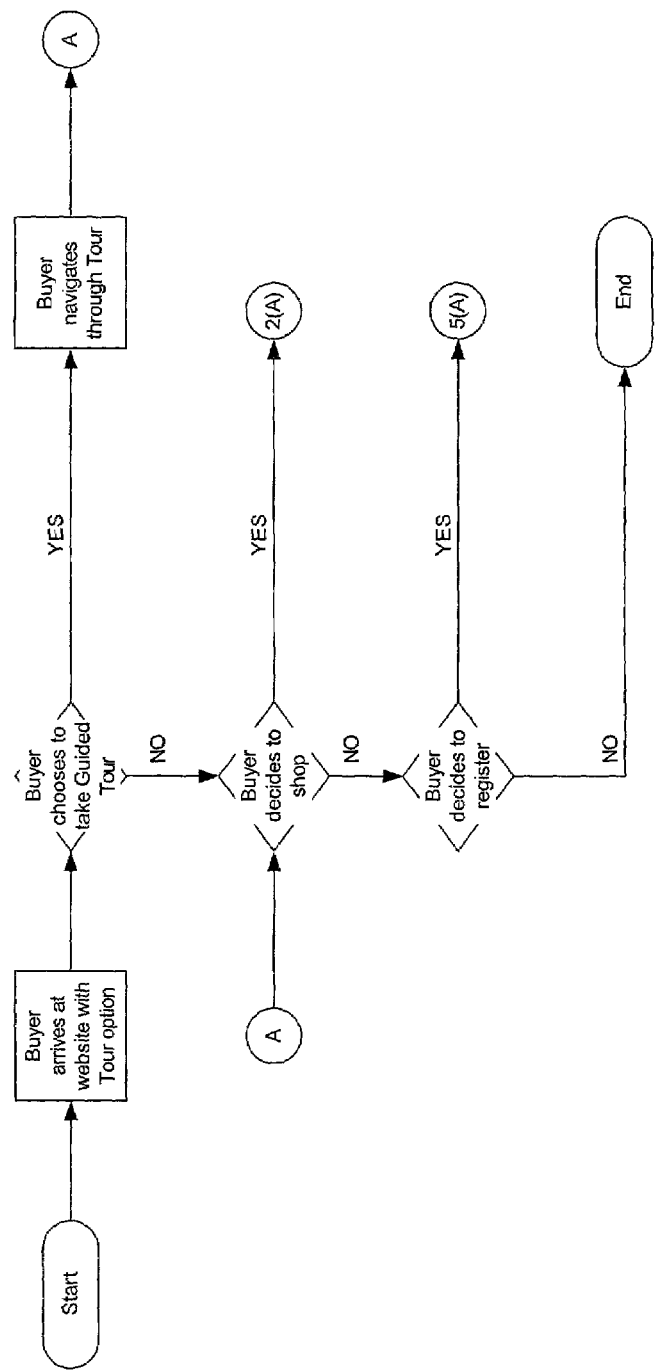
FIG. 11 is a process flow diagram for taking a guided tour.

FIG. 11 is an example of a process flow diagram of taking a guided tour through the system 10. As shown in this process flow diagram, a buyer 5 upon arriving at the main interface can take a guided tour, elect to shop, or register.

Figure 12:
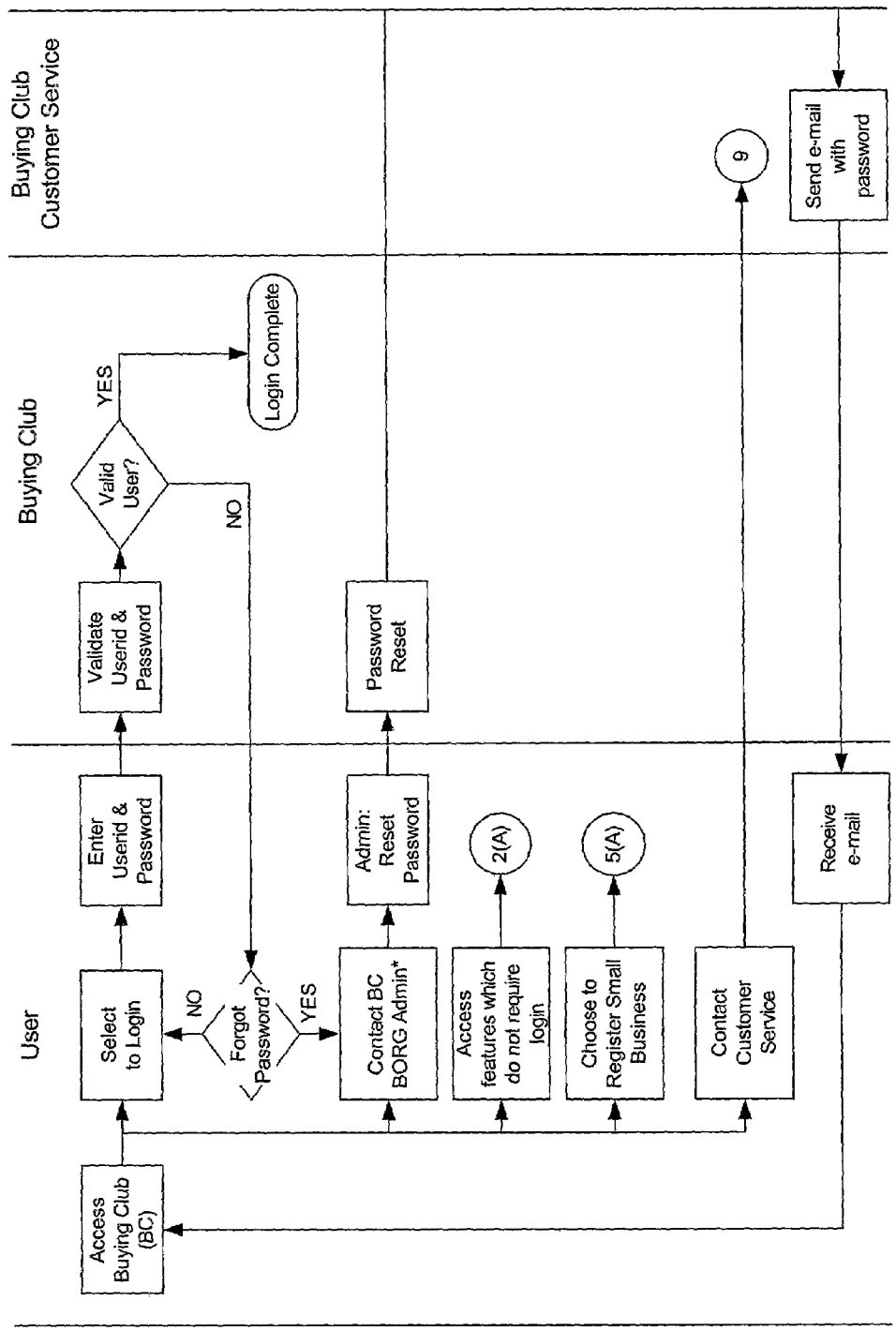
FIG. 12 is a process flow diagram for logging into the system.

FIG. 12 is an example of a process flow diagram of logging in to the system 10. The login process involves entering a user ID and password and also contemplates making portions of the system 10 available to visitors without requiring any login process.

IV. User Interface

Figure 13A:
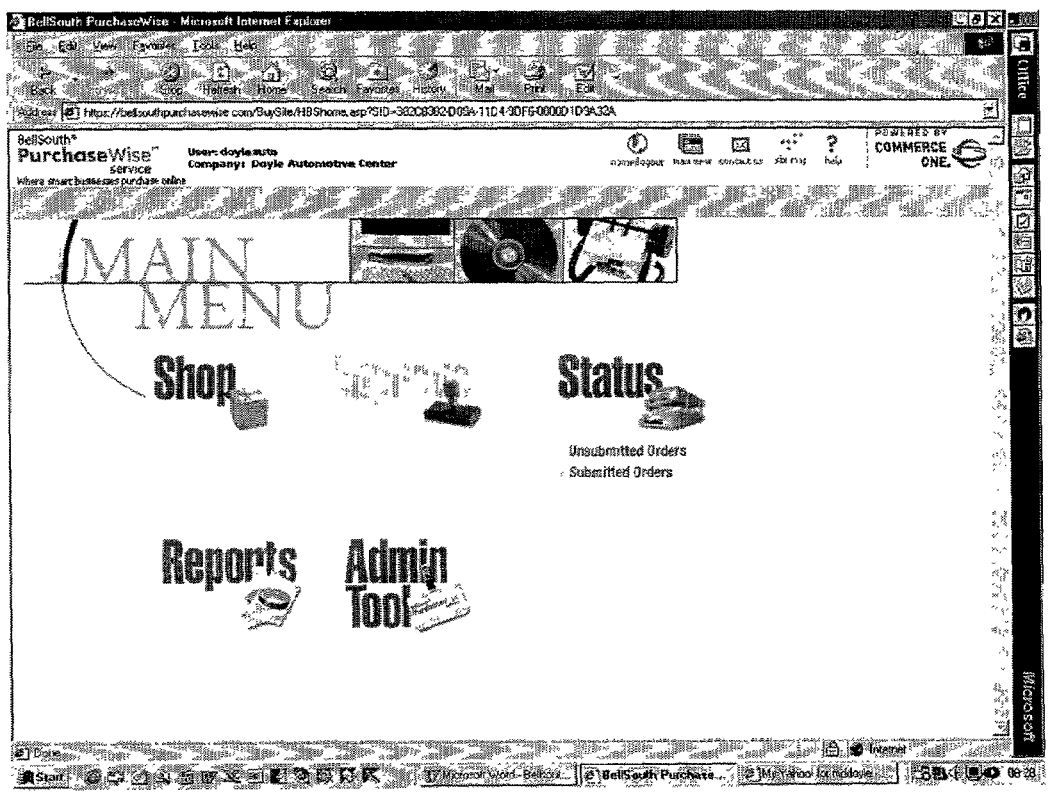
FIGS. 13(A) and 13(B) are examples of a main interfaces to the system.
Figure 13B:
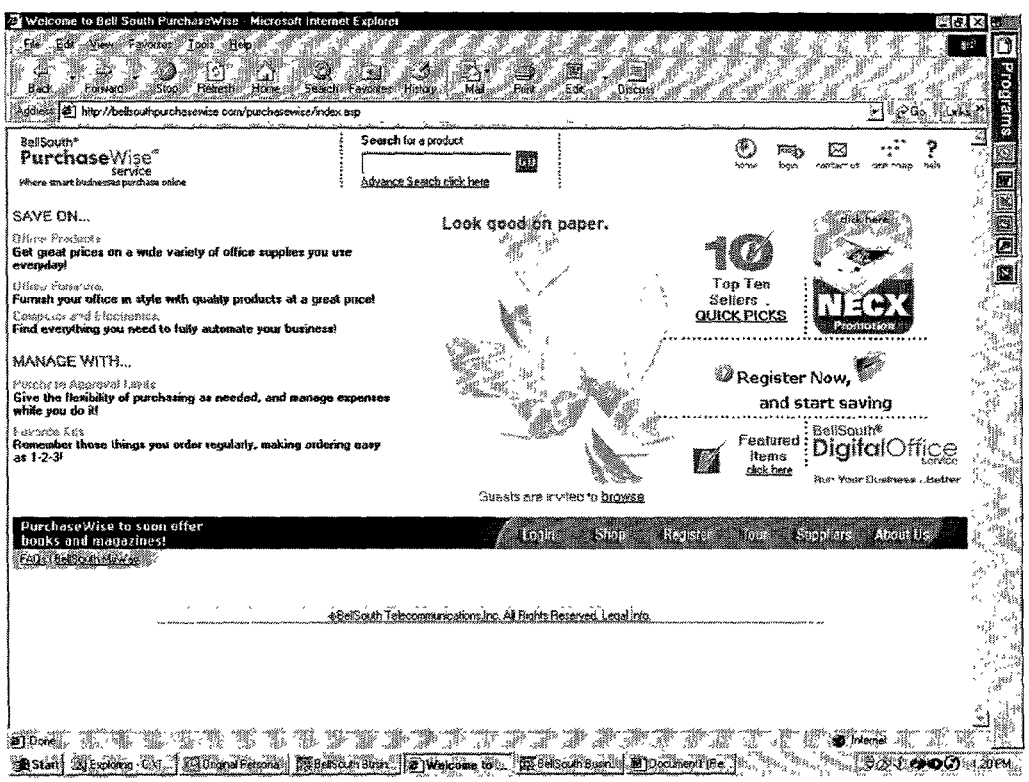
Figure 14A:
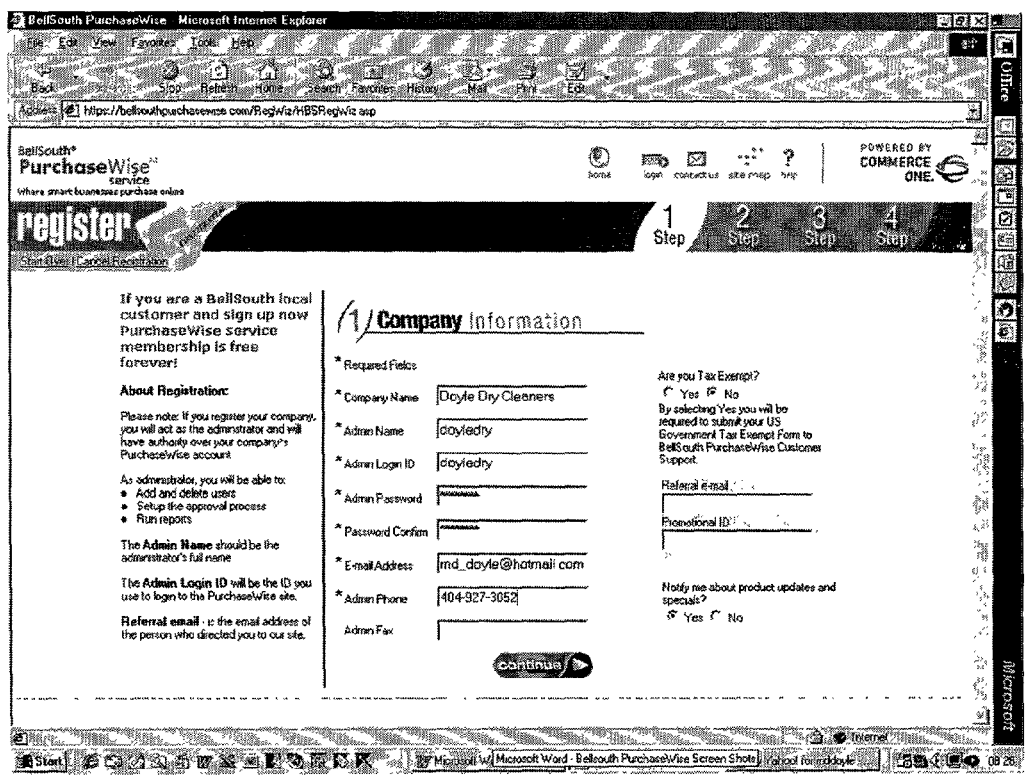
Figure 14B:
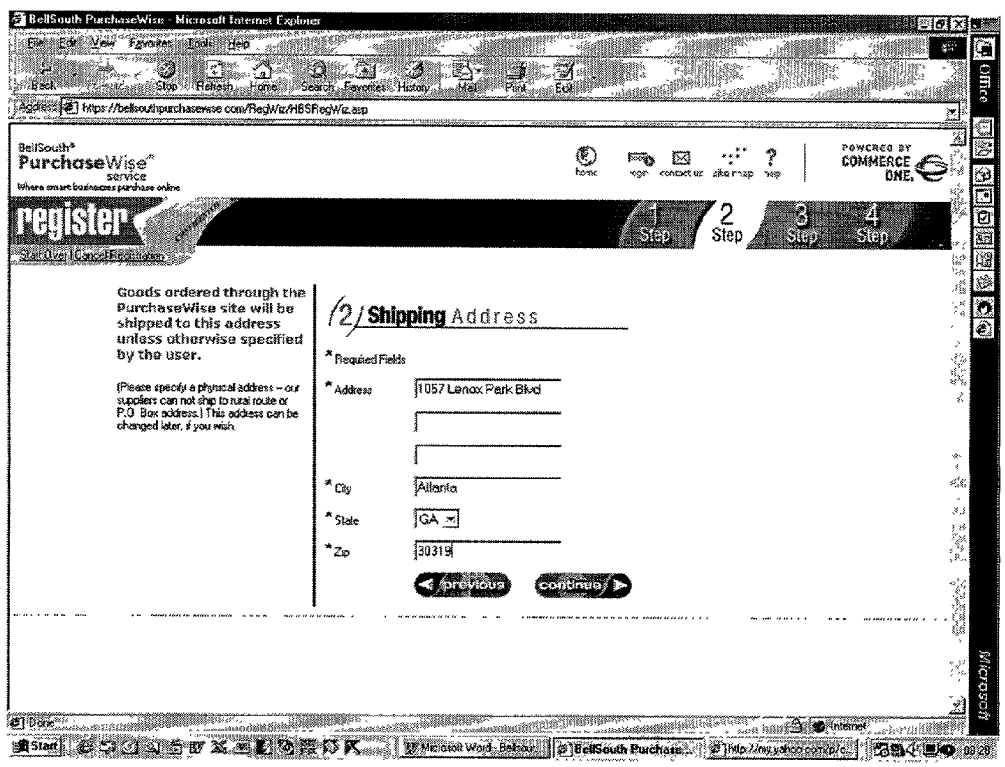
Figure 14C:
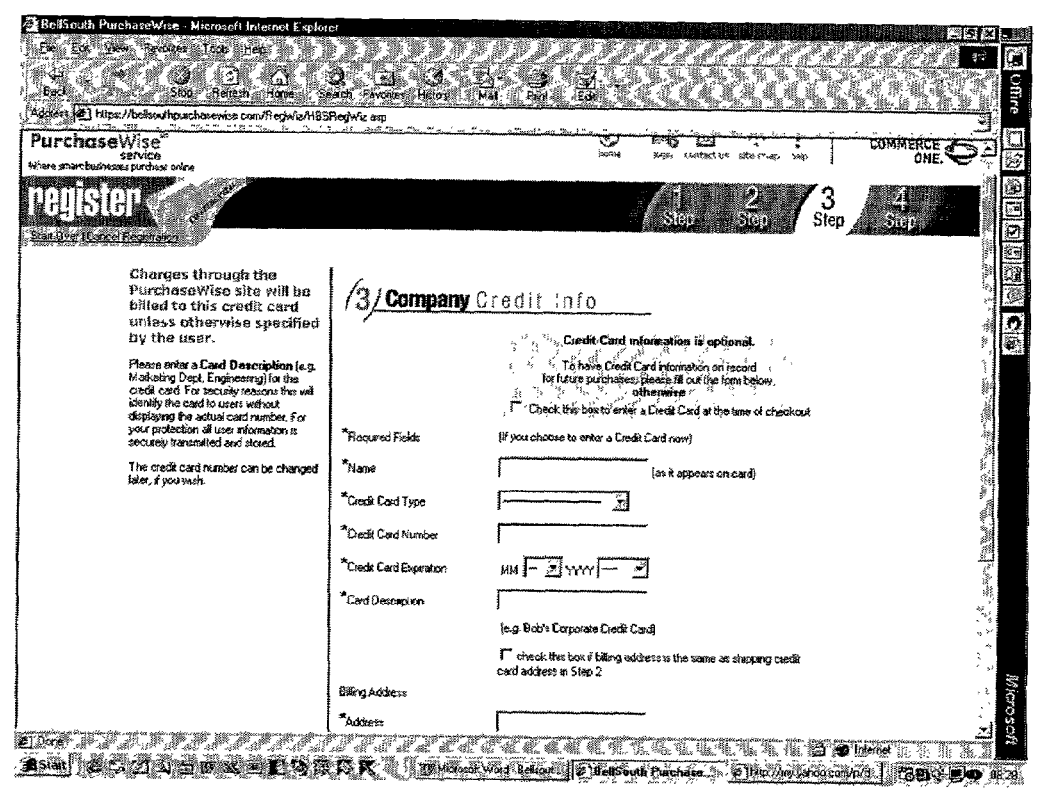
Figure 14D:
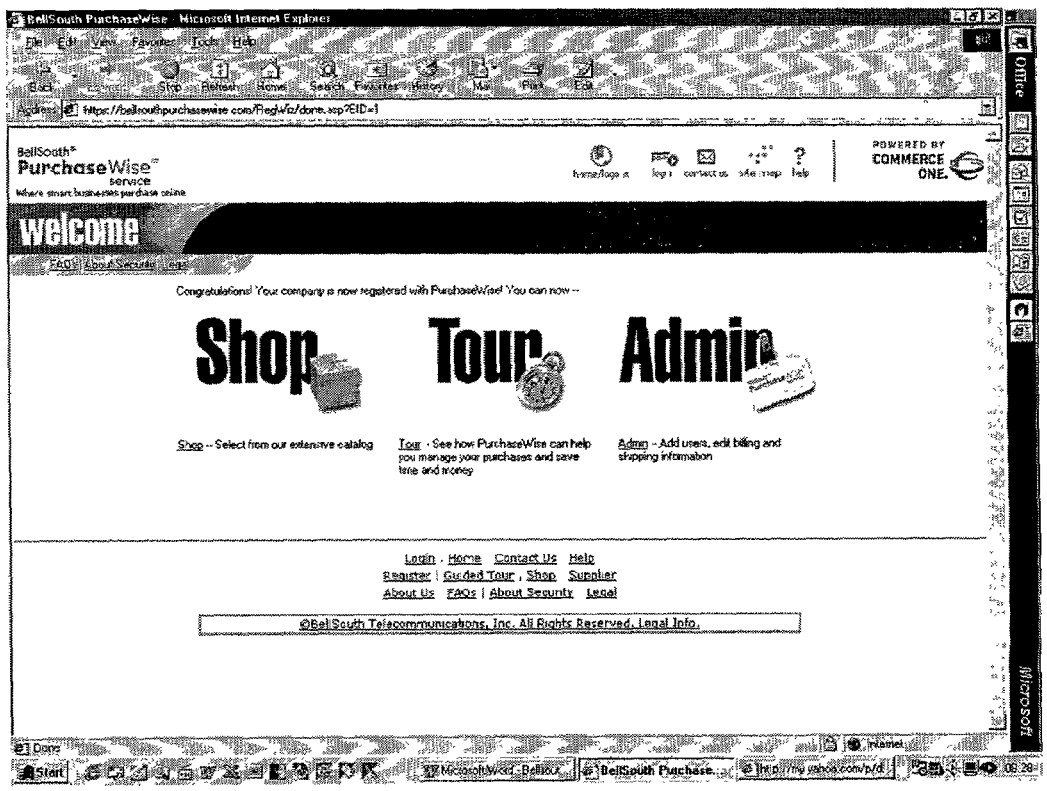

An example will now be provided of an exemplary set of interfaces to the SBBC system 10. FIGS. 13(A) and 13(B) are examples of main menu interfaces provided to a visitor at the SBBC system 10. For the purposes of this description, the visitor will be referred to as a buyer 5, even though the visitor may include other entities, such as suppliers 15. As shown in this interface, the SBBC system 10 provides the buyer 5 with options to shop, approve orders, check the status of orders, conduct reports, and use administrative tools. In the preferred embodiment, buyer 5 can shop for goods or services but must register before being able to complete a transaction. FIGS. 14(A) to 14(D) provide an exemplary set of interfaces for registering with the system 10. A buyer 5 inputs company information in the interface shown in FIG. 14(A), a shipping address in the interface shown in FIG. 14(B), and company credit card information in the interface shown in FIG. 14(C). Upon completion of the registration process, the buyer 5 receives the interface shown in FIG. 14(D), welcoming the buyer 5 to the site and providing options of shopping, touring, or using administrative tools.

Figure 15A:
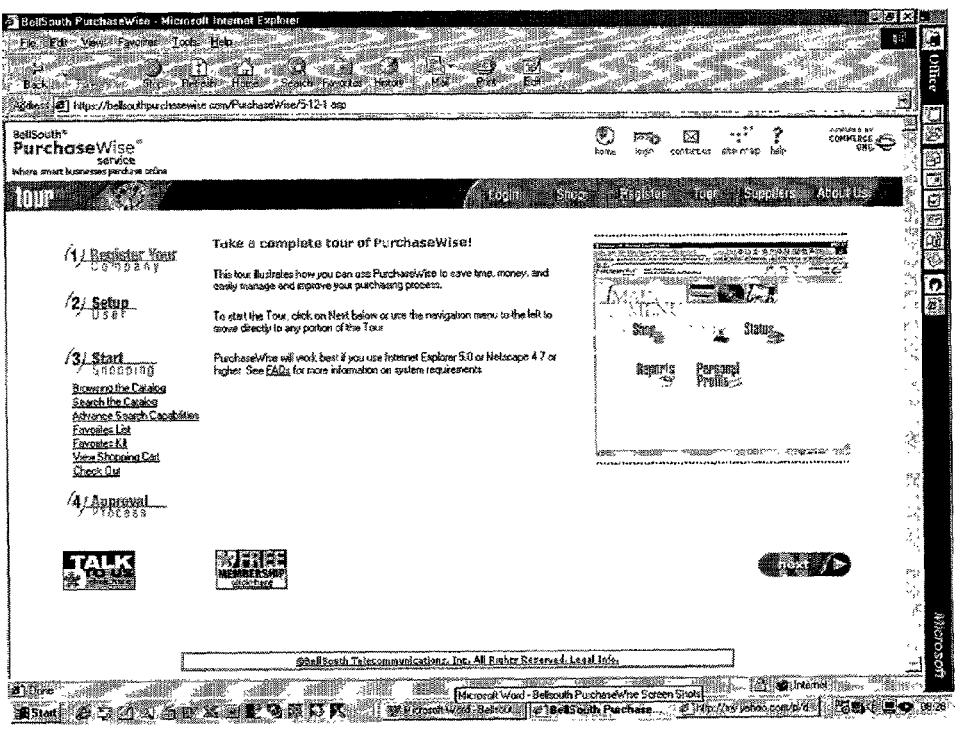
FIGS. 15(A) to 15(C) are examples of interfaces providing a tour to users.
Figure 15B:
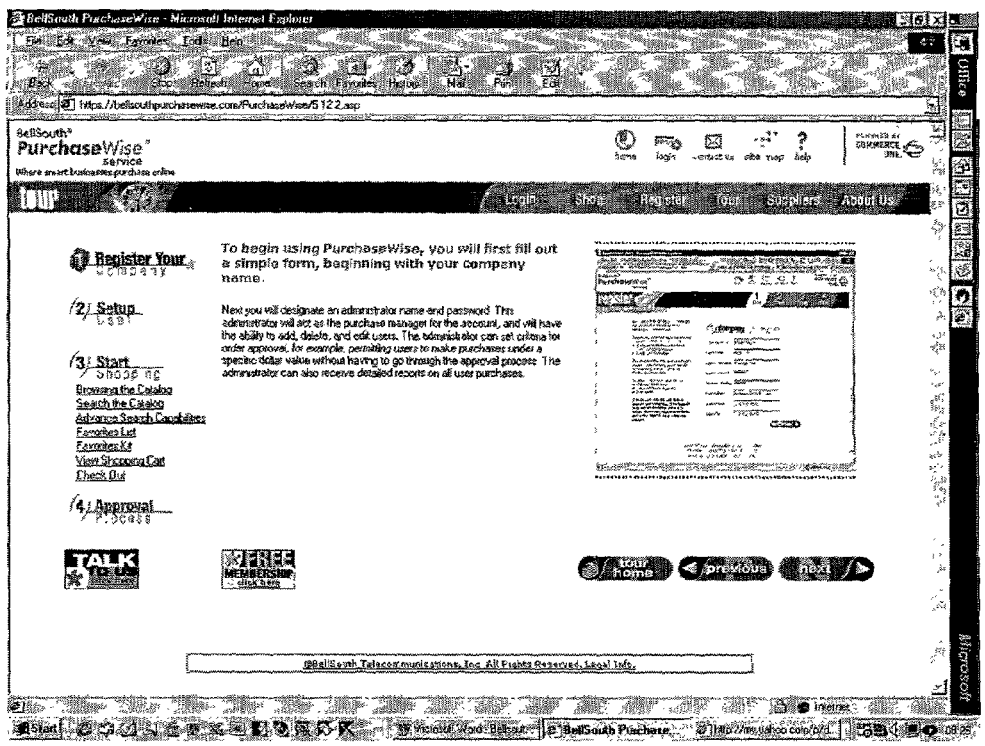
Figure 15C:
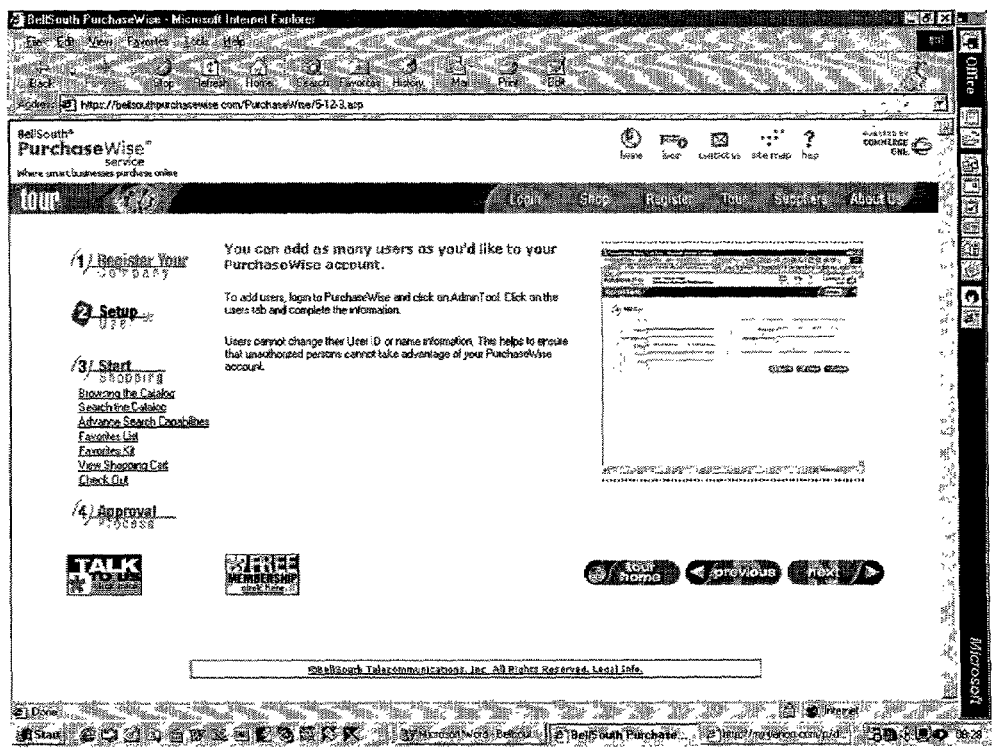

The SBBC system 10 is capable of giving buyers 5 a tour of the system 10. The tour option may be available to both registered and non-registered buyers 5. As shown in FIG. 15(A), the tour includes a description of the steps taken by a buyer 5 in purchasing items through the system 10. For example, the tour can explain how to register a company as shown in FIG. 15(B), or a set of buyers as shown in FIG. 15(C). Additionally, the tour may include descriptions on browsing the catalog, searching the catalog, advance search capabilities, favorites list, favorites kit, viewing a shopping cart, checking out, and an approval process.

Figure 16:
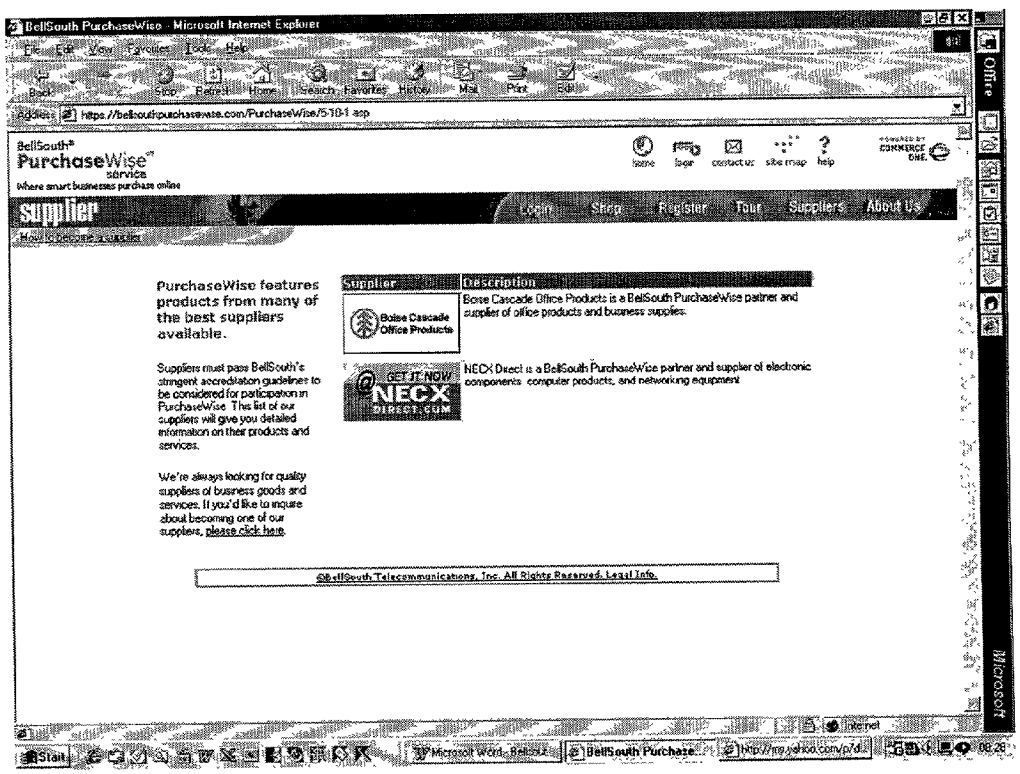
FIG. 16 is an example of an interface providing information on suppliers associated with the system.

Buyers 5 are preferably able to obtain information on suppliers 15 that operate through the system 10. FIG. 16 provides an example of an interface listing suppliers 15, providing a description of the items that can be purchased through the system 10, and providing general information on how suppliers 15 are selected and how an interested party can become a supplier 15.

Figure 17:
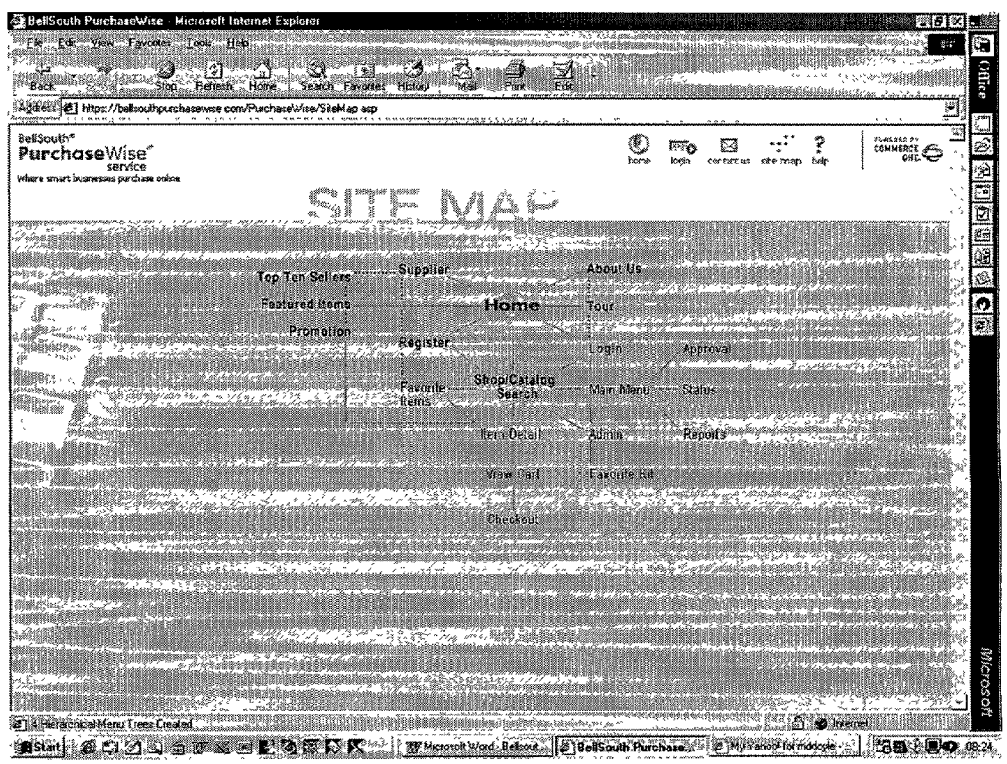
FIG. 17 is an example of a site map associated with the system.
Figure 18:
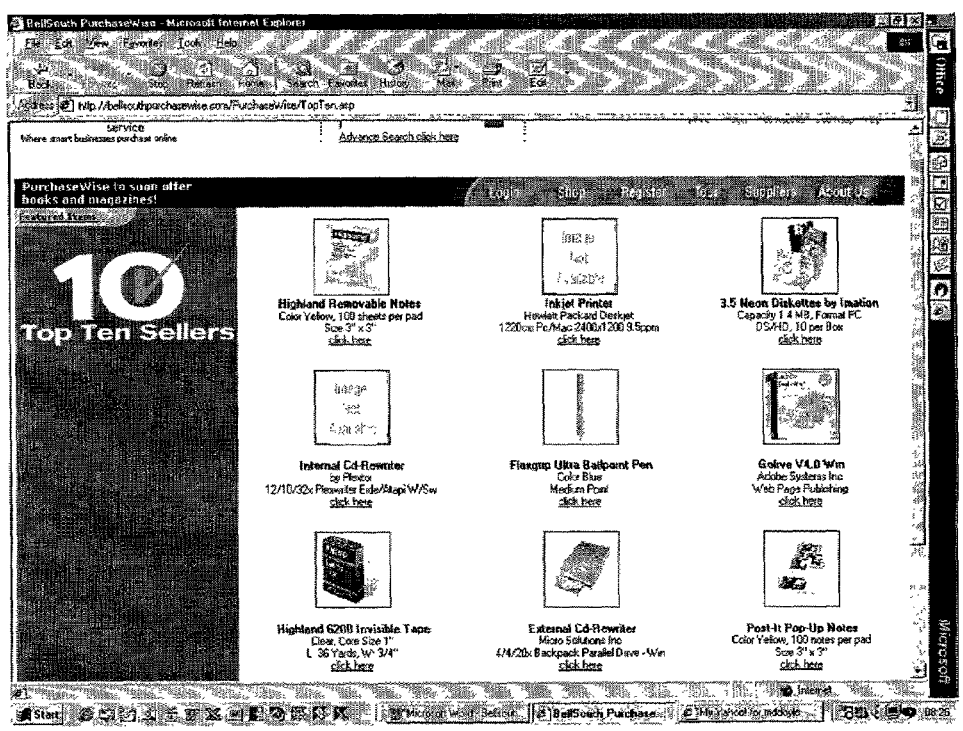
FIG. 18 is an example of an interface showing top ten sellers through the system.
Figure 19:
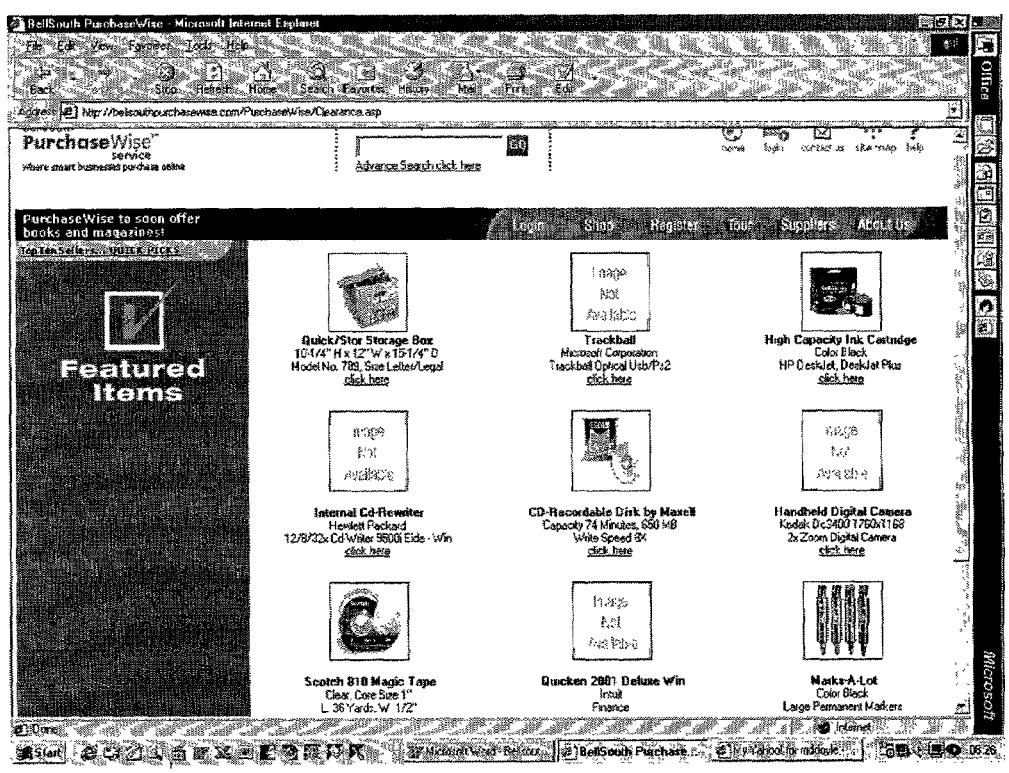
FIG. 19 is an example of an interface showing featured items available through the system.

An example of a site map for the system 10 is shown in FIG. 17. As shown in this site map, from a home page a buyer 5 can go to a "Supplier" link to obtain more information on suppliers, select a "Register" link to register with the system 10, can select a "Tour" link to take a tour through the system 10, can select a "Login" link to login to the system 10, or can select one of several links on special features available through the system 10. These special features include a "Top Ten Sellers" link on the top ten items being sold, a "Featured Items" link providing information on a group of items selected for a particular time period, such as a month, and a "Promotion" link showing items associated with promotions. FIG. 18 provides an example of an interface showing some of the top ten sellers and FIG. 19 is an interface showing some of the featured items.

Figure 20A:
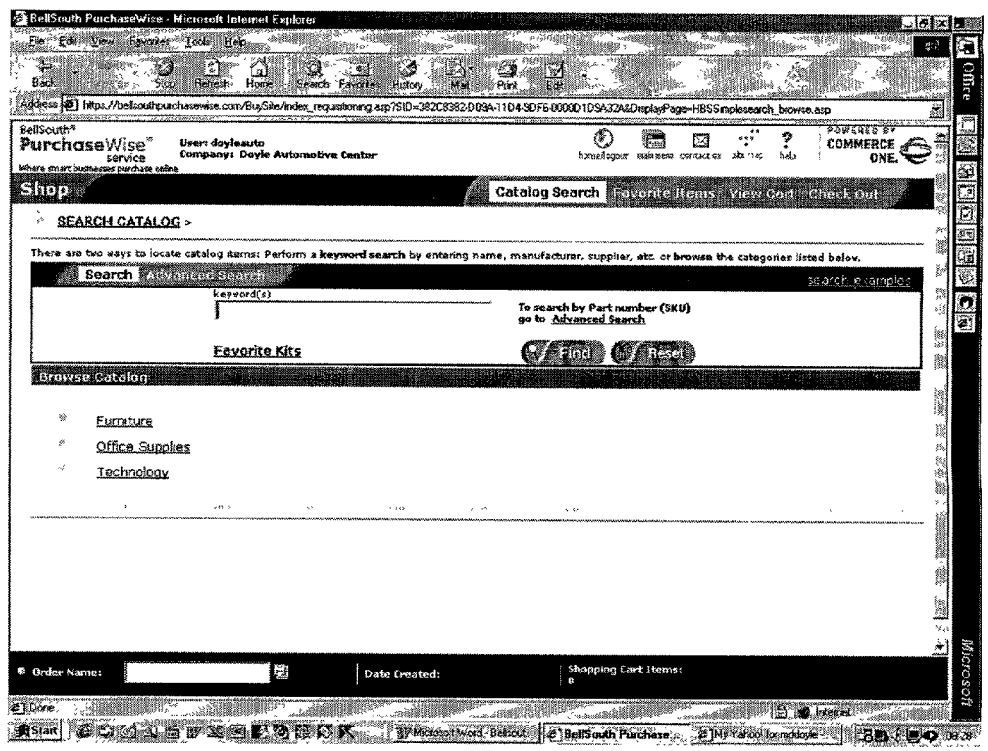
FIGS. 20(A) to 20(C) are examples of interfaces allowing users to perform a catalog search.
Figure 20B:
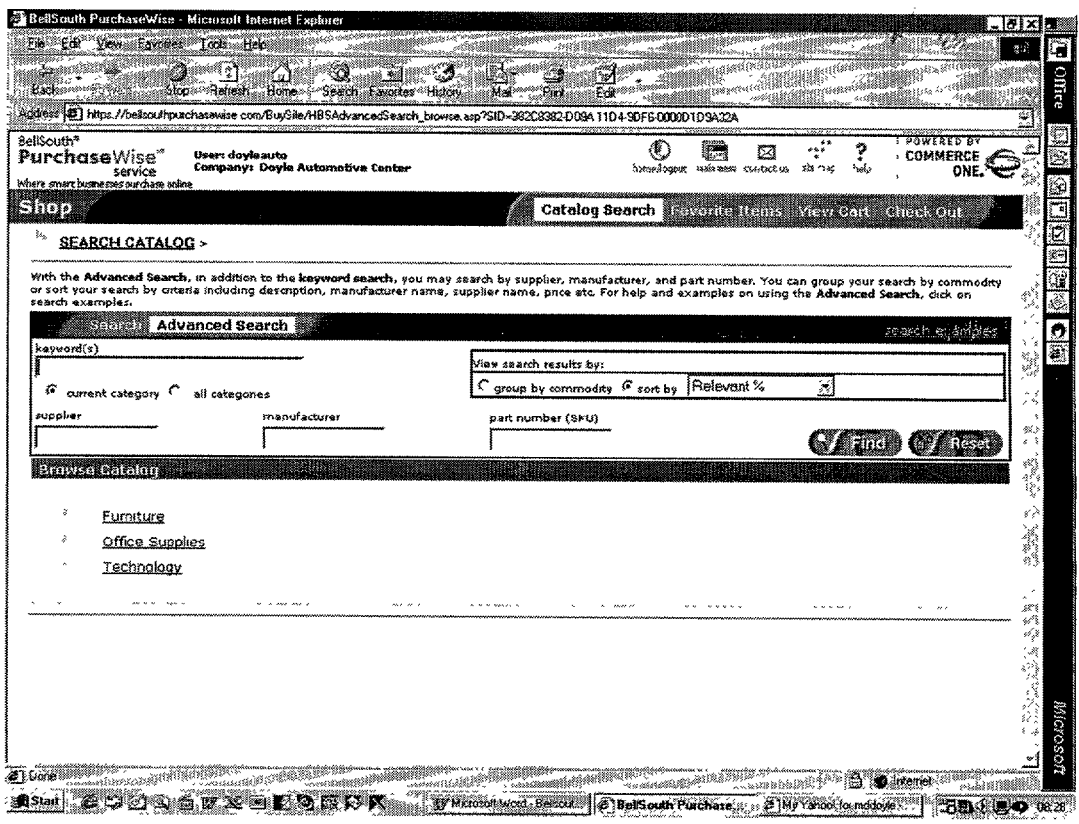
Figure 20C:
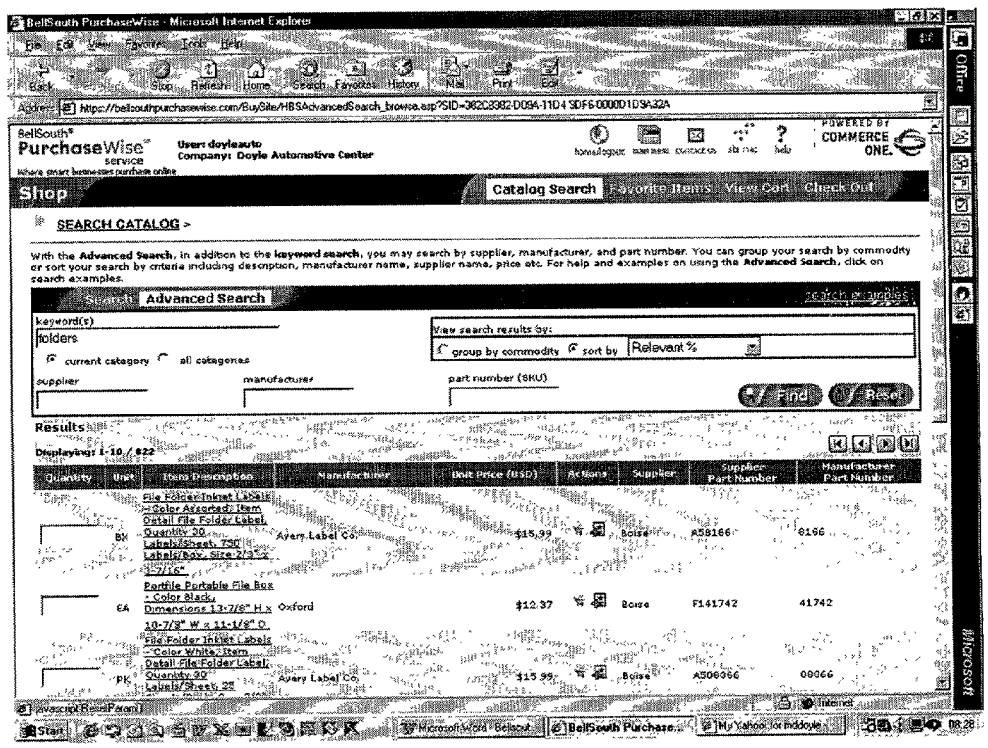

An example will now be provided of a buyer 5 interacting with the system 10 using some of the functionality available through the system 10. FIGS. 20(A) to 20(C) illustrate ways in which a buyer 5 can search catalogs available through the system 10. As shown in FIG. 20(A), a buyer 5 can input key words, such as a name, manufacturer, or supplier, or can browse categories of items, such as a furniture catalog, office supplies catalog, or technology catalog. A buyer 5 can also select an advanced search capability as shown in FIG. 20(B) which provides the buyer 5 with additional fields to search, such as supplier 15, manufacturer, and part number. FIG. 20(C) provides an example of some results of a search done on the keyword of "Folders."

Figure 21:
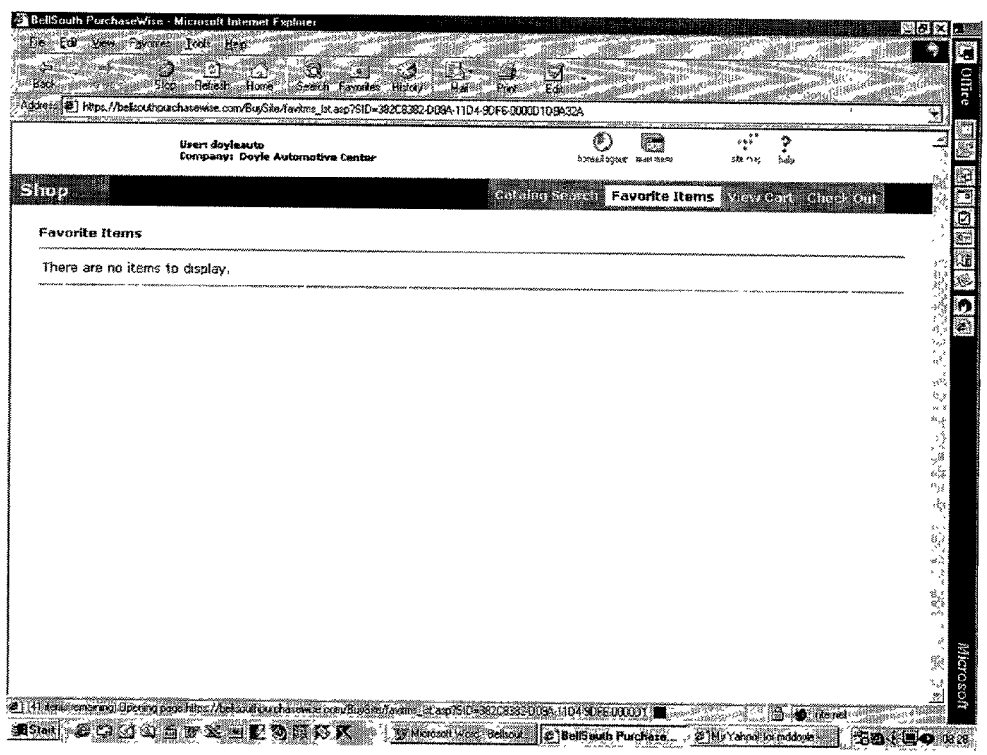
FIG. 21 is an example of an interface showing a list of favorite items for a user.

As shown in FIG. 21, a buyer 5 can select a "Favorite Items" tab to view a list of favorite items for that particular buyer 5. In this example, there are no items to display in the list of favorite items for the particular buyer 5.

Figure 22:
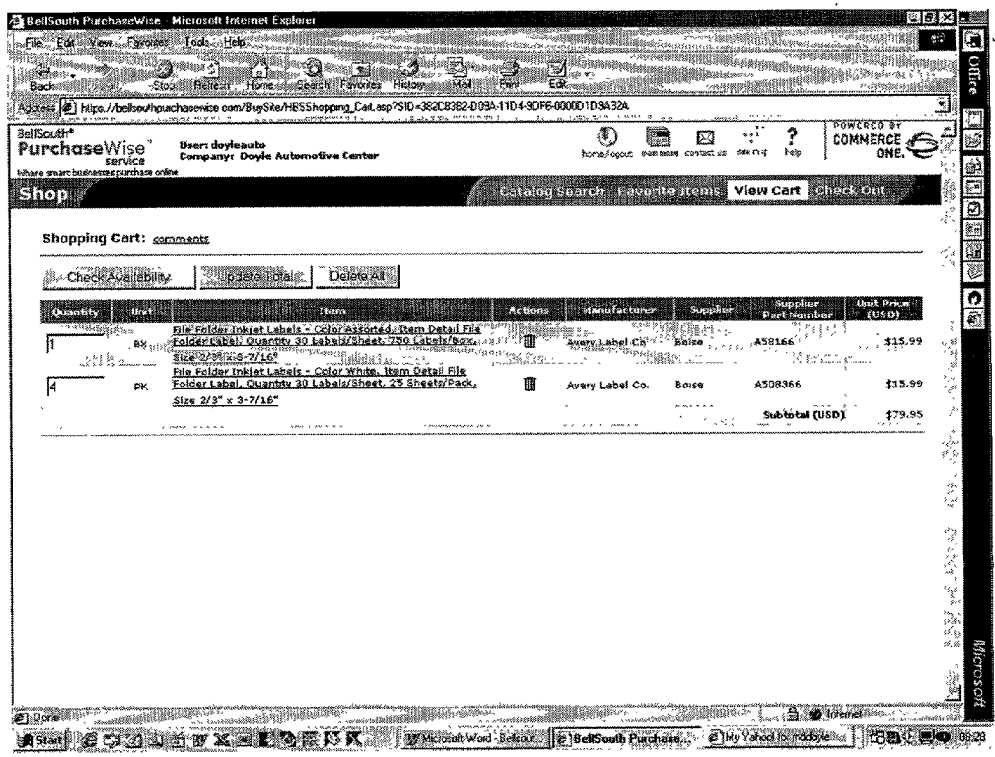
FIG. 22 is an example of an interface showing contents of a shopping cart for a user.

When a buyer 5 selects a "View Cart" tab, the buyer 5 can see contents of its shopping cart, as shown in FIG. 22. Through this interface, the buyer 5 can adjust the quantity of items, check availability, update total, and delete all items.

Figure 23A:
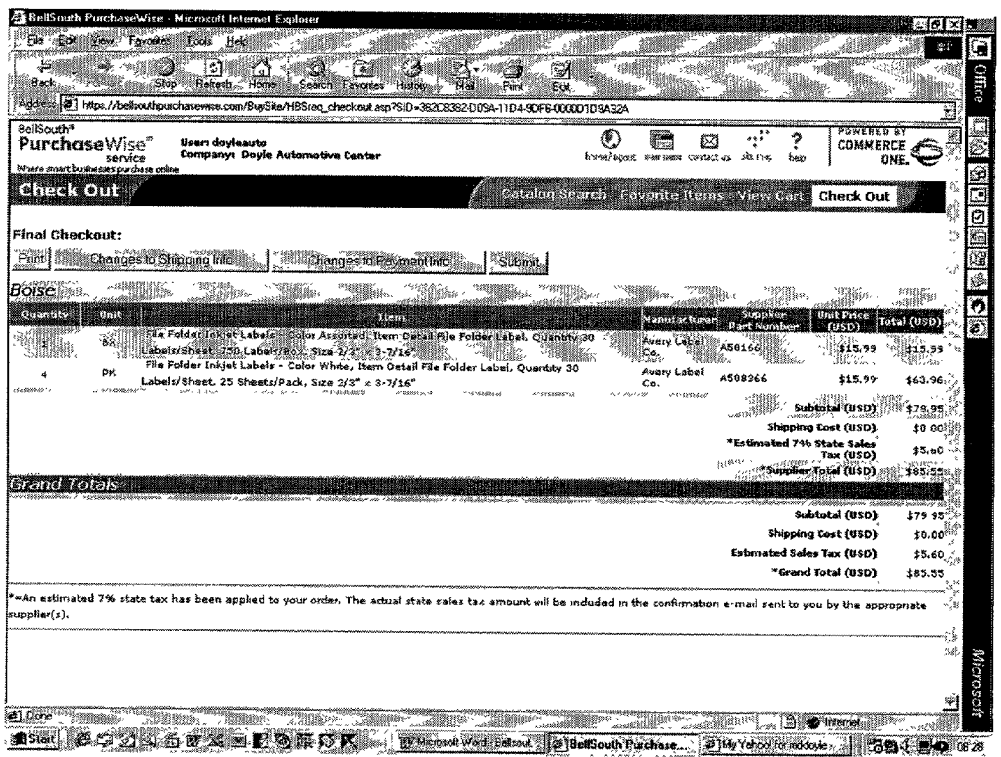
FIGS. 23(A) to 23(C) are exemplary interfaces for allowing a user to check out.
Figure 23B:
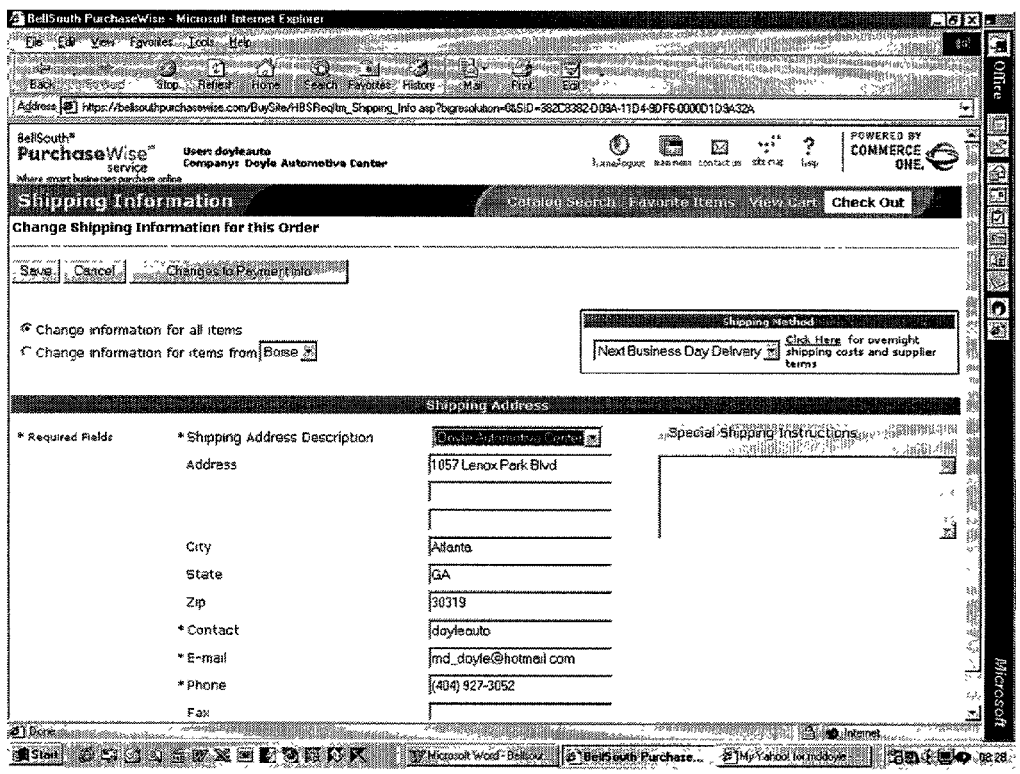
Figure 23C:
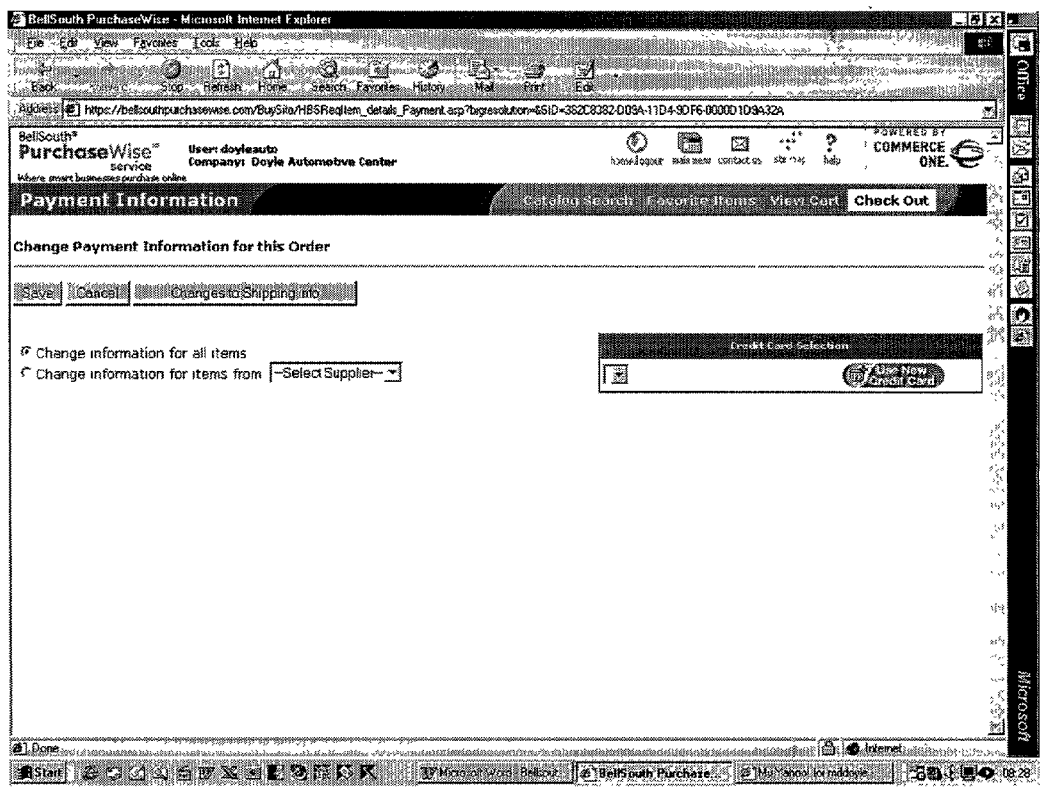

When a buyer 5 selects a "Checkout" tab, the buyer 5 can proceed to complete a transaction. As shown in FIG. 23(A), the buyer 5 can view the total cost, including sales, tax, and shipping cost. With this interface, the buyer 5 can select buttons to "Print," "Changes to Shipping Info," "Changes to Payment Info," and "Submit." As shown in FIG. 23(B), upon selection of the "Changes to Shipping Info" button, the buyer 5 can then update the shipping address, shipping method, and shipping instructions. Upon selecting the "Changes to Payment Info," the buyer 5 receives the interface shown in FIG. 23(C).

Figure 24:
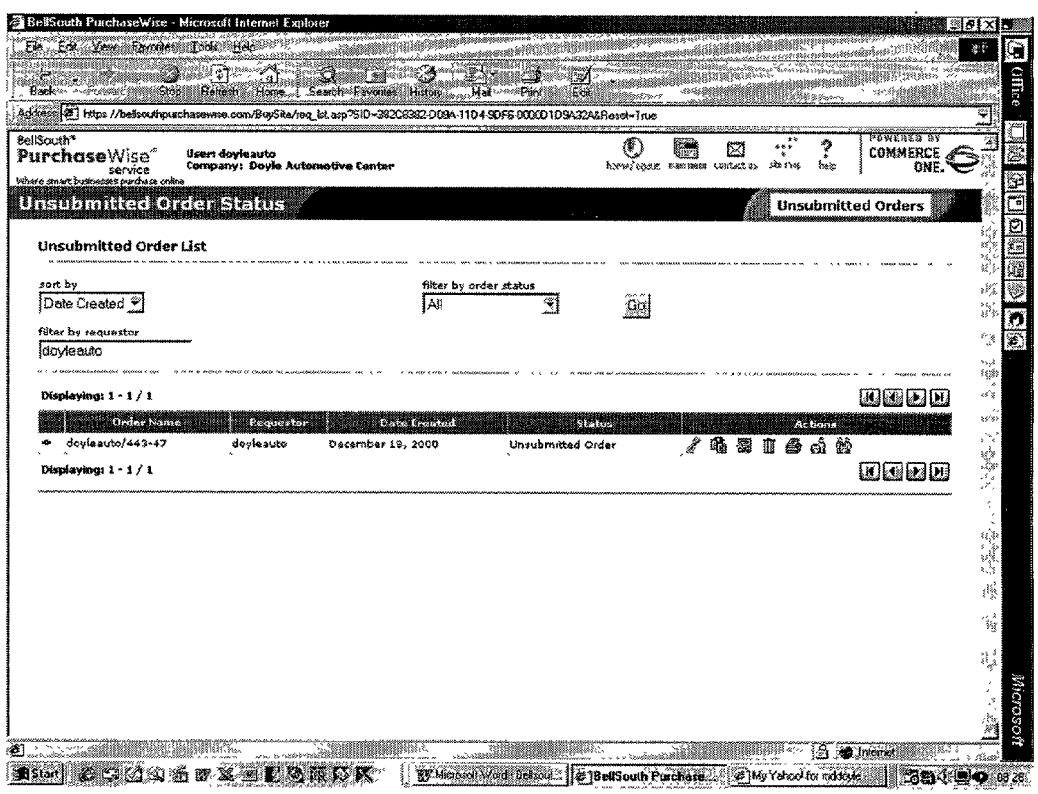
FIG. 24 is an example of an interface showing the status of unsubmitted orders.
Figure 25:
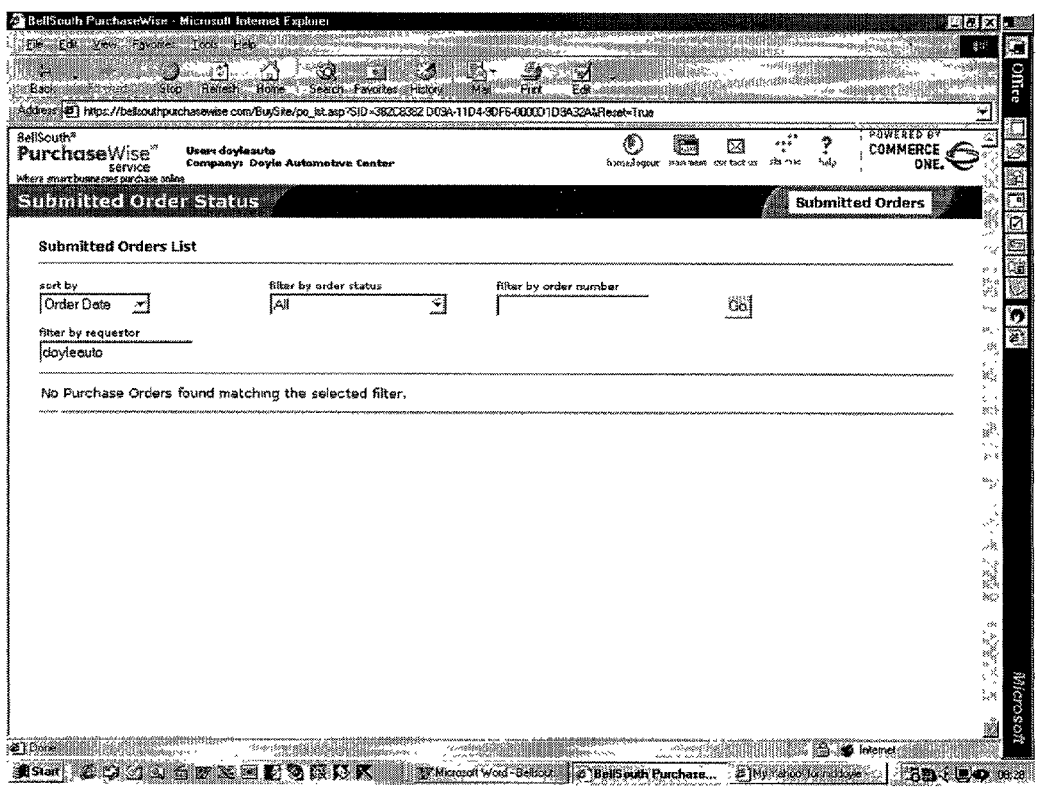
FIG. 25 is an example of an interface showing the status of submitted orders.

The system 10 preferably allows buyers 5 to view the status of their orders. FIG. 24 is an example of an interface which allows buyers 5 to view the status of unsubmitted orders. Through this interface, the buyer 5 can sort the unsubmitted orders, filter the orders, and receive the resultant list of unsubmitted orders. As shown in FIG. 25, the buyer 5 can view the status of submitted orders and sort the orders, filter the orders by status, filter the order by number, and then review the resultant list of orders.

Figure 26:
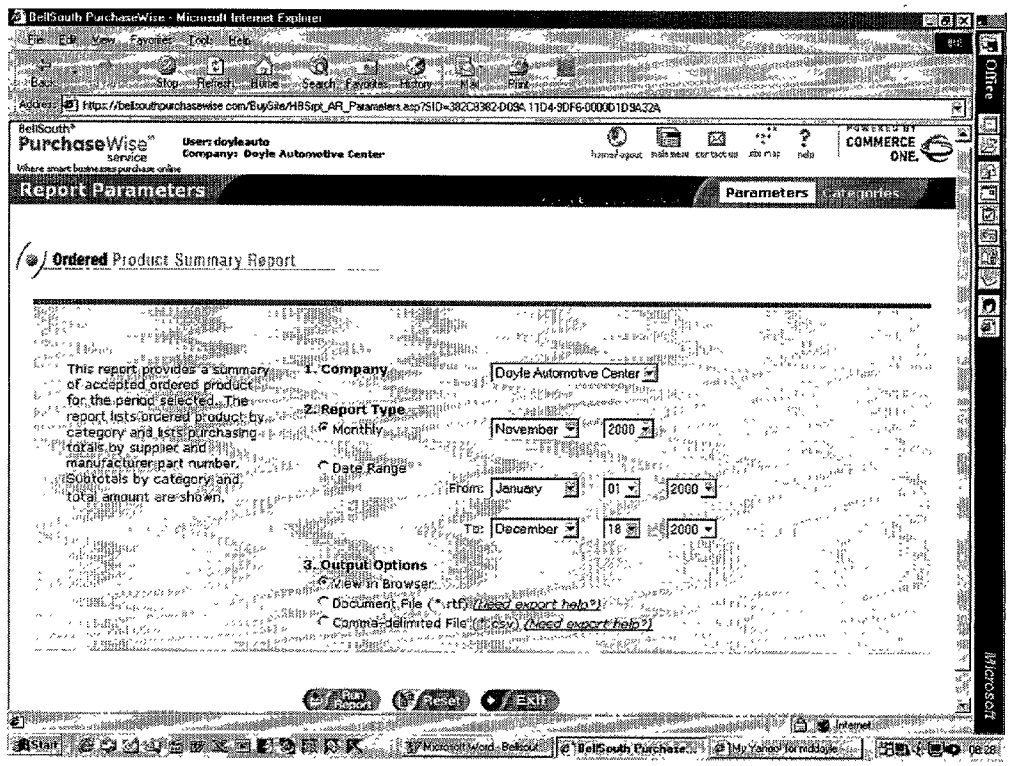
FIG. 26 is an example of a report available through the system.

As discussed above with reference to FIG. 12, the buyer 5 can also generate reports through the system 10. FIG. 26 is an example of an interface showing criteria input for a product summary report. As explained in this interface, this report provides a summary of accepted ordered product for a specified period and lists ordered products by category and lists purchasing tools by supplier and manufacturer part number. This report is just one example of a report that may be provided to the benefit of buyers 5 in managing, tracking, and monitoring purchases made through the system 10. It should be understood that other reports may be provided to the benefit of buyers 5 through the system 10 and that reports may be made available to suppliers 15 to assist them in trading, monitoring, and managing all orders, from initial purchases through delivery and even considering returns.

Figure 27A:
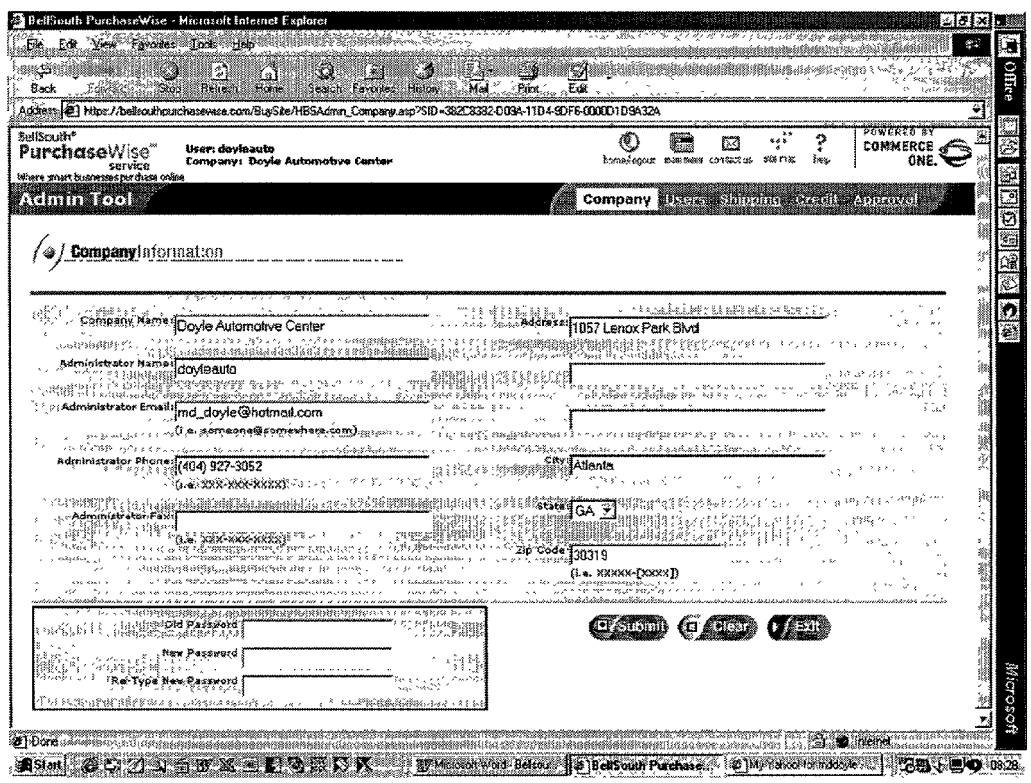
FIGS. 27(A) to 27(I) are examples of administrative tools available through the system.
Figure 27B:
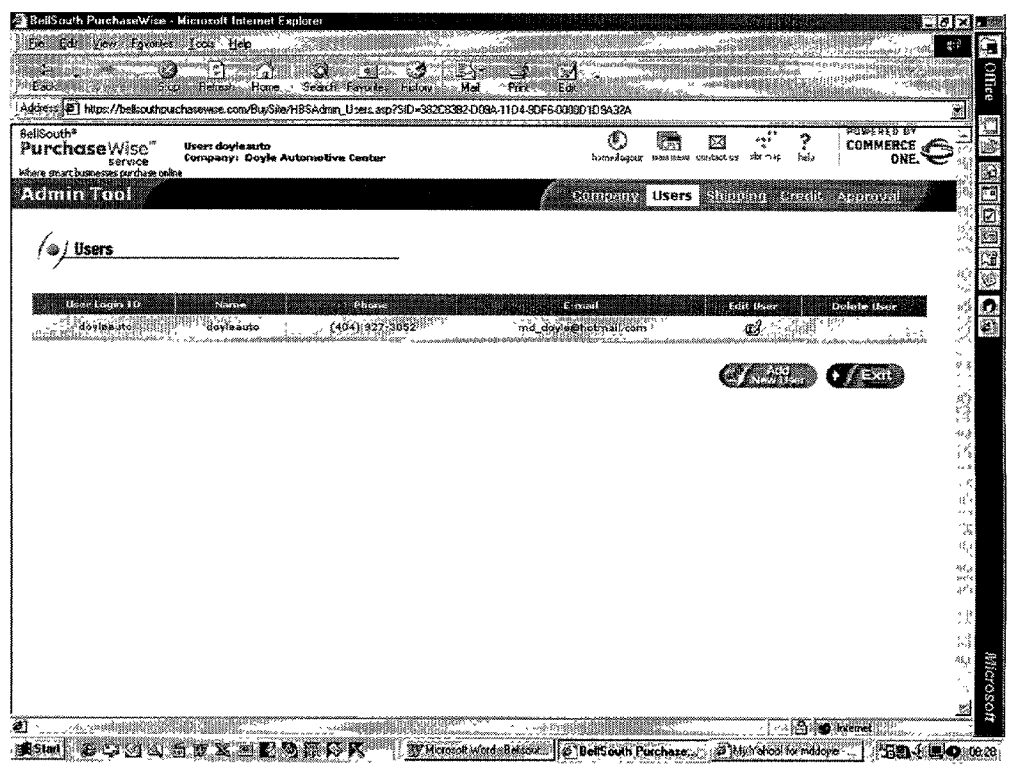
Figure 27C:
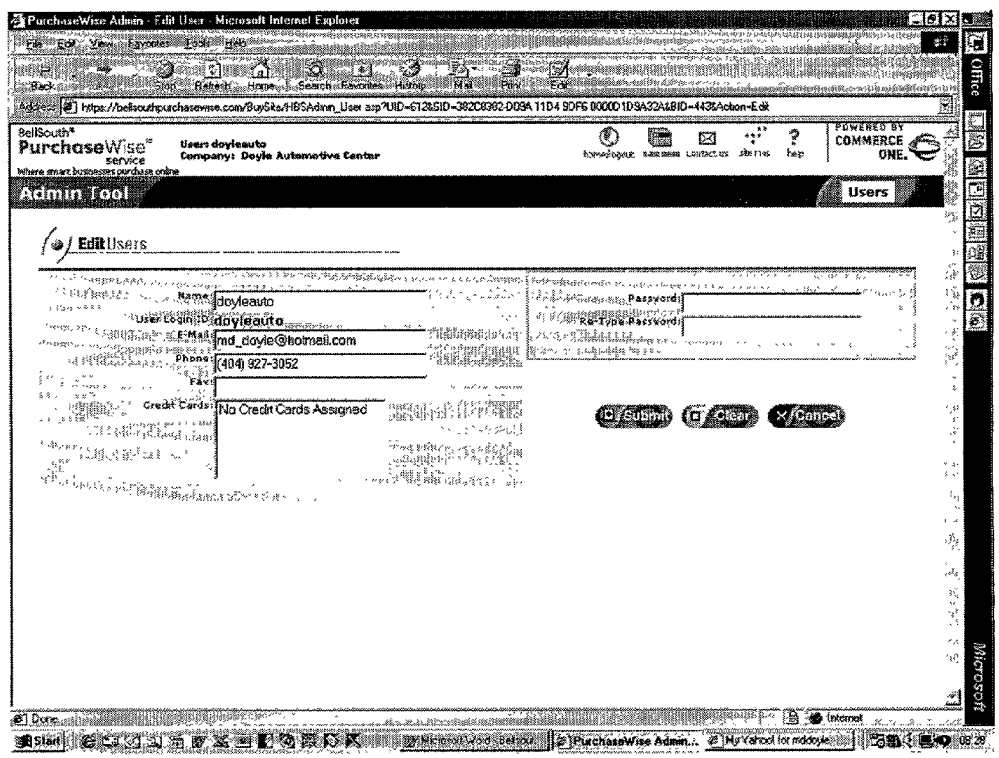
Figure 27D:
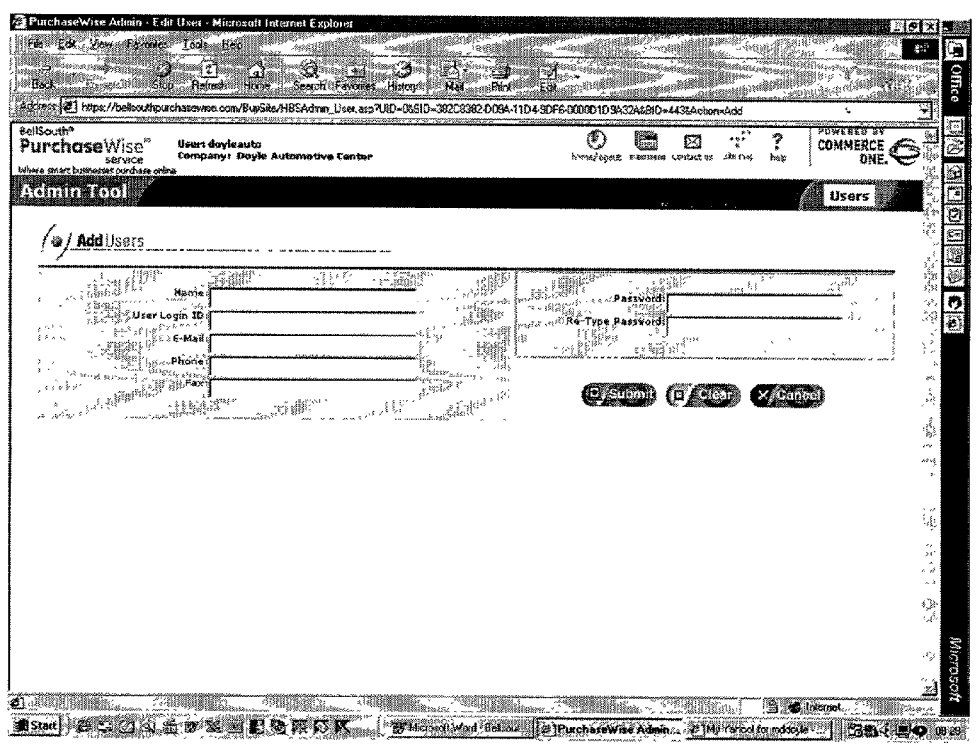
Figure 27E:
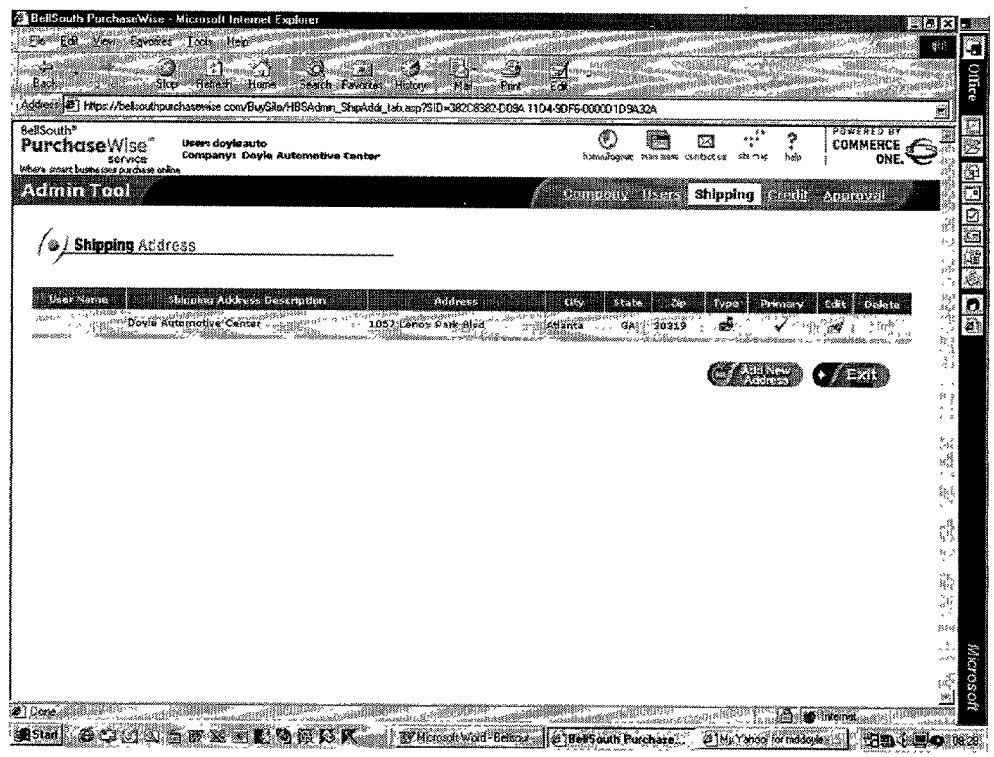
Figure 27F:
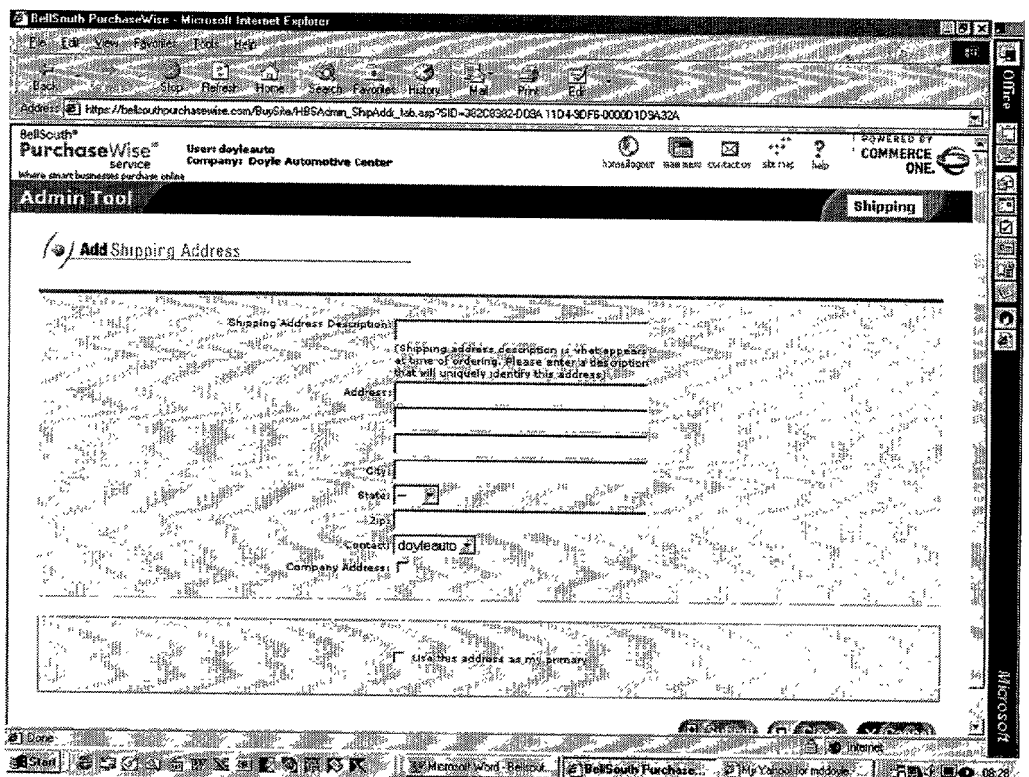
Figure 27G:
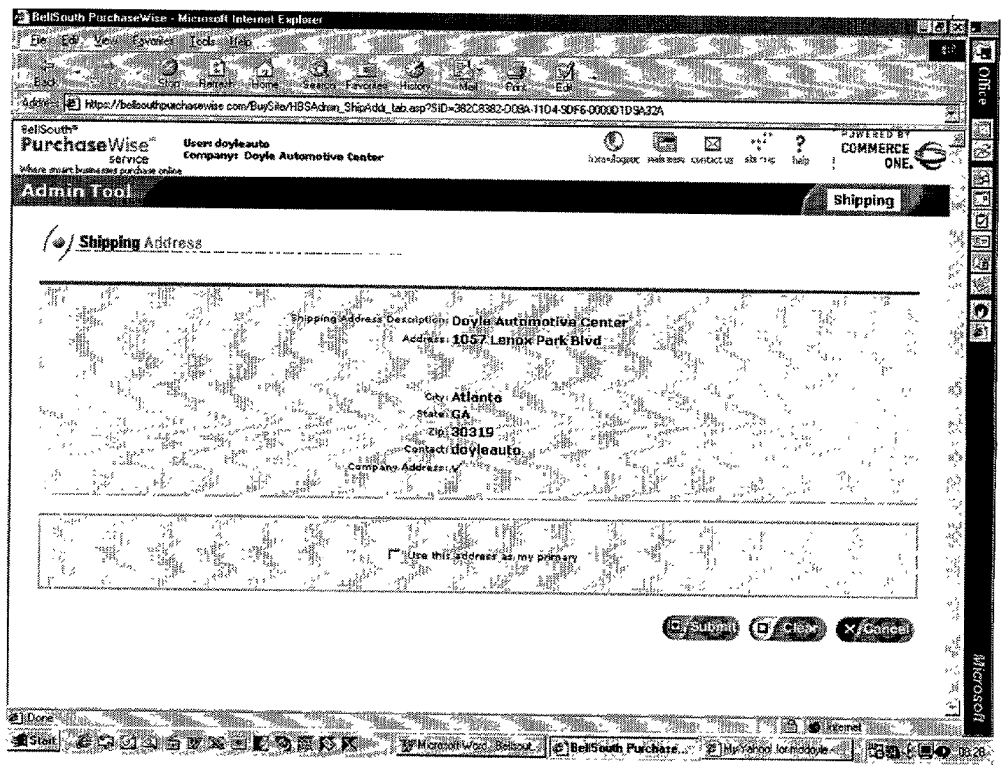
Figure 27H:
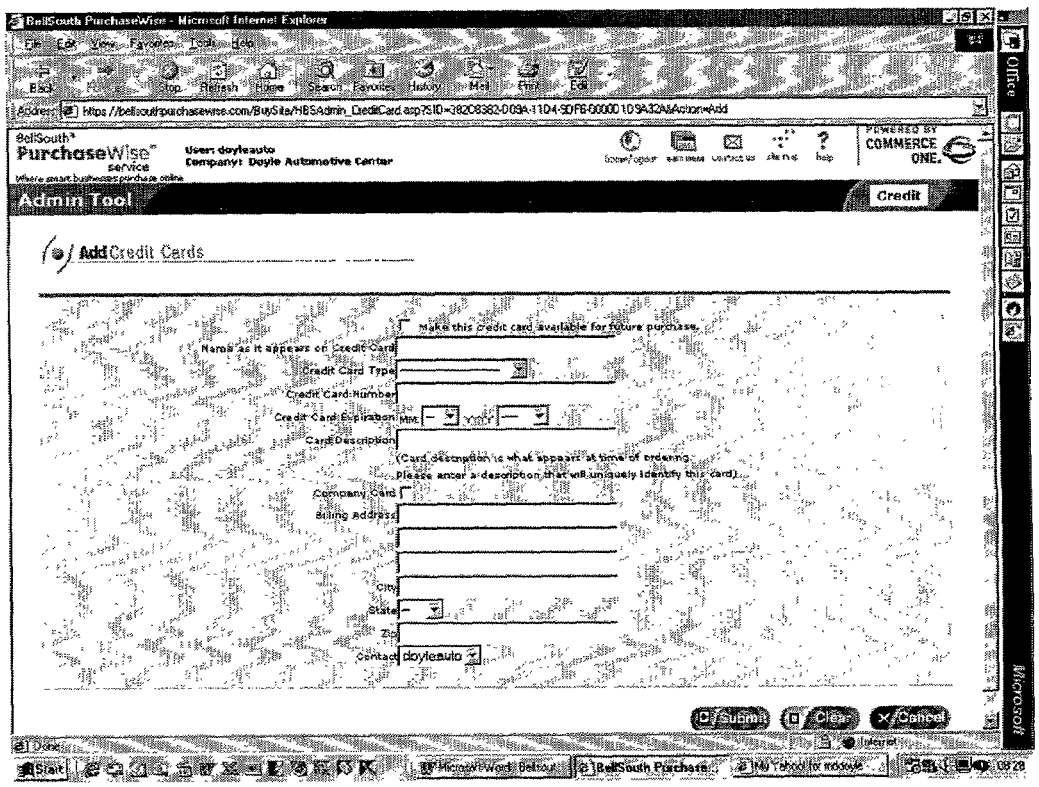
Figure 27I:
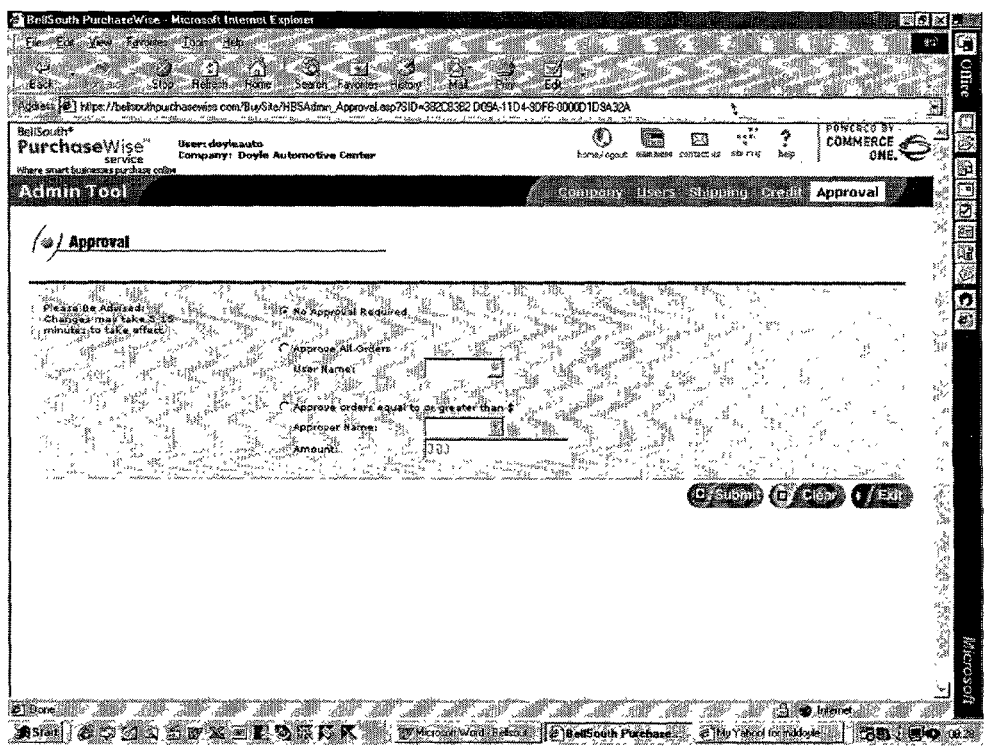

As shown in FIG. 12, buyers 5 can also select a set of administrative tools through the main menu. FIG. 27(A) shows an example of a company information tool whereby a buyer 5 can update company information as well as passwords. FIG. 27(B) is an example of an interface to a buyer's administrative tool which allows buyers 5 to add new individuals that may access the system 10. As shown in FIG. 27(C), the Users tool available through the system 10 allows a buyer 5 to edit information on an individual, including its name, e-mail address, phone number, fax number, and credit cards assigned to that individual. The buyers 5 can also control passwords available to individuals within a buyer's 5 organization. FIG. 27(D) is an example of an interface whereby a buyer 5 can add new individuals. FIG. 27(E) is an example of an interface to a shipping address administrative tool which allows a buyer 5 to add new addresses. As shown in FIG. 27(F), a buyer 5 can add a new shipping address and as shown in FIG. 27(G) can submit, clear, or cancel an address. Another administrative tool that is available to buyers 5 is a credit card tool. Among other features, the credit card tool allows buyers 5 to add new credit cards, as shown in the interface displayed in FIG. 27(H). The system 10 also allows buyers 5 to set approvals that are required before a transaction is completed. For example, as shown in an approval administrative tool interface in FIG. 27(I), a buyer 5 can specify that no approval is required, specify that all orders should be approved and specify the user name, or set limits on transactions that require approval, such as amount greater than or equal to a certain dollar amount.

V. Business Methods

The systems and methods according to the invention provide a number of advantages to multiple entities. The system 10 greatly reduces the costs associated with purchasing items. As rough examples, an average external processing cost of a purchase order is about $41.00 and the corresponding internal processing costs are approximately $38.00. The total cost per purchase order is therefore roughly on the order of $79.00. With the system 10, these costs can be drastically reduced to at least less than half the cost without the system 10, such as to about $33.00, and possibly even lower to approximately $6.00. In addition to the average cost, the use of the system 10 results in shorter cycle times, lower personnel costs, and greater accuracy. The system 10 therefore provides benefits to all parties associated with the use of the system 10.

With regard to the suppliers 15, the systems and methods according to the invention provide additional benefits. The suppliers 15 can see improvements in the efficiency of their operation. The suppliers 15 can use existing content format for the system 10 and provide this content to a large audience of small businesses and other buyers 5. Updates and other changes can be easily and efficiently made through the system 10 for an entire trading community. The suppliers 15 can also expect to have increased revenue due to increased on-contract buying and less maverick purchasing. The suppliers 15 can also expect to have reduced costs since set up and maintenance of accounts are made easier, transaction costs are lowered, and invoicing and accounts receivable should be less problematic. The suppliers 15 also enjoy the benefit of a more accurate process available through the system 10. The suppliers 15 can maintain a lower inventory, they experience less errors and rework due to the automated aspect of the system 10, and should expect fewer returns.

With regard to the buyers 5, the buyers 5 can aggregate their collective purchasing power to yield volume discounts from suppliers 15. The buyers 5 can therefore obtain lower prices on items than if they had purchased the items individually through the suppliers 15. In addition to the cost of the items themselves, the buyers 5 also enjoy other advantages when using the system 10. For example, the system 10 automates the routing and approval process that may have typically been performed internally to the buyer 5 but which now can be completely provided by the system 10. Additionally, the buyer 5 no longer needs to generate purchase orders for the items but instead can rely on the automated transfer of purchase orders input into the system 10 to the supplier 15. In all, the system 10 greatly reduces the amount of record keeping that is required by the buyers 5. This record keeping includes the purchase orders, routing and approvals, and payment information. The system 10 also handles the shipping and logistics for the buyers 5. The result of all of these benefits to the buyers 5 is that they can reduce their expenses not only with the cost of the items themselves but also with lower personnel expenses.

The entity that operates the system 10 receives benefits as well. Depending upon how the system is defined, the entity may receive enrollment fees, transaction fees, or other fees charged to either the buyers and/or suppliers for use of the system 10. In the preferred embodiment, the entity is one that already has relationships with many of the buyers 5 and possibly with one or more of the suppliers 15. The entity can therefore leverage the buying power of all of the buyers and further reducing costs of those items to that entity. This entity can therefore be one of the buyers 5 and enjoy the reduced cost that all buyers 5 enjoy and, in addition, can receive some additional discount or rebate from the suppliers 15 due to use of the system 10. For example, this entity may enjoy the reduced cost of the items available to all buyers 5 through the system 10 and may additionally receive a five percent rebate on purchases made by all buyers 5 with each of the suppliers 15. Through the use of the system 10, this entity can also obtain new customers for its primary or other aspects of its business and generate goodwill with its existing customers. The entity can also generate revenue through advertising charges, enrollment or membership fees, and a joint marketing fund between the entity and suppliers 15.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. A method for an operating entity to offer a buying club to its customers over a network, operating entity aggregation purchases by the customers in the buying club in order to enable volume discounting for the buying club, the method comprising:
    providing membership in the buying club to a customer of the operating entity, the membership implemented at a website of the buying club over the network; and
    associating at least one selling entity with the buying club, the at least one selling entity providing items available for purchase through the buying club over the network; and
    associating a discounted price to an item available for purchase from the at least one selling entity through the buying club, the discounted price reflecting an amount commensurate with a number of members in the buying club; and
    providing a tool for searching items available for purchase, selling entities associated with the buying club, and categories of items; and
    receiving an order via the network from a registered member of the buying club to purchase the item; and
    implementing user preferences selected by the member, the user preferences including a listing of favorite items, wherein the implementing user preferences further includes sorting and filtering orders by submitted and unsubmitted, and reviewing a current status of orders resulting from the sorting and filtering;
    providing reports to members, the reports including details of activities conducted via the buying club; and
    automatically generating a purchase order on behalf of the registered member; and
    transmitting the purchase order to the selling entity via the network; and
    transmitting confirmation of the order to the registered member.

2. The method of claim 1, wherein the member is a small business entity and the selling entity is at least one of:
    a seller of office supplies;
    a seller of information technology hardware and software;
    a seller of telecommunications equipment;
    a furniture dealer;
    a temporary staffing service provider;
    a provider of stationary, printing, mail, and fax services;
    a florist;
    an insurance provider;
    a seller of appliances;
    a seller of vending supplies; and
    a provider of maintenance and janitorial services.

3. The method of claim 1, wherein the operating entity is a telecommunications services provider.

4. The method of claim 1, wherein the associating a discounted price to an item is performed for items provided in a catalog of the selling entity, the catalog uploaded to the website and accessible to members of the buying club.

5. The method of claim 1, wherein the purchase order is generated using information provided by the member upon at least one of:
    acceptance of membership in the buying club; and
    enrollment as a customer of the operating entity.

6. The method of claim 1, further comprising:
    authorizing an approver of orders placed by the member, the authorizing including:
        providing a name or identification of an individual authorized to place orders on behalf of the member; and
        authorizing a spending limit on an order.

7. The method of claim 1, further comprising:
    providing revenue to the operating entity based upon a number of purchase orders processed, the revenue including at least one of:
        a rebate; and
        a second discount for items purchased by the operating entity.

8. A system for enabling an operating entity to offer a buying club to its customers over a network, the operating entity aggregation purchases by the customers in the buying club in order to enable volume discounting for the club, the system comprising:
    a network-enabled processor implemented by the operating entity; and
    a small business buying club application executing on the network-enabled processor, the small business buying club application performing:

providing membership in the buying club to a customer of the operating entity, the membership implemented at a website of the buying club over the network; and associating at least one selling entity with the buying club, the at least one selling entity providing items available for purchase through the buying club via an other user system; and associating a discounted price to an item available for purchase from the at least one selling entity through the buying club, the discounted price reflecting an amount commensurate with a number of members in the buying club; and providing a tool for searching items available for purchase, selling entities associated with the buying club, and categories of items; and receiving an order via the network from a registered member of the buying club to purchase the item; and implementing user preferences selected by the member, the user preference including a listing of favorite items, wherein the implementing user preferences further includes sorting and filtering orders by submitted and unsubmitted, and reviewing a current status of orders resulting from the sorting and filtering;

providing reports to members, the reports including details of activities conducted via the buying club; and automatically generating a purchase order on behalf of the registered member; and transmitting the purchase order to the selling entity via the network; and transmitting confirmation of the order to the registered member.

9. The system of claim 8, wherein the member is a small business entity, and the selling entity is at least one of:
a seller of office supplies;
a seller of information technology hardware and software;
a seller of telecommunications equipment;
a furniture dealer;
a temporary staffing service provider;
a provider of stationary, printing, mail, and fax services;
a florist;
an insurance provider;
a seller of appliances;
a seller of vending supplies; and
a provider of maintenance and janitorial services.

10. The system of claim 8, wherein the operating entity is a telecommunications services provider.

11. The system of claim 8, wherein the associating a discounted price to an item is performed for items provided in a catalog of the selling entity, the catalog uploaded to the website and accessible to members of the buying club.

12. The system of claim 8, wherein the purchase order is generated using information provided by the member upon at least one of:
acceptance of membership in the buying club; and
enrollment as a customer of the operating entity.

13. The system of claim 8, wherein the small business buying club application further performs:
authorizing an approver of orders placed by the member, the authorizing including:
providing a name or identification of an individual authorized to place orders on behalf of the member; and authorizing a spending limit on an order.

14. The system of claim 8, wherein the small business buying club application further performs:
providing revenue to the operating entity based upon a number of purchase orders processed, the revenue including at least one of:
a rebate; and
a second discount for items purchased by the operating entity.

15. A computer program product embodied on a computer-readable medium that includes instructions for an operating entity to offer a buying club to its customers over a network, the operating entity aggregation purchases by the customers in order to enable volume discounting for the buying club, the computer program product further including instructions for performing:
providing membership in the buying club to a customer of the operating entity, the membership implemented at a website of the buying club over the network; and associating at least one selling entity with the buying club, the at least one selling entity providing items available for purchase through the buying club over the network; and associating a discounted price to an item available for purchase from the at least one selling entity through the buying club, the discounted price reflecting an amount commensurate with a number of members in the buying club; and providing a tool for searching items available for purchase, selling entities associated with the buying club, and categories of items; and receiving an order via the network from a registered member of the buying club to purchase the item; and implementing user preferences selected by the member, the user preferences including a listing of favorite items, wherein the implementing user preferences further includes sorting and filtering orders by submitted and unsubmitted, and reviewing a current status of orders resulting from the sorting and filtering;

providing reports to members, the reports including details of activities conducted via the buying club; and automatically generating a purchase order on behalf of the registered member; and transmitting the purchase order to the selling entity via the network; and transmitting confirmation of the order to the registered member.

16. The computer program product of claim 15, wherein the purchase order is generated using information provided by the member upon at least one of:
acceptance of membership in the buying club; and
enrollment as a customer of the operating entity.

17. The computer program product of claim 15, further comprising instructions for performing:
providing revenue to the operating entity based upon a number of purchase orders processed, the revenue including at least one of:
a rebate; and
a second discount for items purchased by the operating entity.

* * * * *